(12) United States Patent
Chang et al.

(10) Patent No.: US 11,099,330 B2
(45) Date of Patent: Aug. 24, 2021

(54) ULTRA-SMALL FORM FACTOR OPTICAL CONNECTORS WITH POLARITY CHANGE AND METHOD OF USE

(71) Applicant: Senko Advanced Components Inc, Marlborough, MA (US)

(72) Inventors: Jimmy Chang, Worcester, MA (US); Man Ming Ho, Kowloon (HK); Kim Man Wong, Kowloon (HK); Kazuyoshi Takano, Tokyo (JP); Siu Kei Ma, Kowloon (HK); Yim Wong, Kowloon (HK)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/705,830

(22) Filed: Dec. 6, 2019

(65) Prior Publication Data
US 2020/0183093 A1    Jun. 11, 2020

Related U.S. Application Data

(60) Provisional application No. 62/776,028, filed on Dec. 6, 2018.

(51) Int. Cl.
 *G02B 6/38* (2006.01)
(52) U.S. Cl.
 CPC ......... *G02B 6/3831* (2013.01); *G02B 6/3825* (2013.01)
(58) Field of Classification Search
 None
 See application file for complete search history.

(56) References Cited

U.S. PATENT DOCUMENTS

| | | | | |
|---|---|---|---|---|
| 5,335,301 A | * | 8/1994 | Newman | G02B 6/3831 385/139 |
| 5,521,997 A | * | 5/1996 | Rovenolt | G02B 6/3831 385/75 |
| 5,712,938 A | * | 1/1998 | Lin | G02B 6/3849 385/139 |
| 8,770,863 B2 | * | 7/2014 | Cooke | G02B 6/3851 385/78 |
| 9,658,409 B2 | | 5/2017 | Gniadek et al. | |
| 9,684,130 B2 | * | 6/2017 | Veatch | G02B 6/3831 |
| 9,804,340 B1 | | 10/2017 | Lin | |
| 10,712,507 B2 | * | 7/2020 | Childers | G02B 6/3821 |
| 10,838,152 B2 | * | 11/2020 | Chang | G02B 6/3893 |
| 2012/0082416 A1 | * | 4/2012 | Katoh | G02B 6/3831 385/72 |
| 2012/0099822 A1 | | 4/2012 | Kuffel et al. | |
| 2013/0322825 A1 | | 12/2013 | Cooke et al. | |

(Continued)

OTHER PUBLICATIONS

International Search Report and Written Opinion, Application No. PCT/US19/64924, dated Feb. 21, 2020, pp. 9.

*Primary Examiner* — Rhonda S Peace
(74) *Attorney, Agent, or Firm* — Stinson LLP

(57) ABSTRACT

An optical connector holding two or more LC-type optical ferrules is provided. The optical connector includes an outer housing, ferrules, a cable boot and one or more polarity keys. The keys are configured to change connector polarity from a first to a second polarity. A corresponding adapter with one or more slots within an adapter wall on opposing sides sized and shaped to accept a single or dual keyed polarity changeable connector.

7 Claims, 59 Drawing Sheets

(56) References Cited

U.S. PATENT DOCUMENTS

| | | | |
|---|---|---|---|
| 2014/0056562 A1* | 2/2014 | Limbert | ............... G02B 6/36 |
| | | | 385/77 |
| 2015/0010276 A1 | 1/2015 | Nexans et al. | |
| 2015/0378113 A1 | 12/2015 | Nexans et al. | |
| 2016/0259135 A1 | 9/2016 | Gniadek et al. | |
| 2018/0011254 A1 | 1/2018 | Takano et al. | |
| 2018/0335577 A1 | 11/2018 | Wong et al. | |
| 2020/0183093 A1* | 6/2020 | Chang | ............... G02B 6/3831 |

* cited by examiner

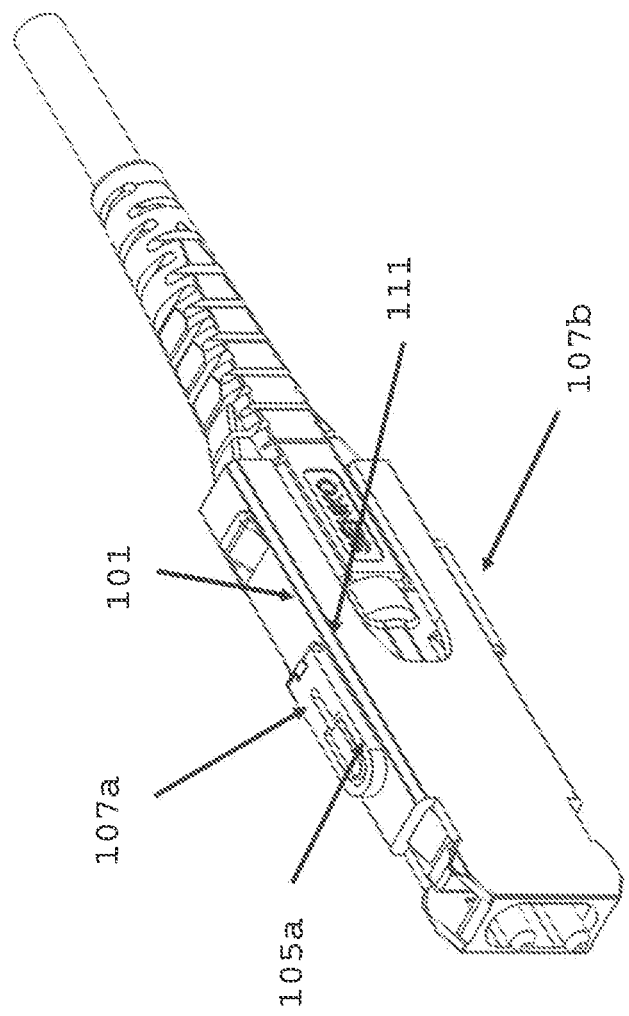

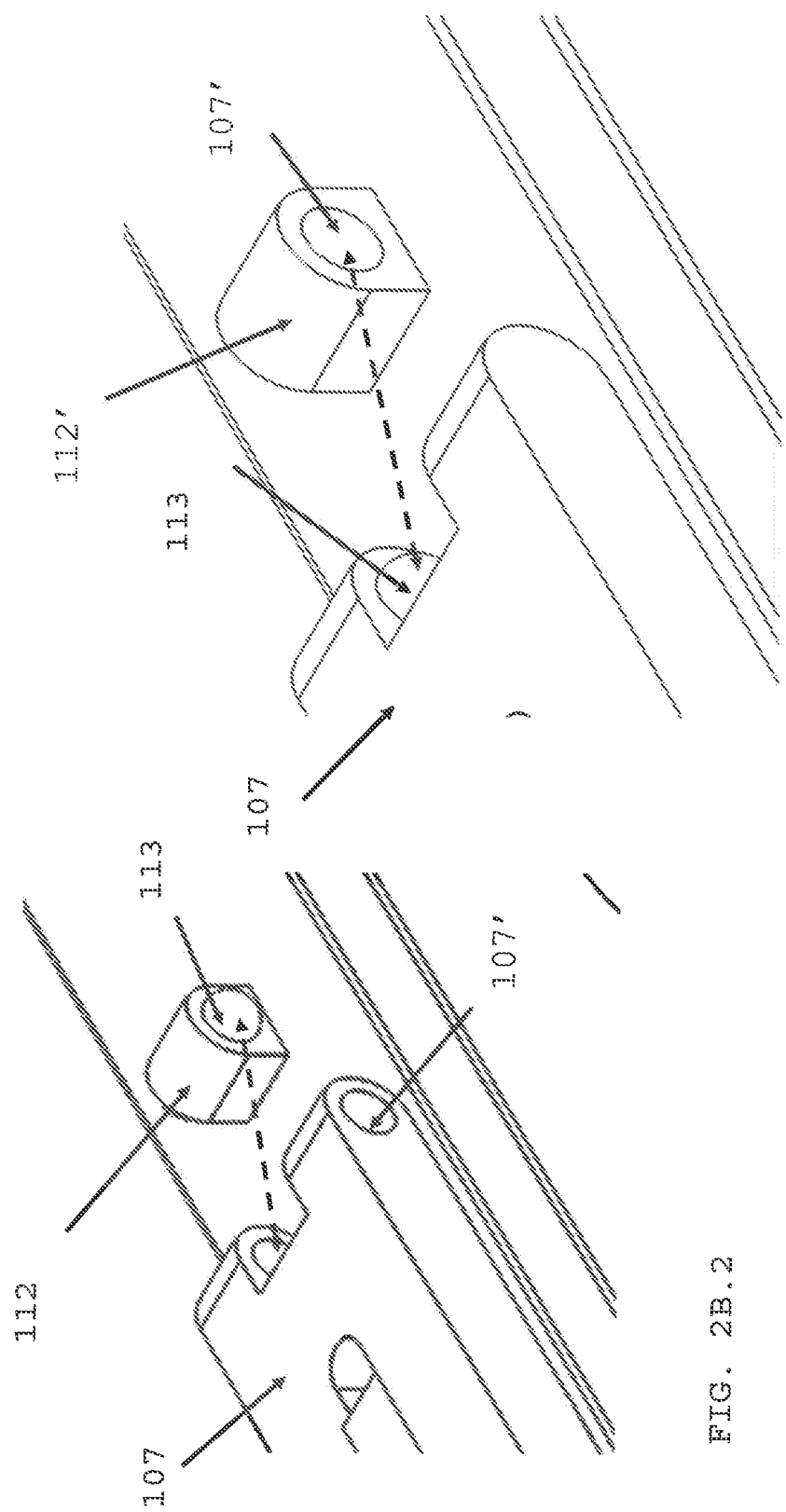

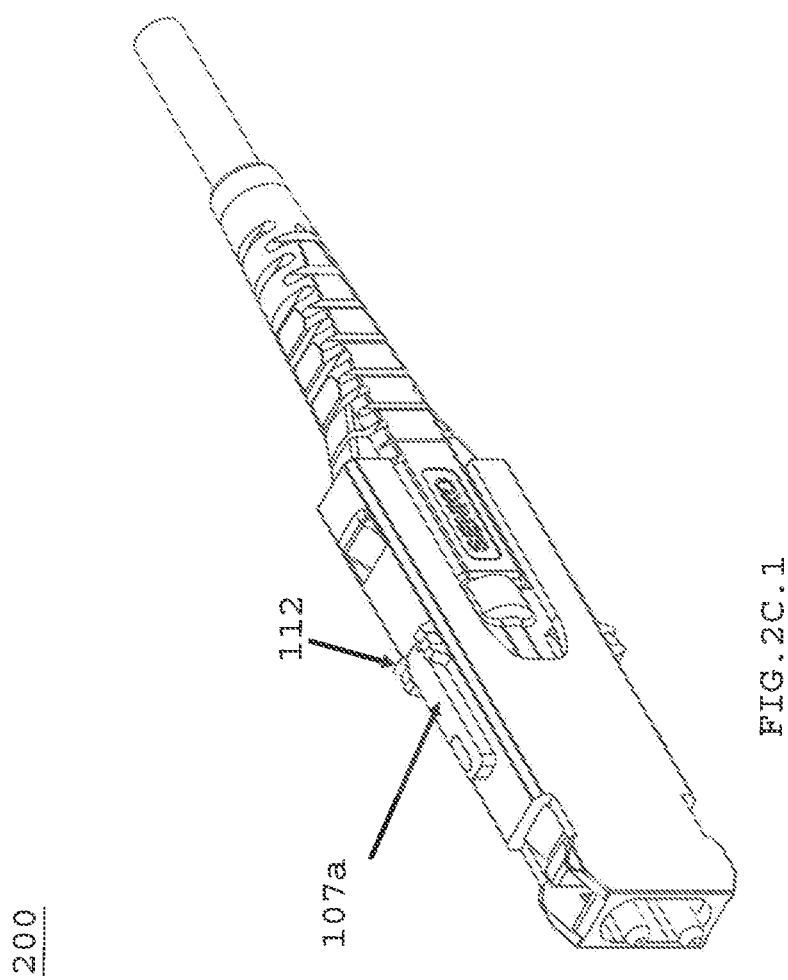
FIG. 2C.1

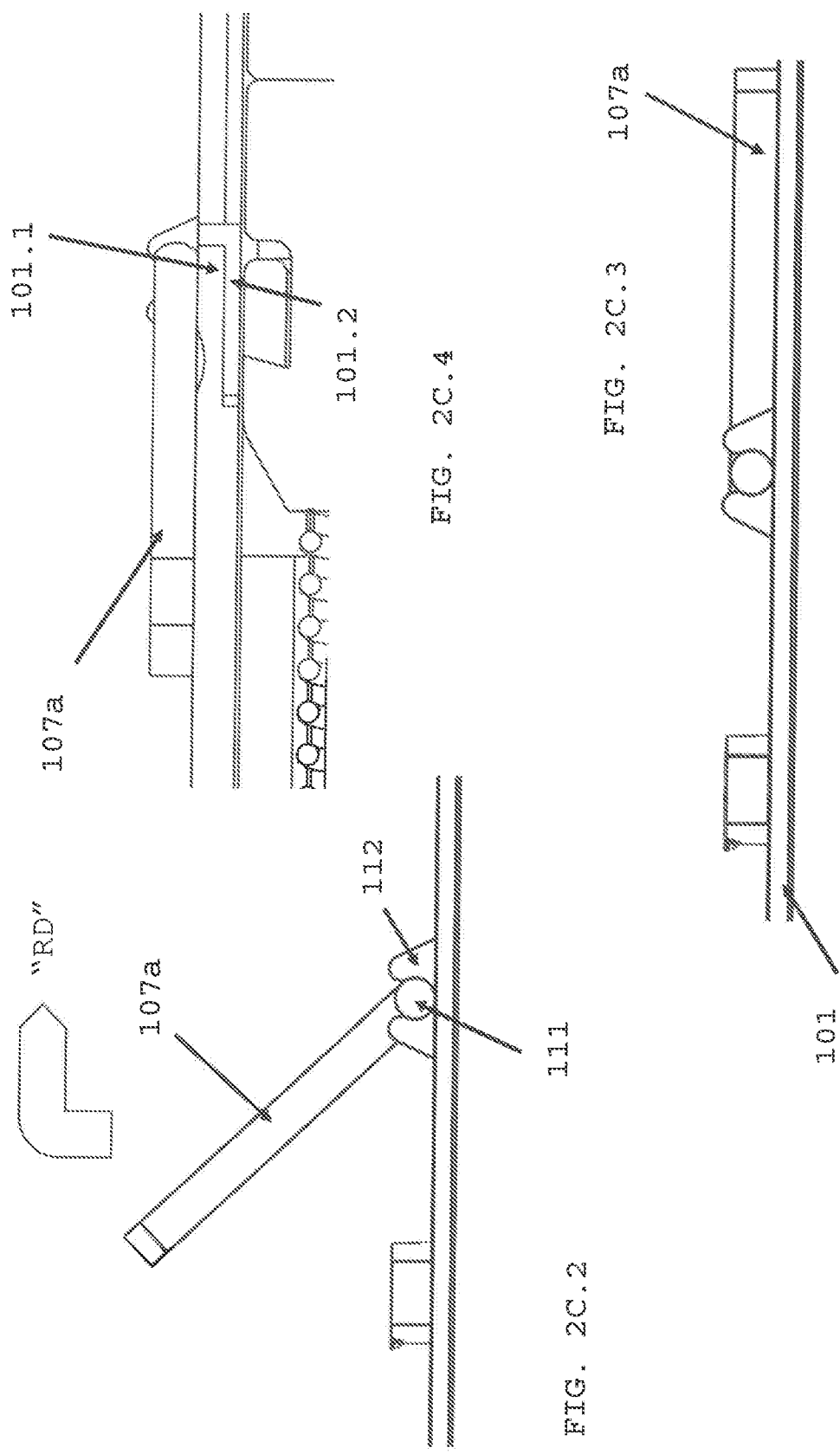

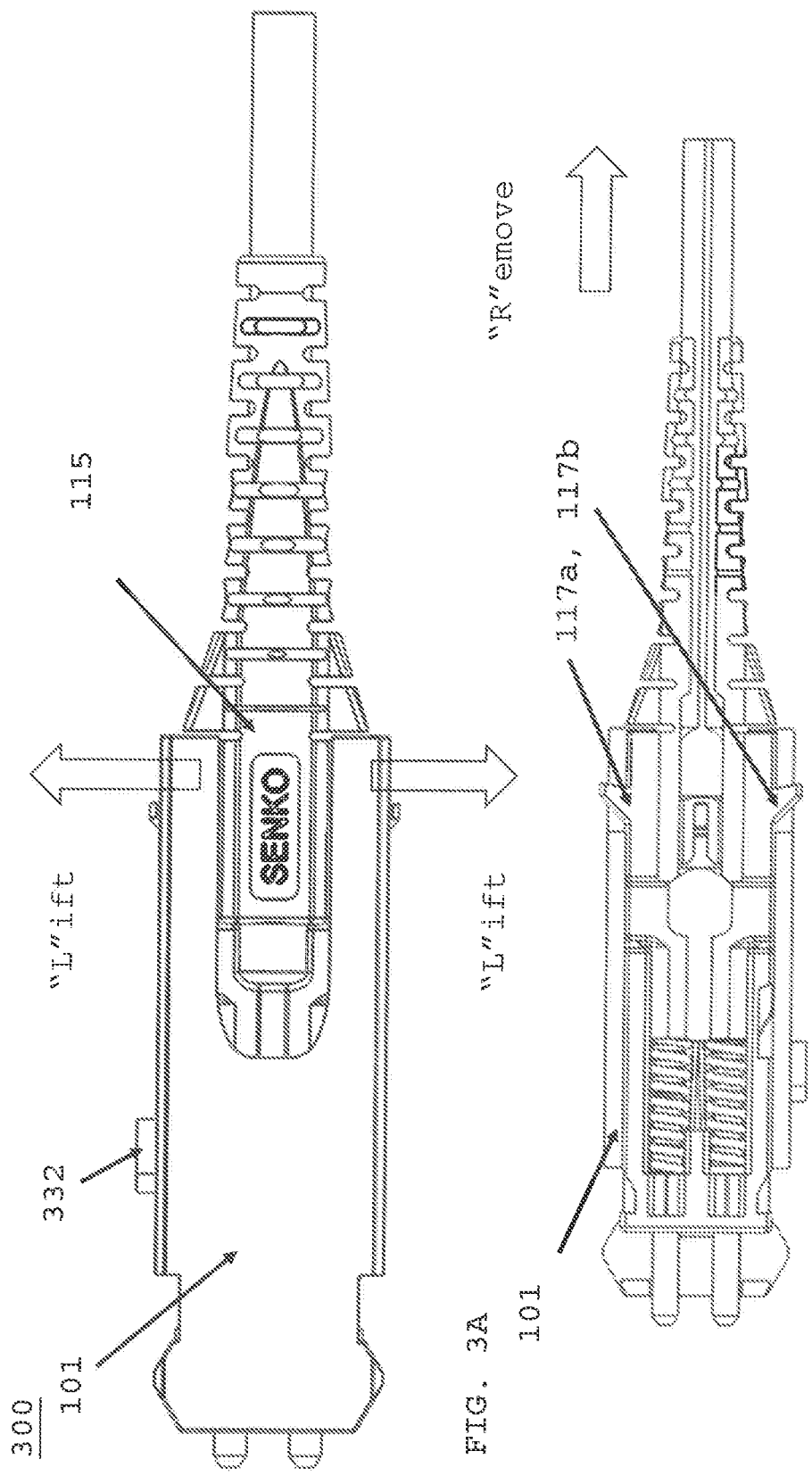

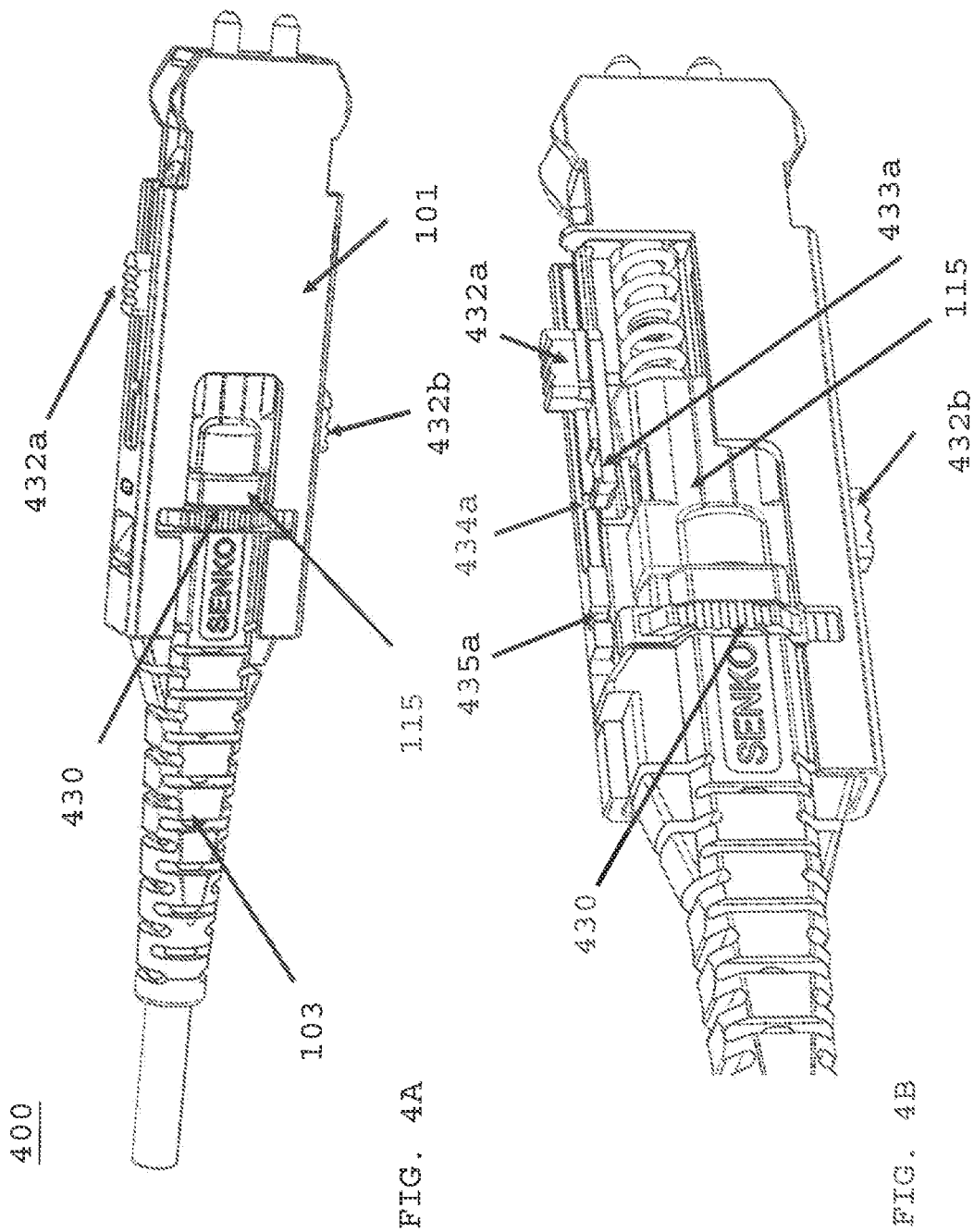

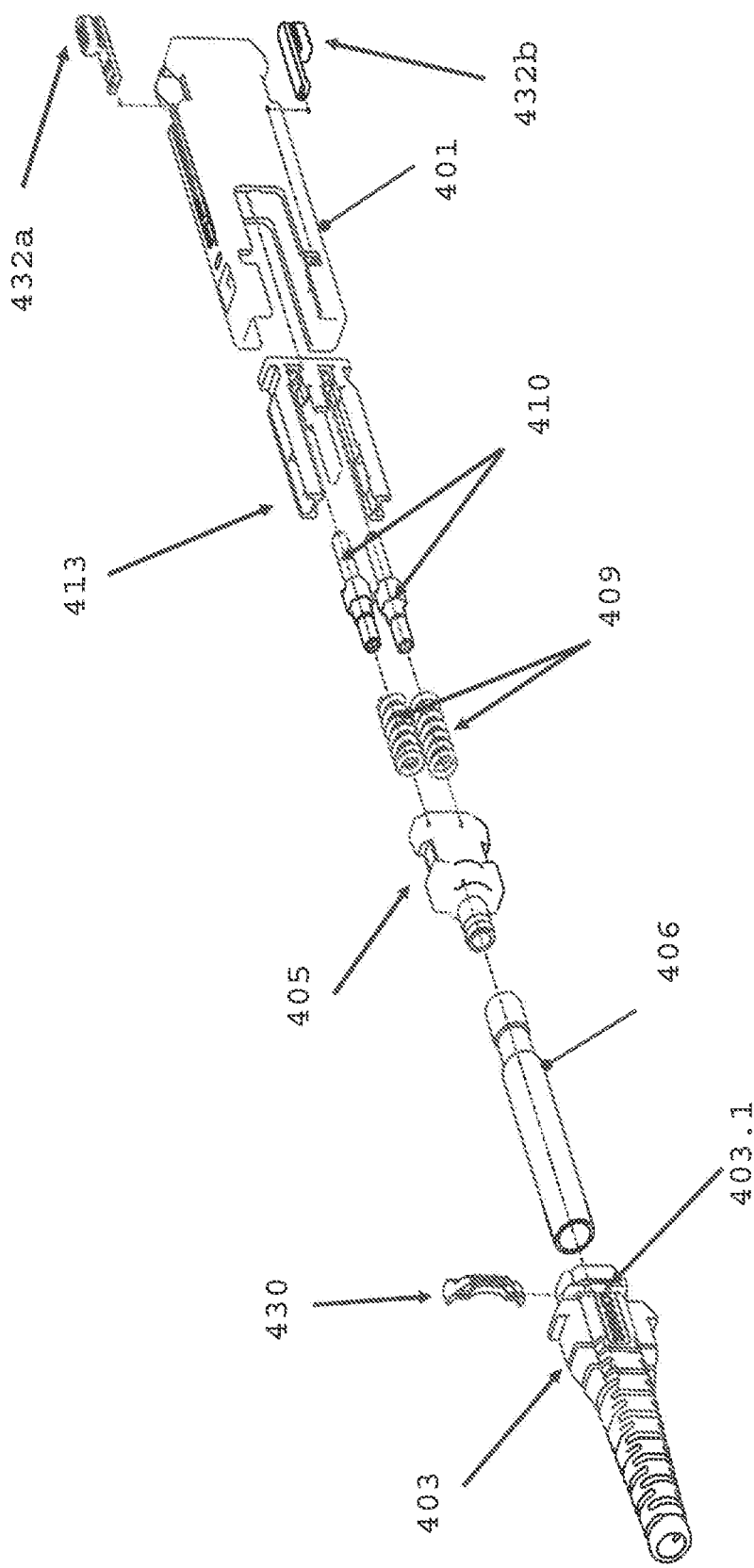

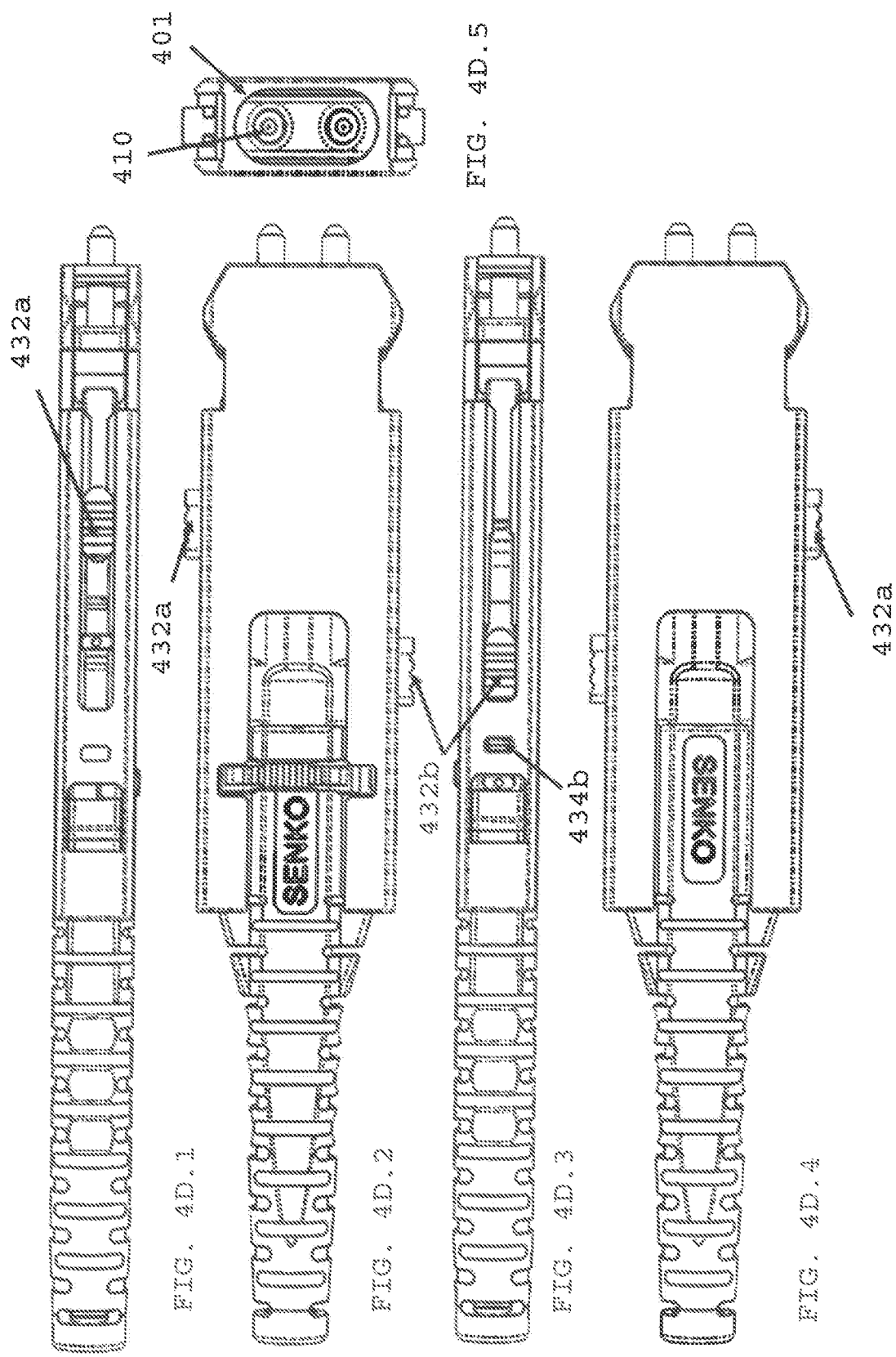

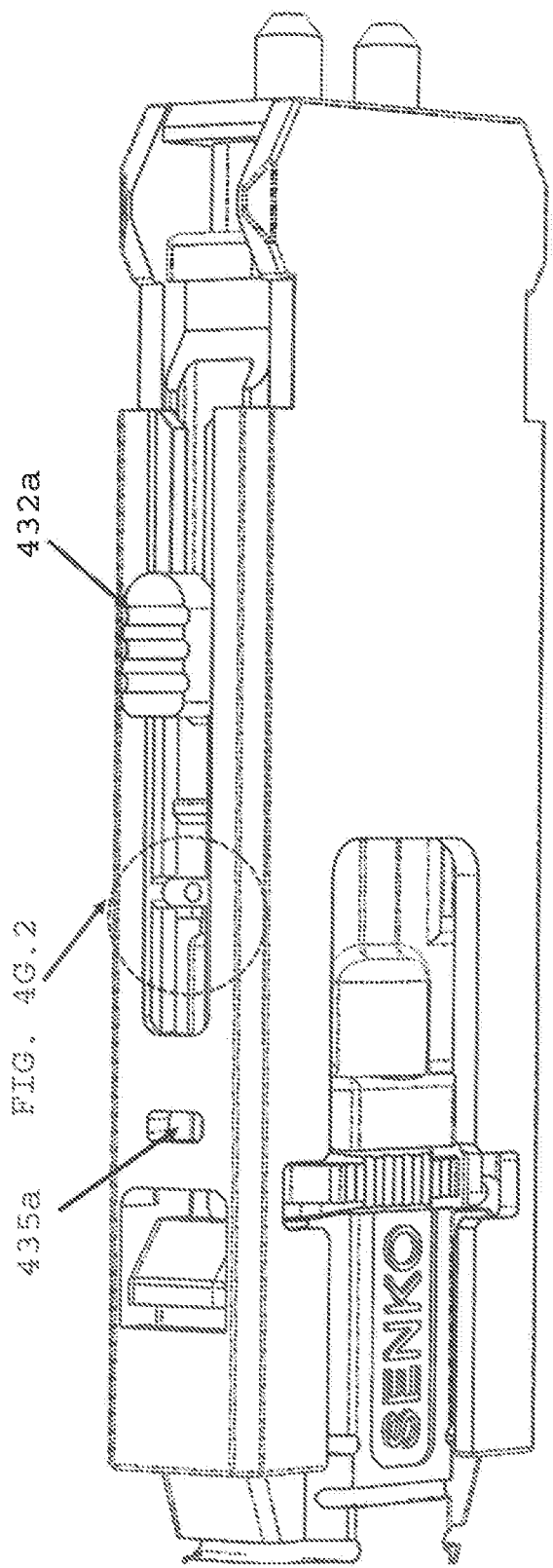

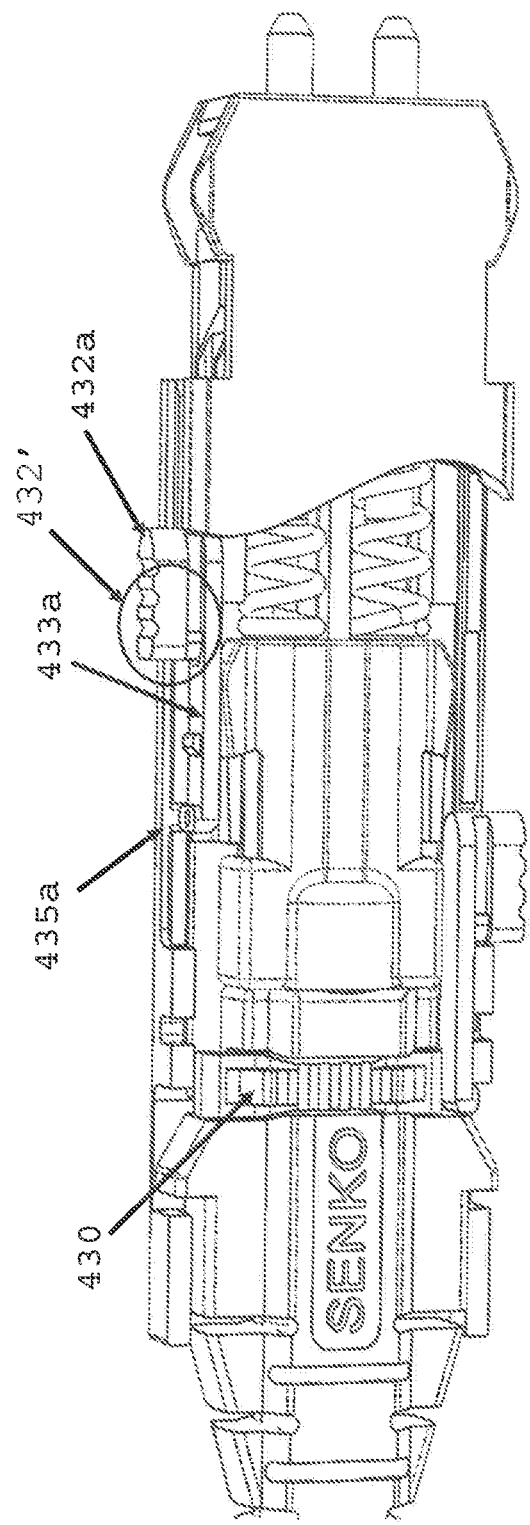
FIG. 4G.2

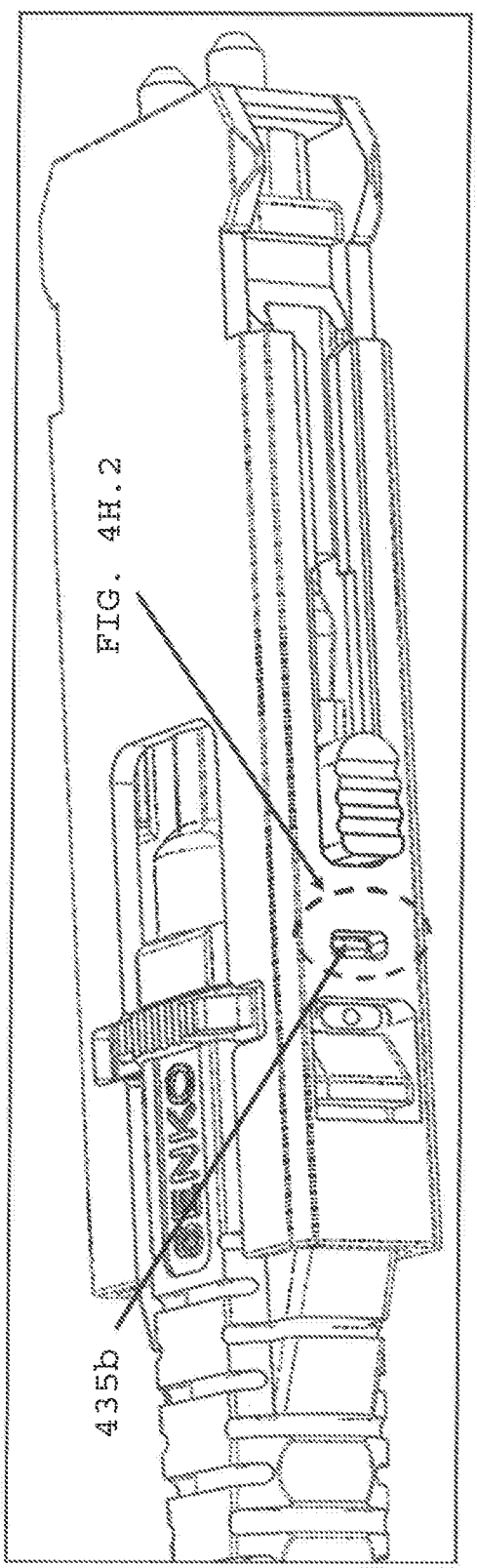

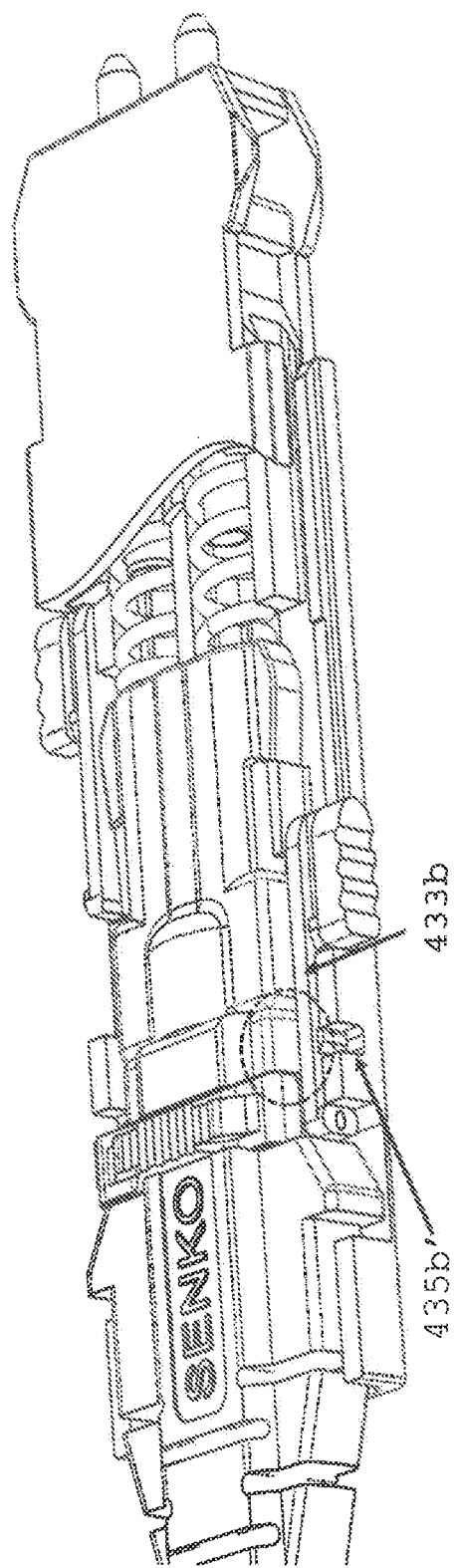
FIG. 4H.2

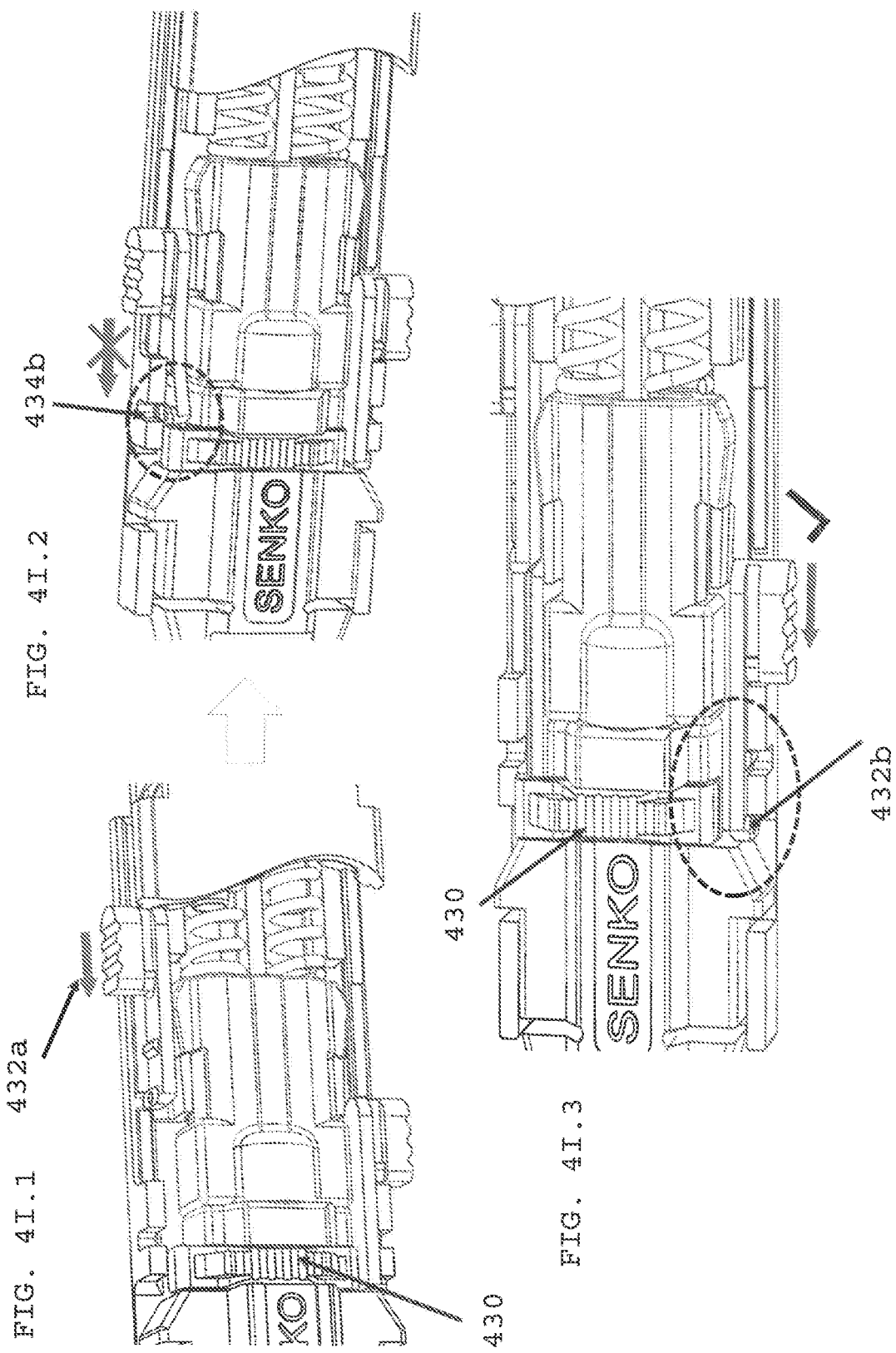

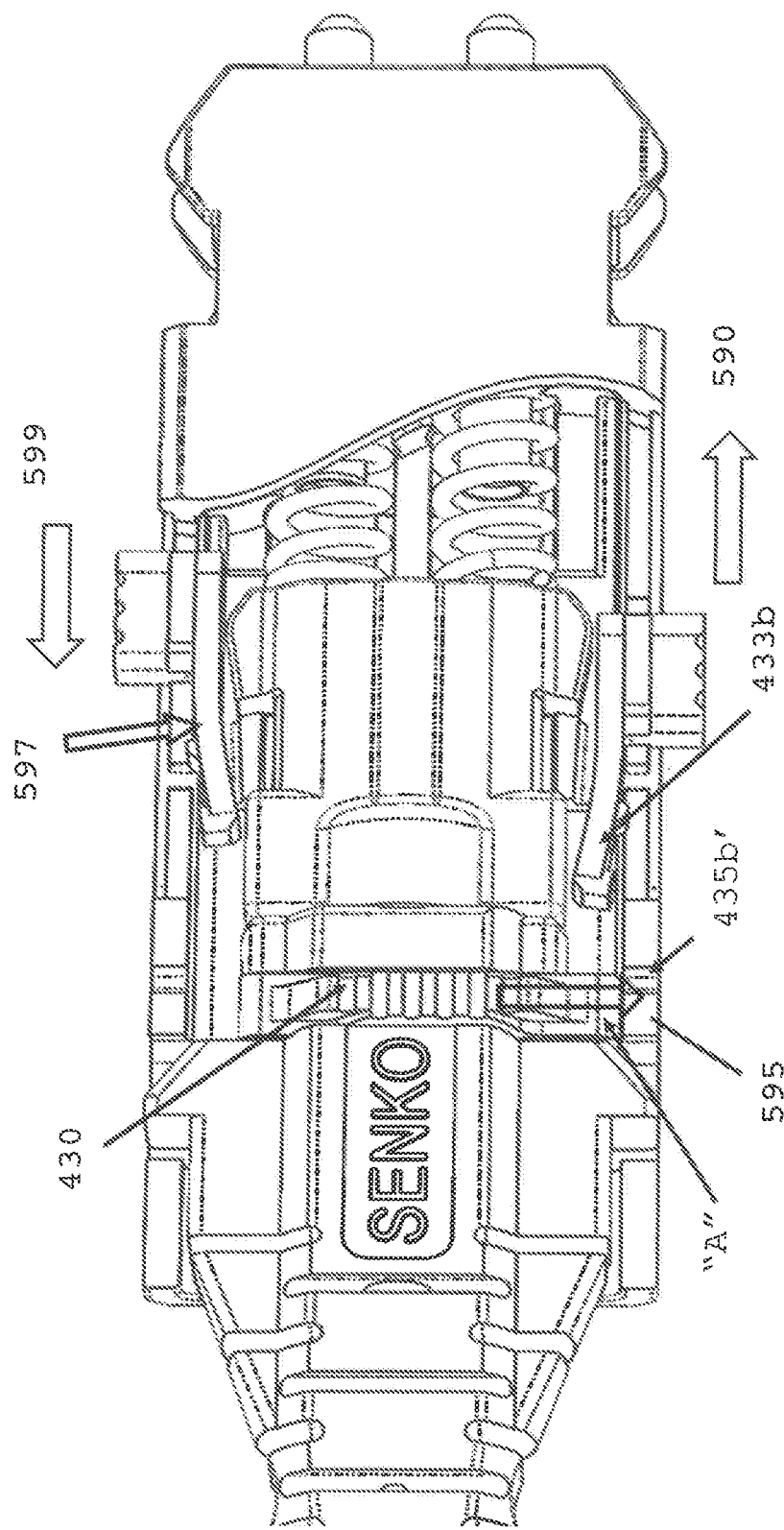
FIG. 4I.4

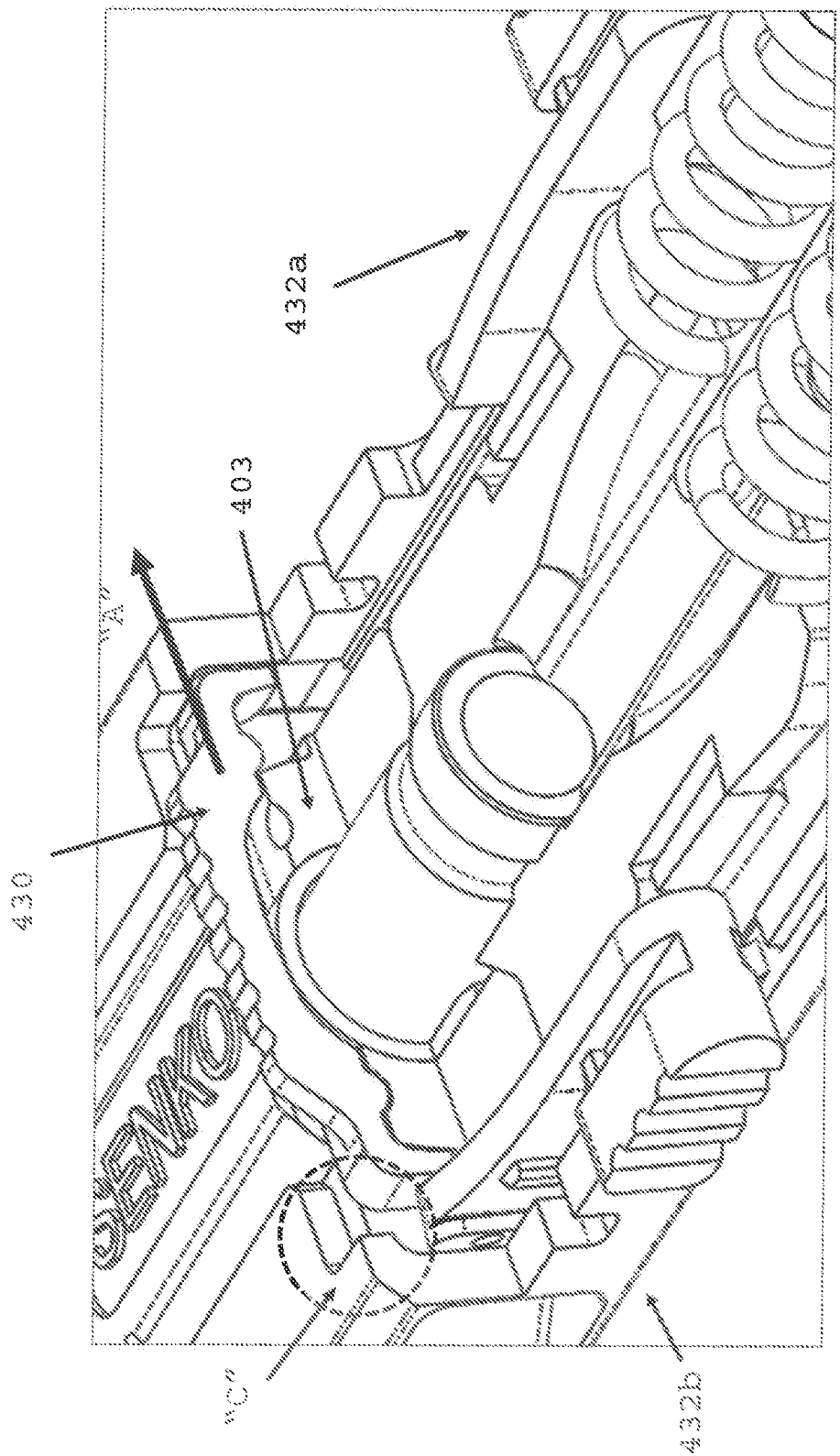
FIG. 4J.1

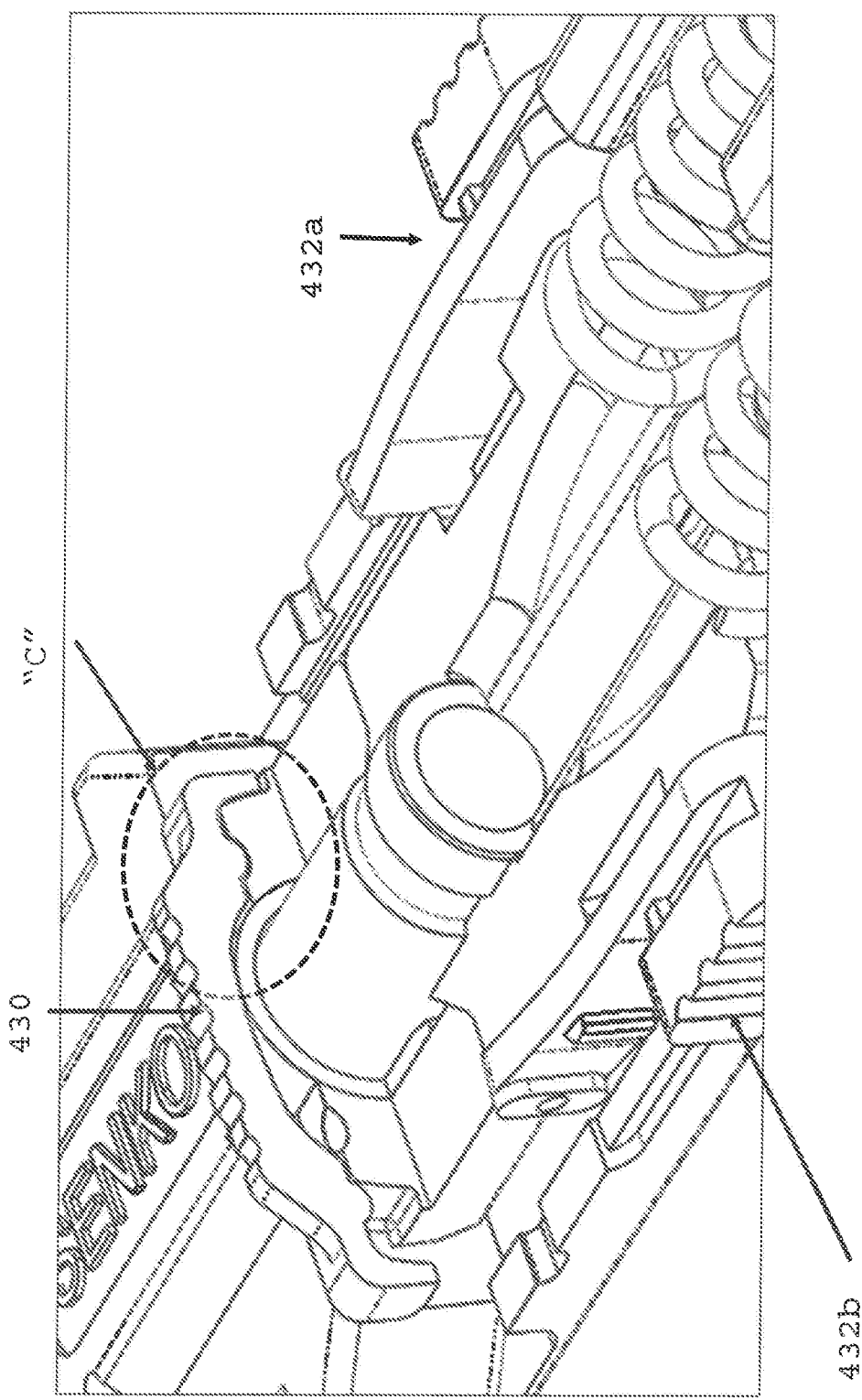
FIG. 4J.2

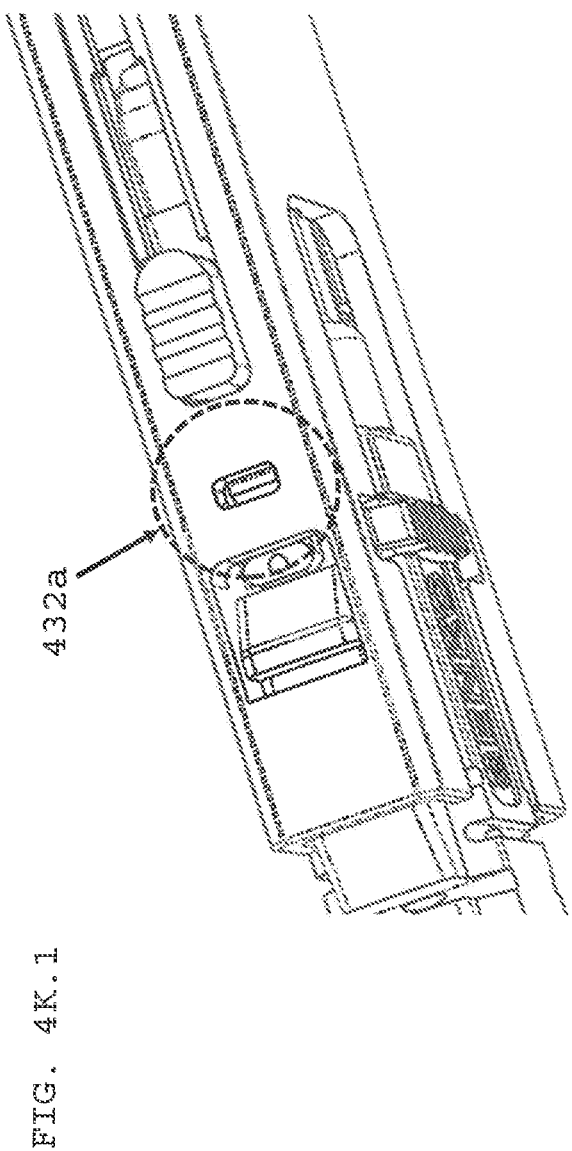
FIG. 4K.1

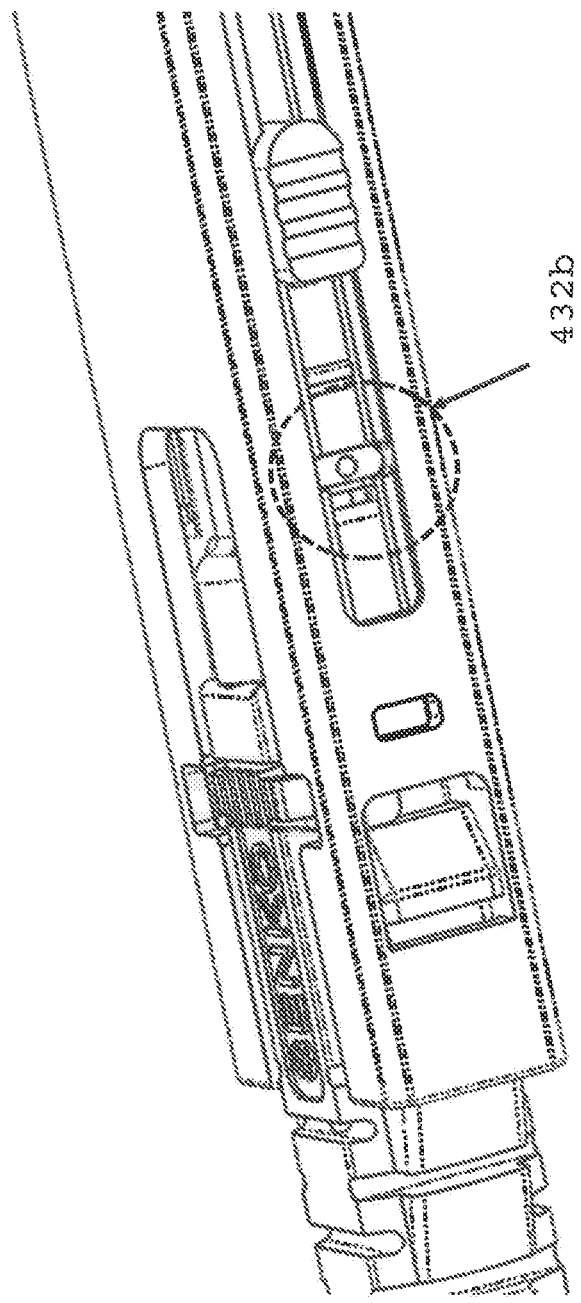
FIG. 4K.2

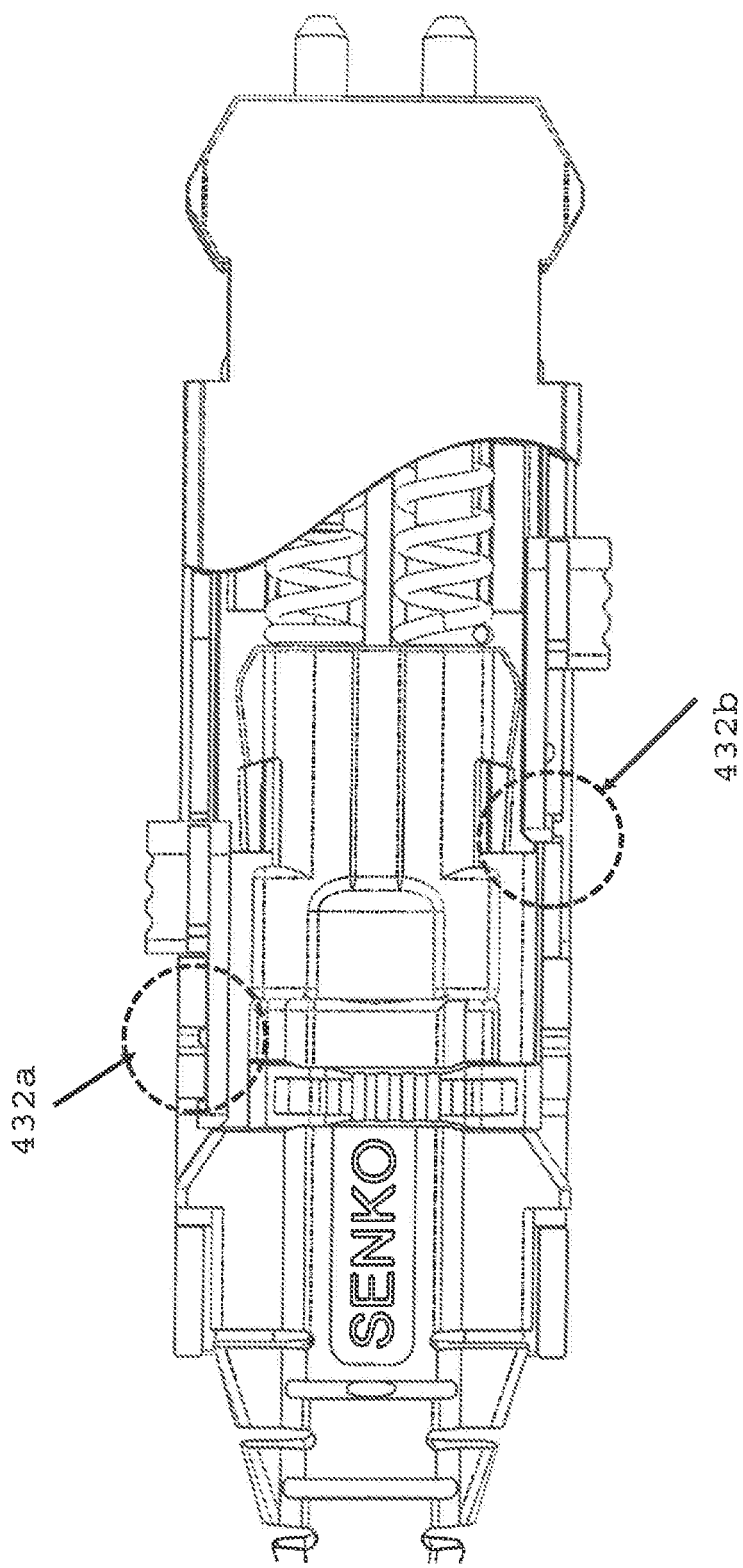

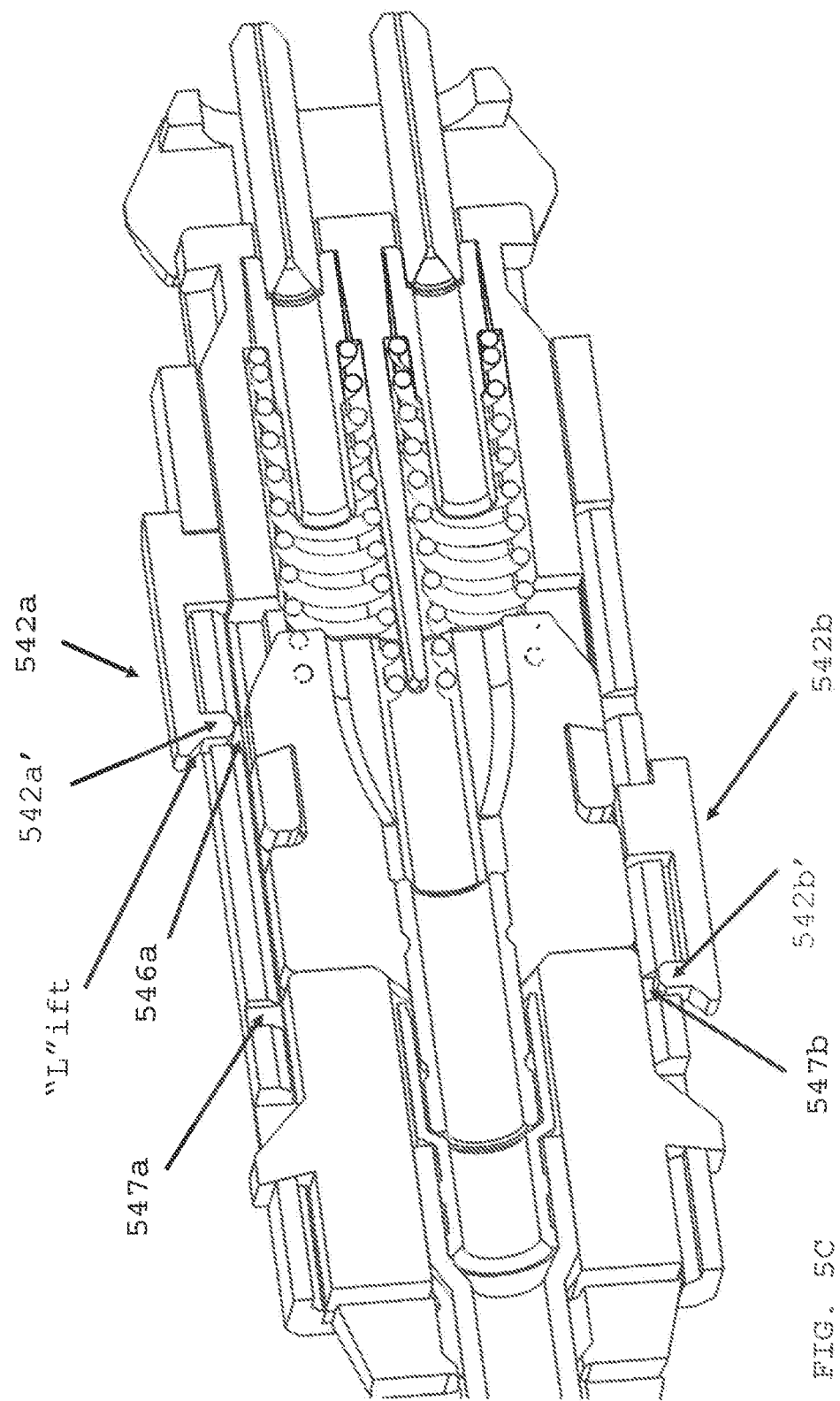

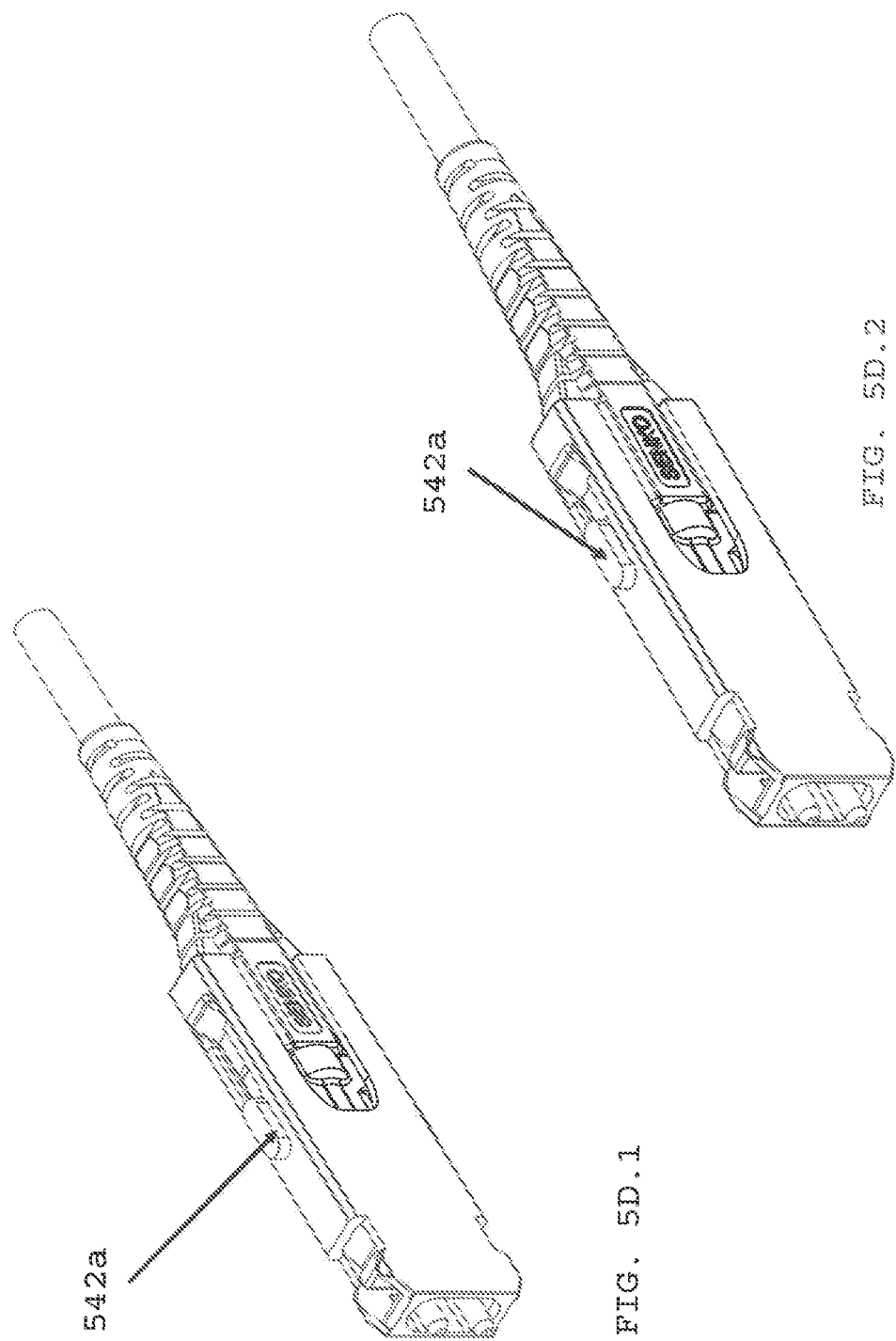

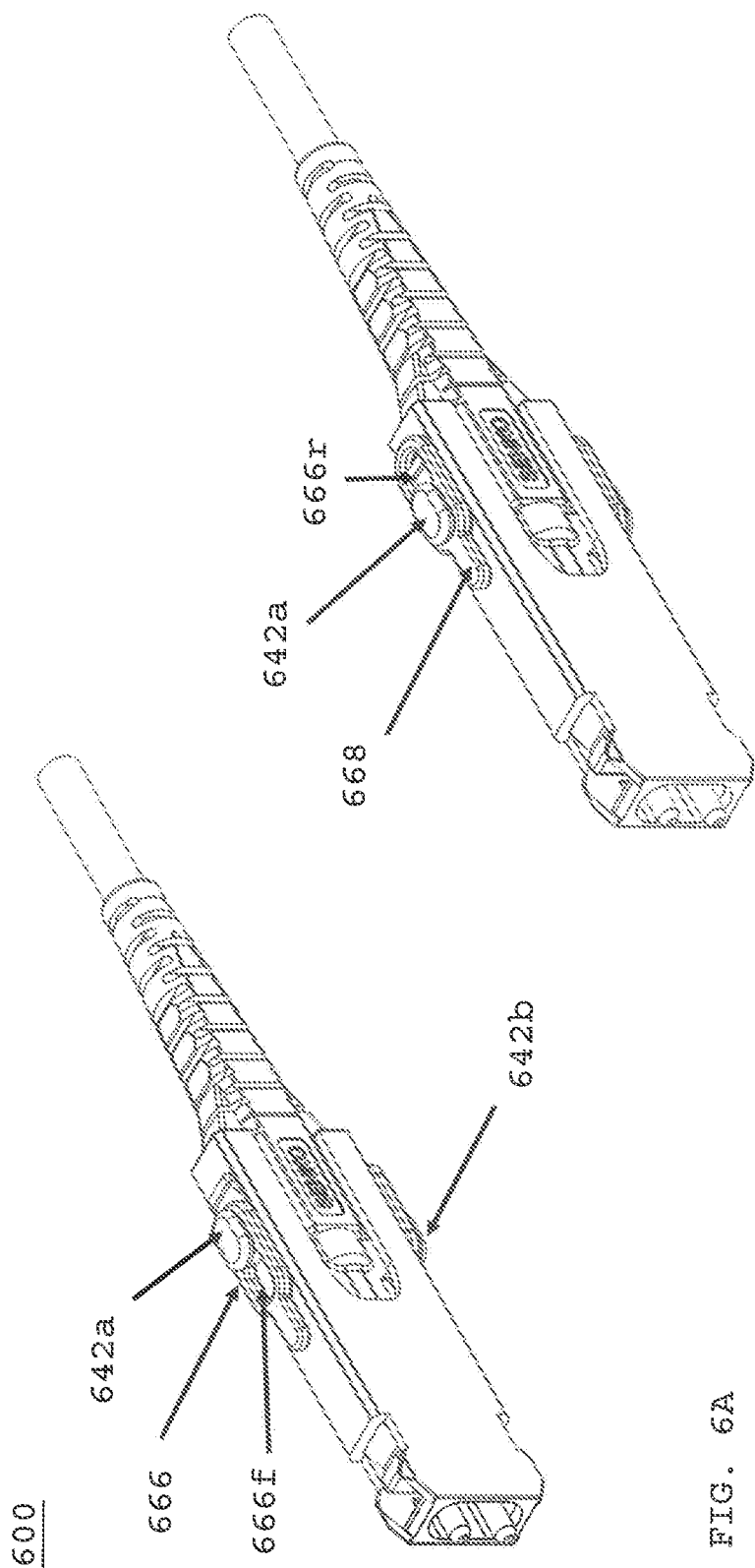

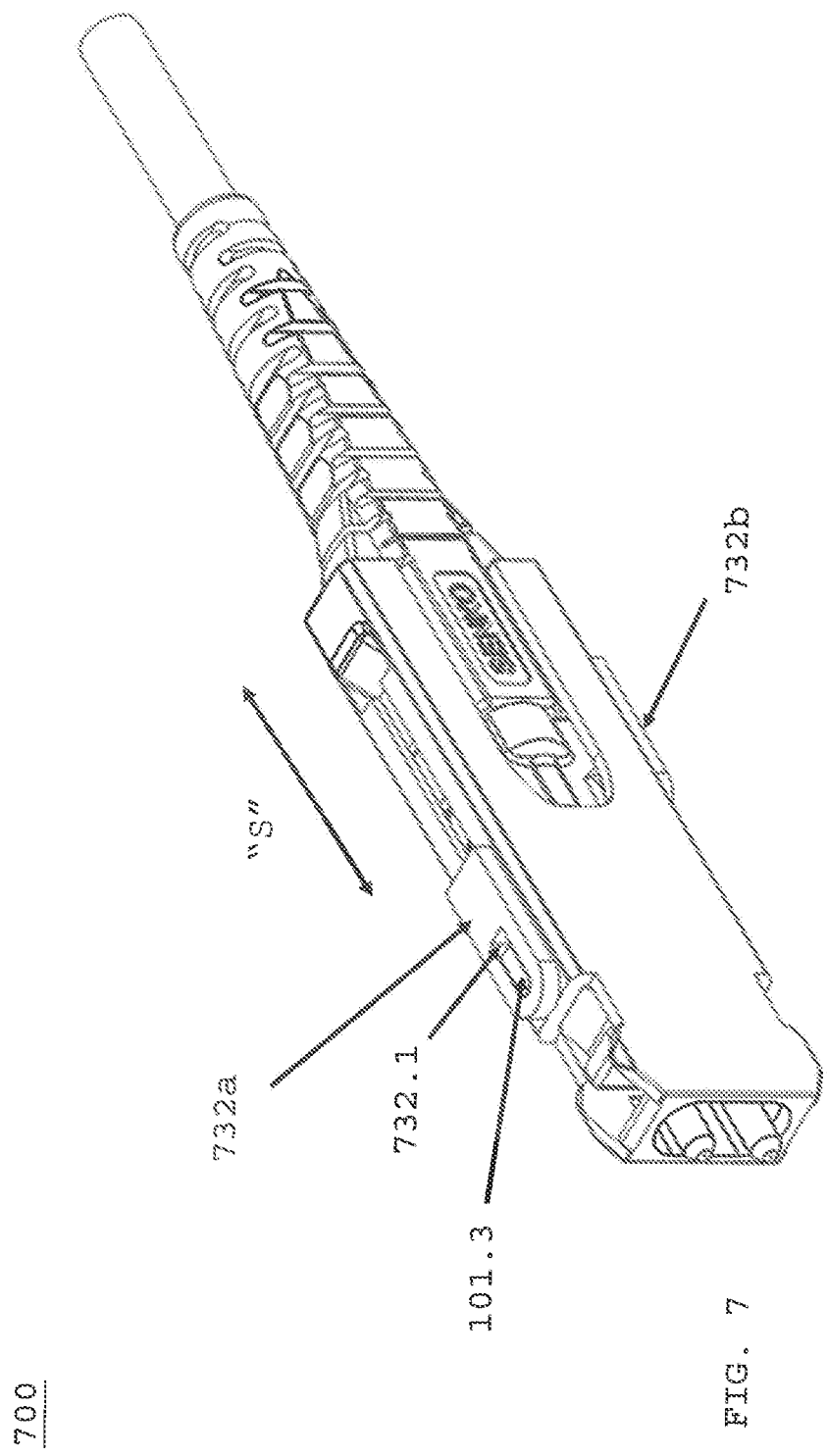

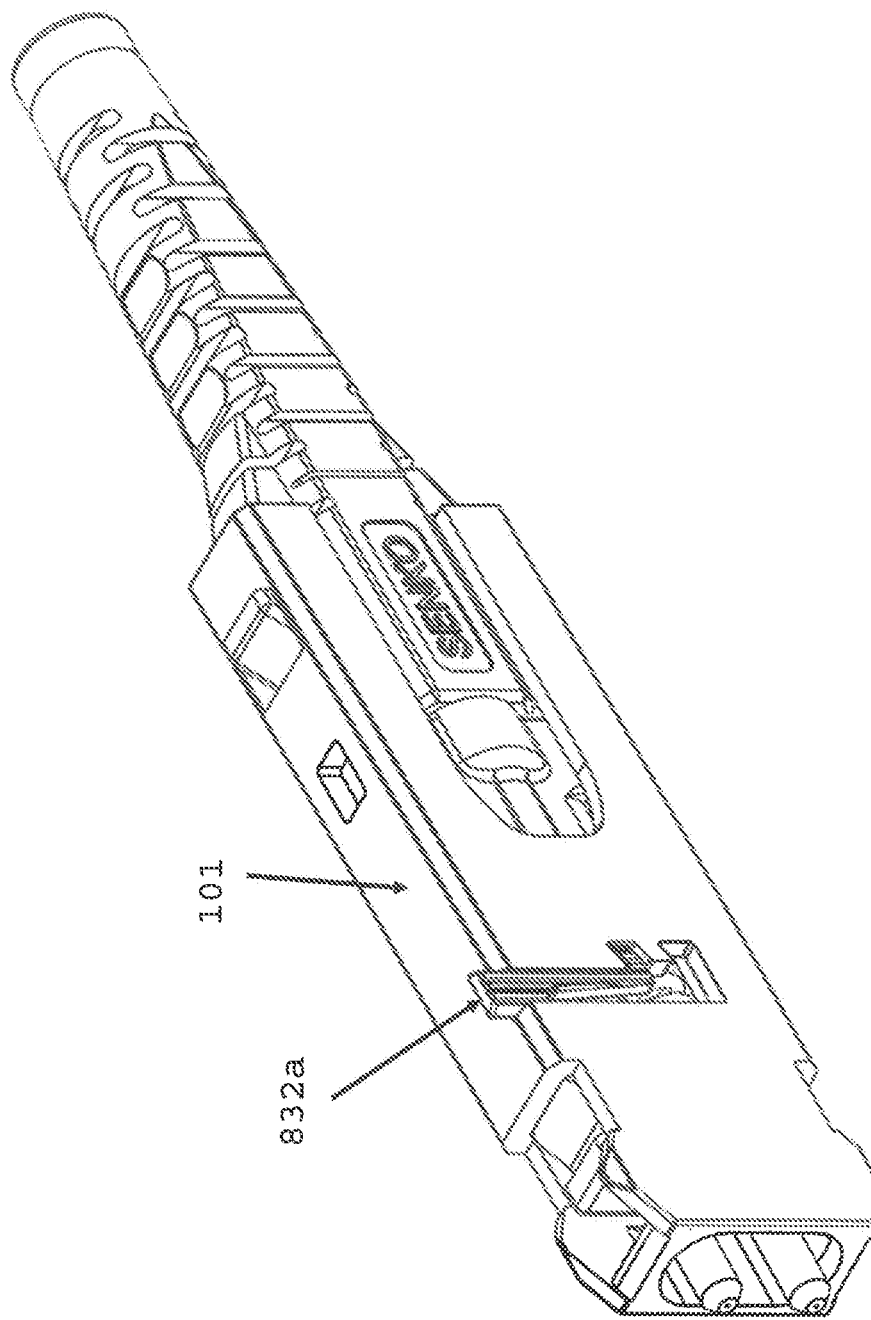

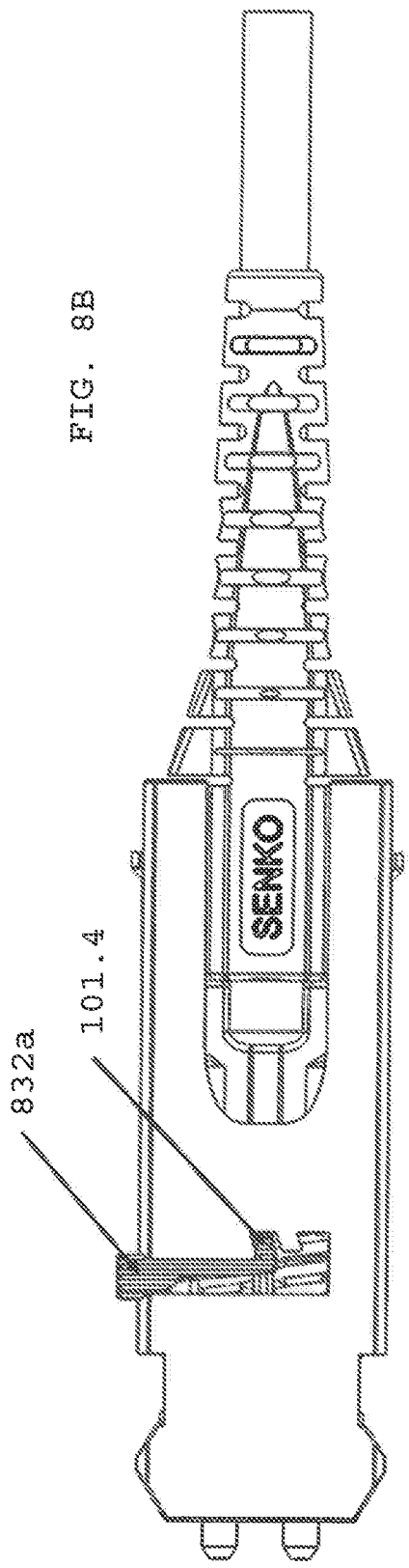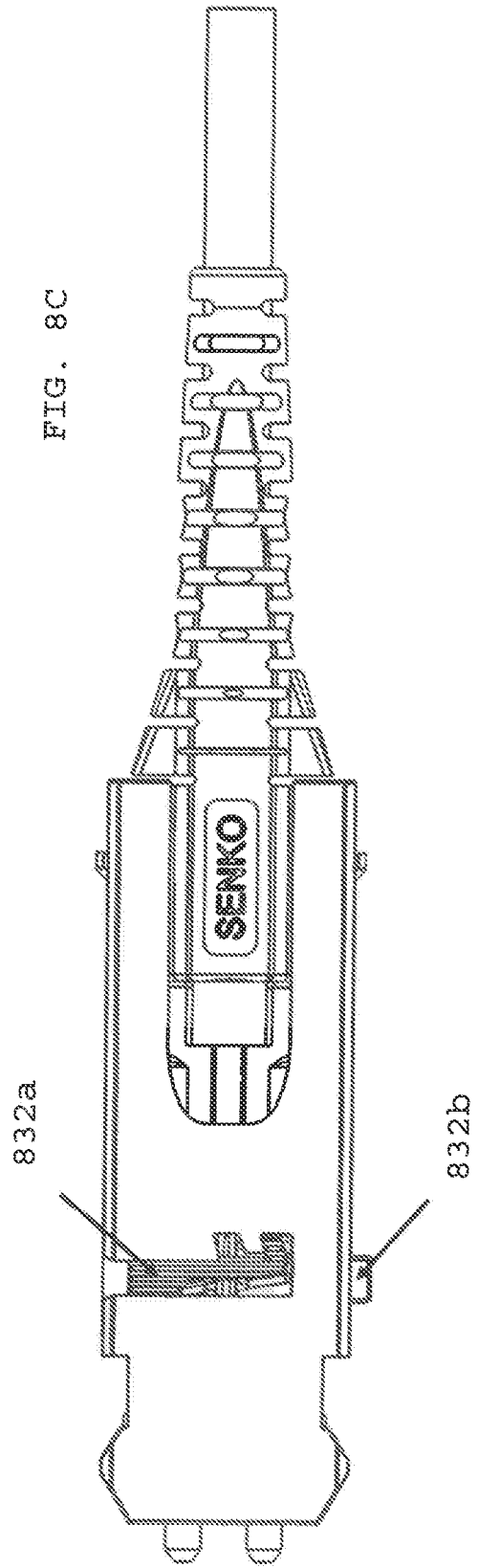

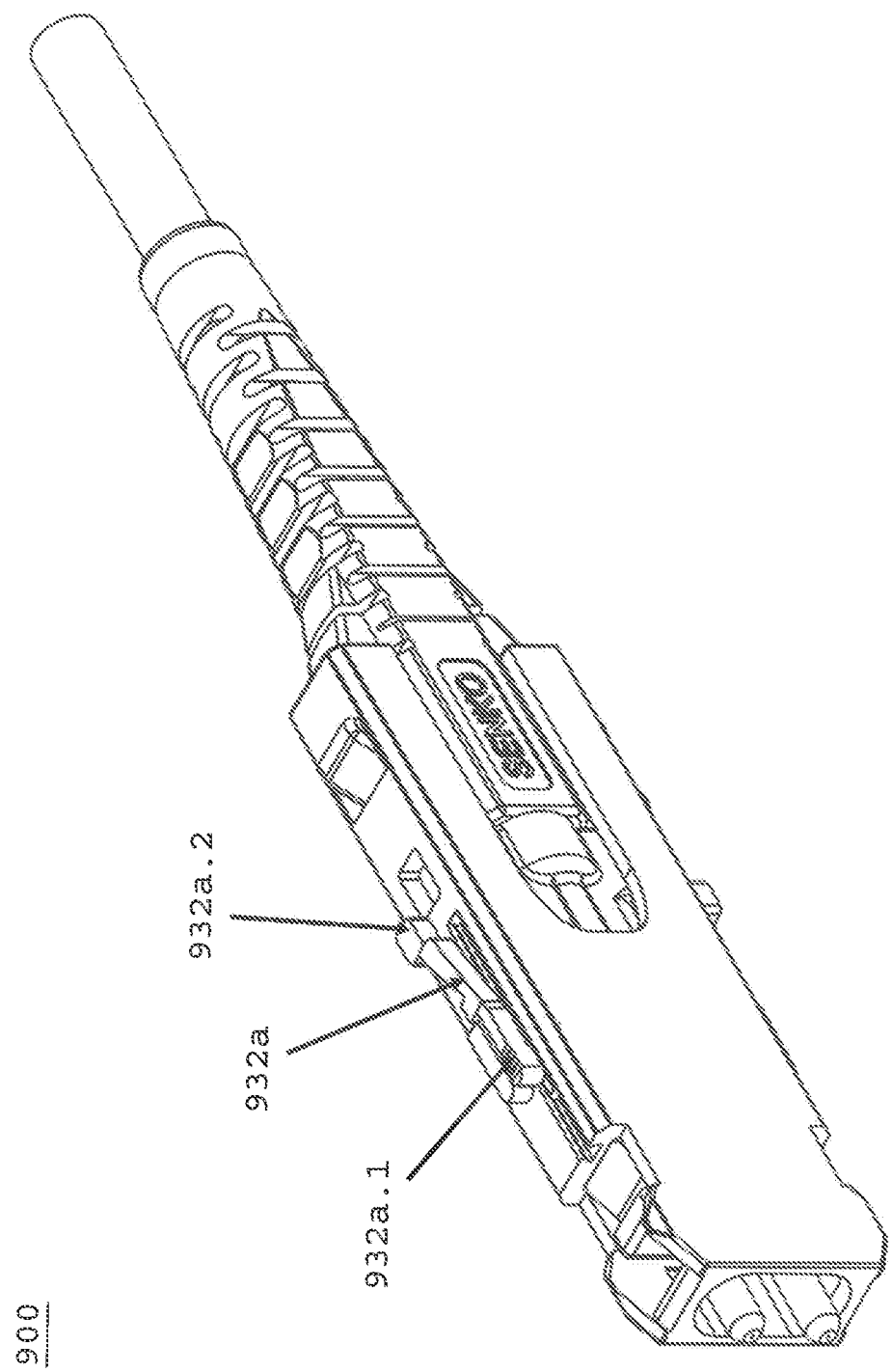

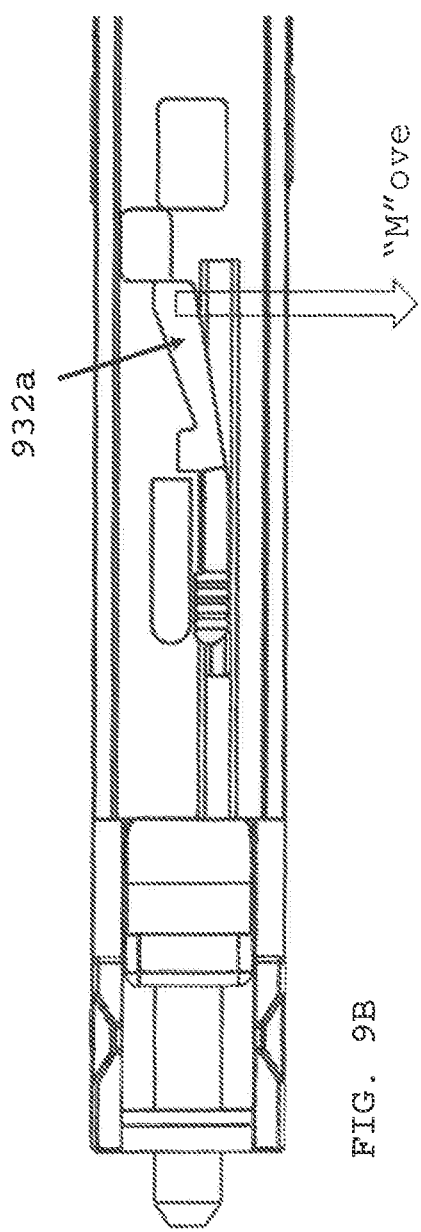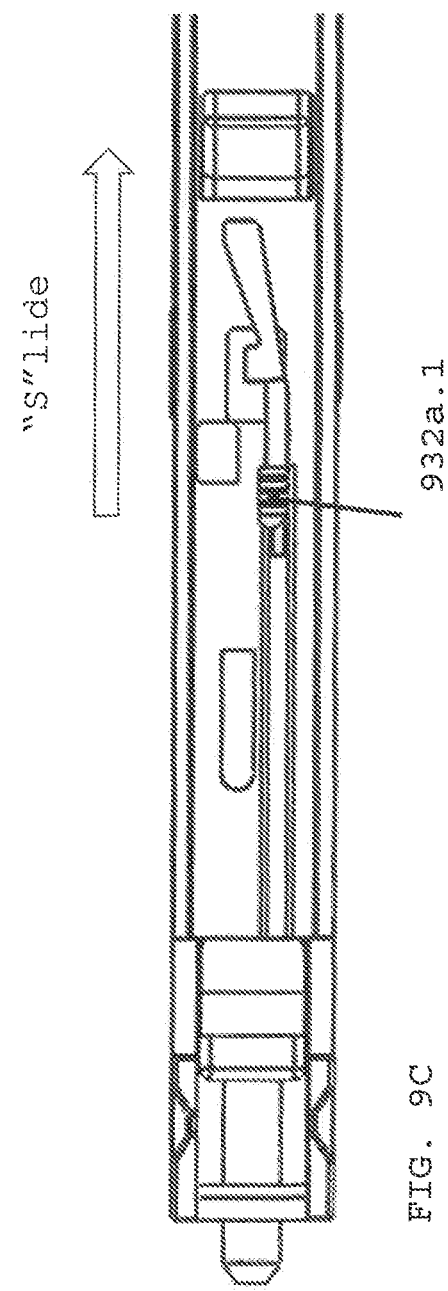

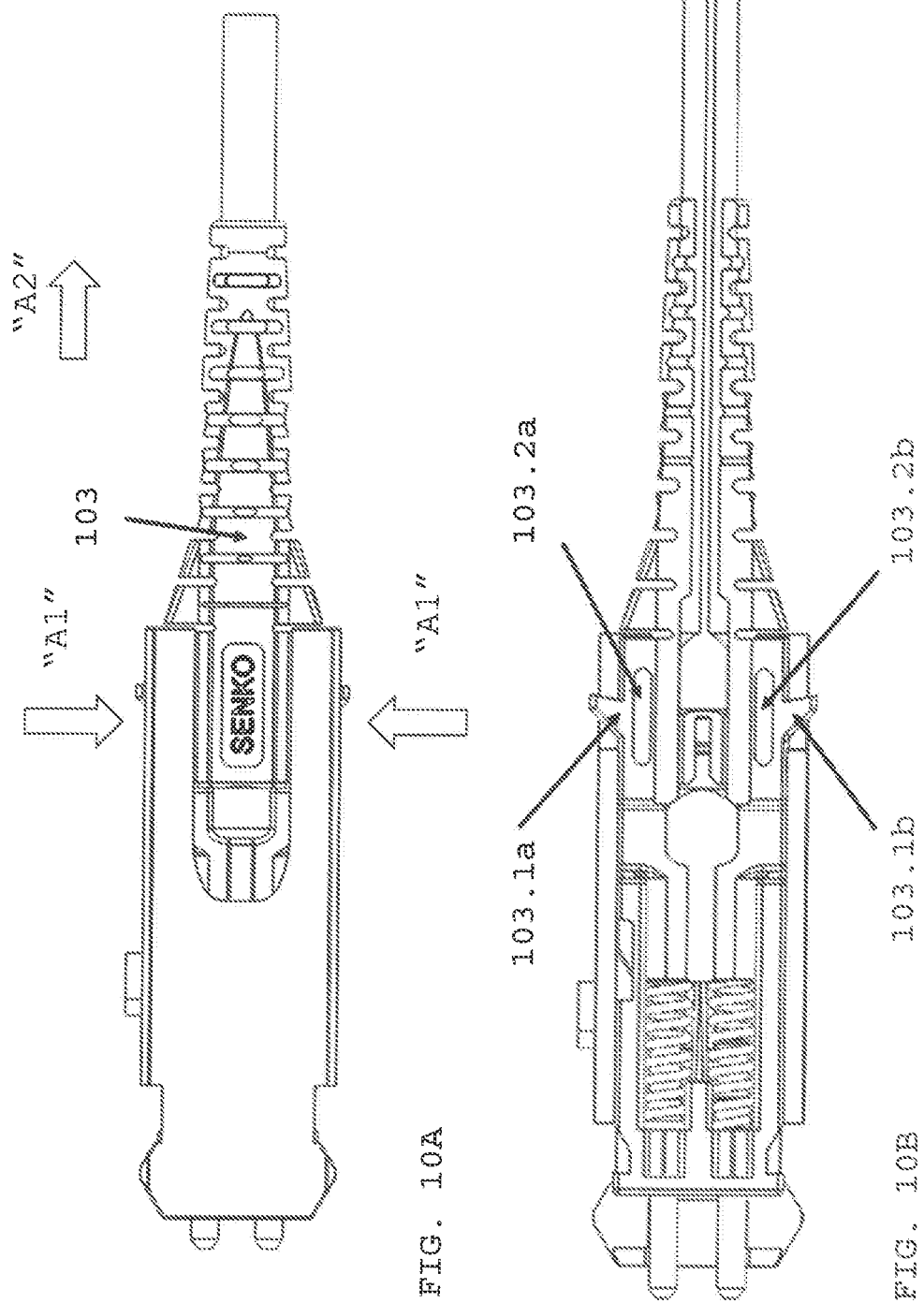

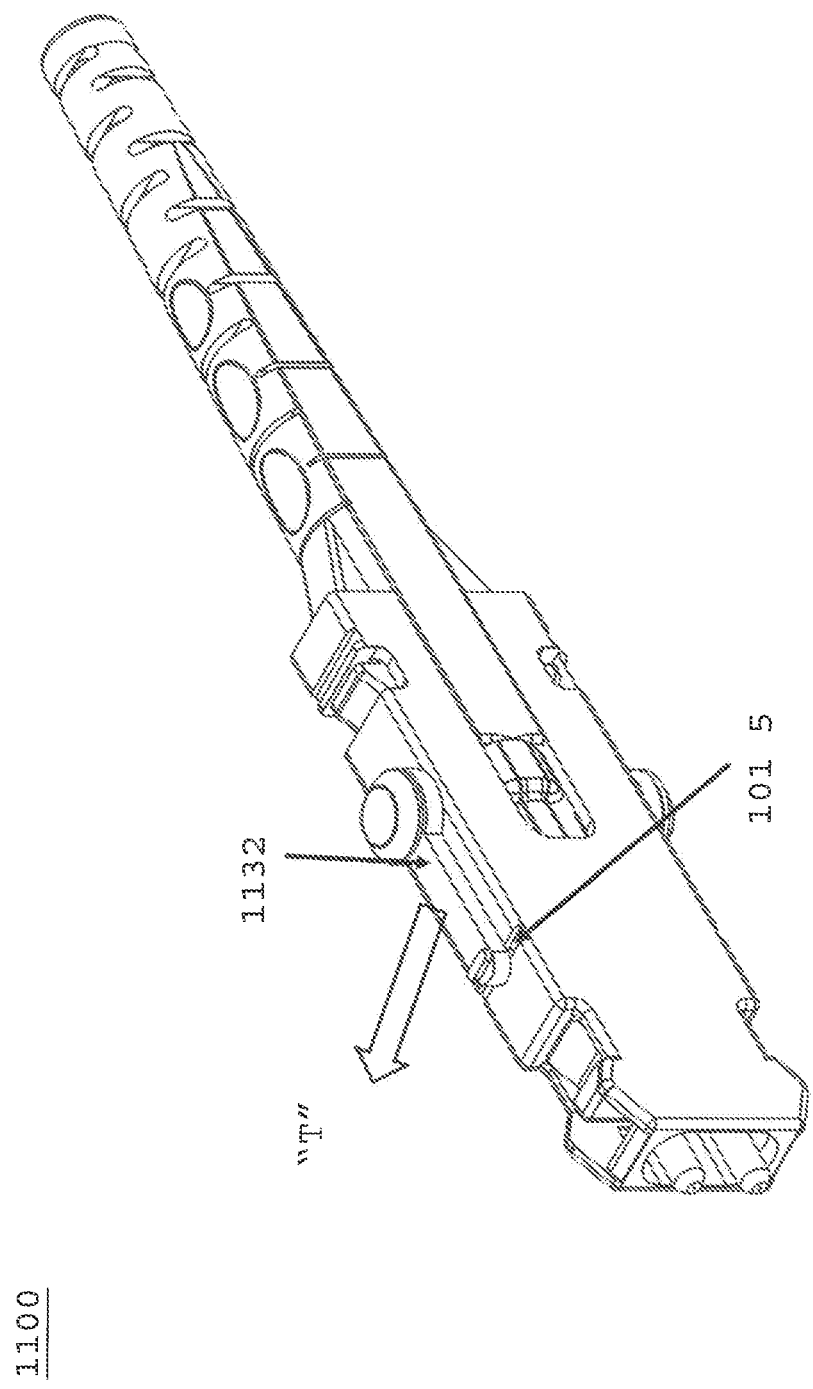

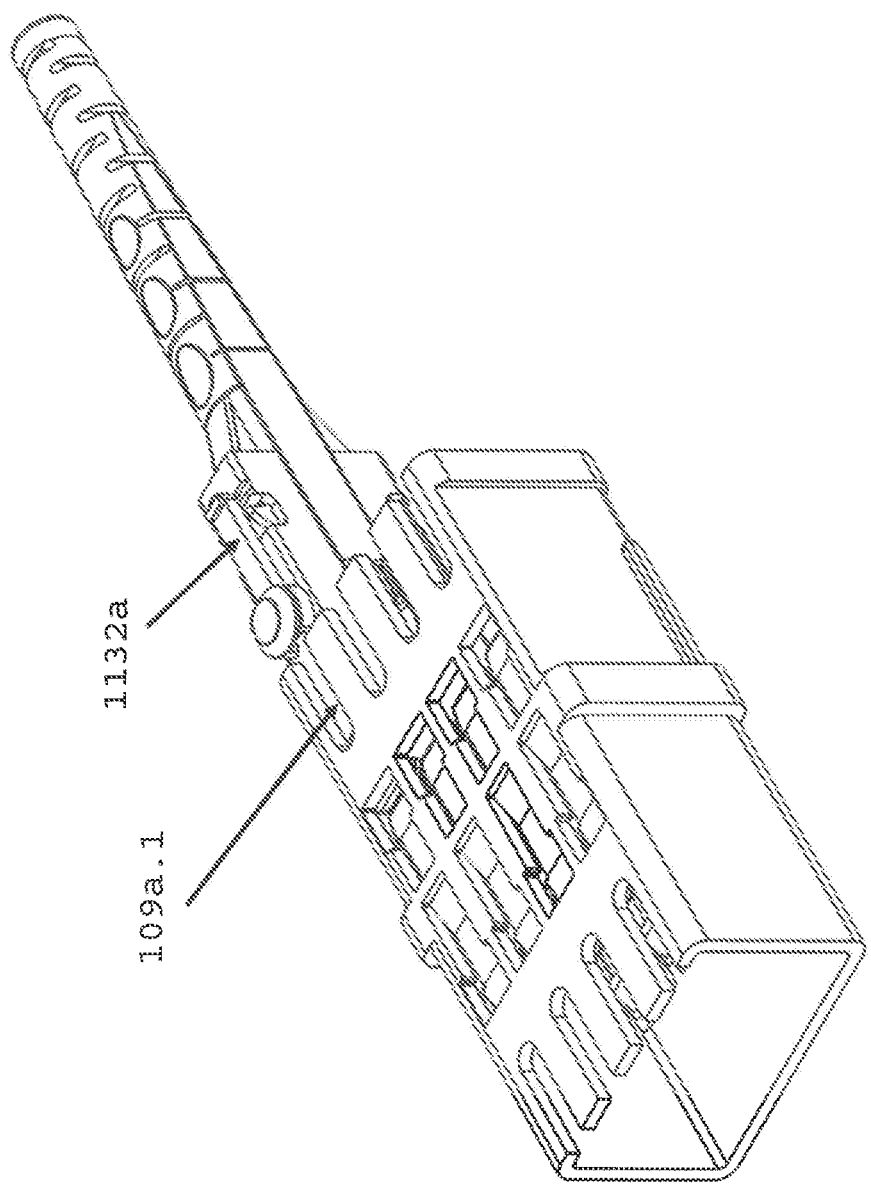

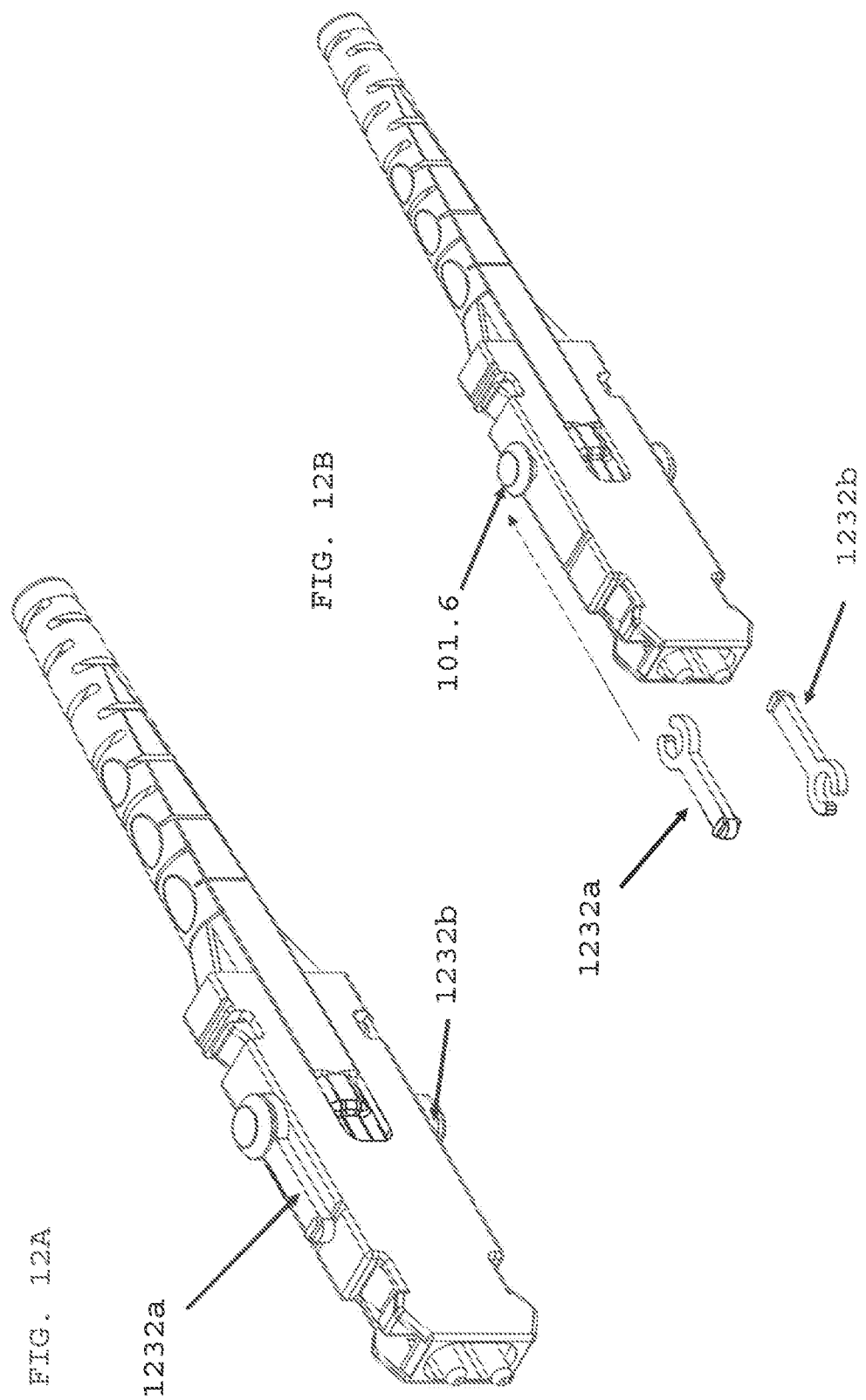

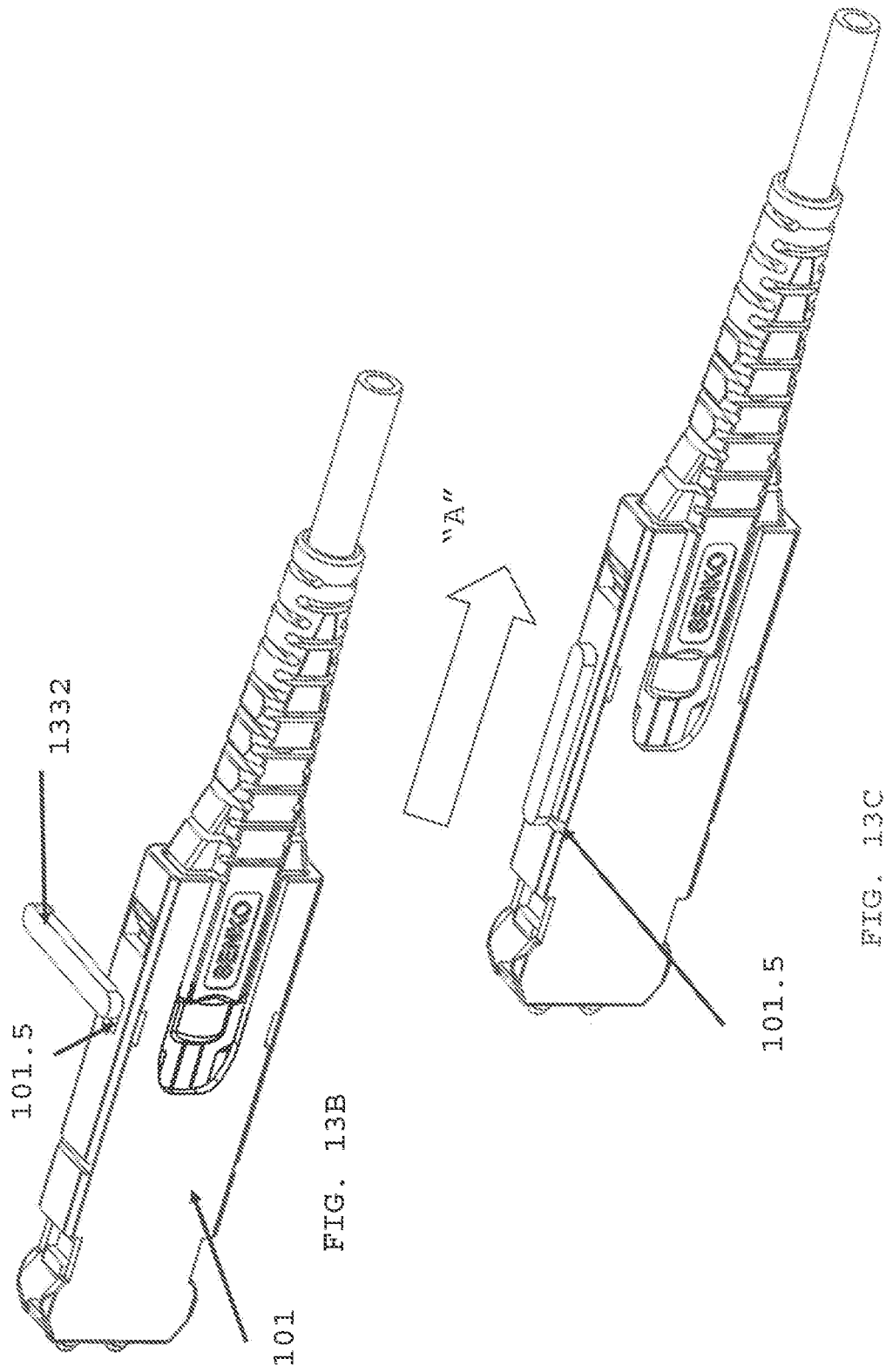

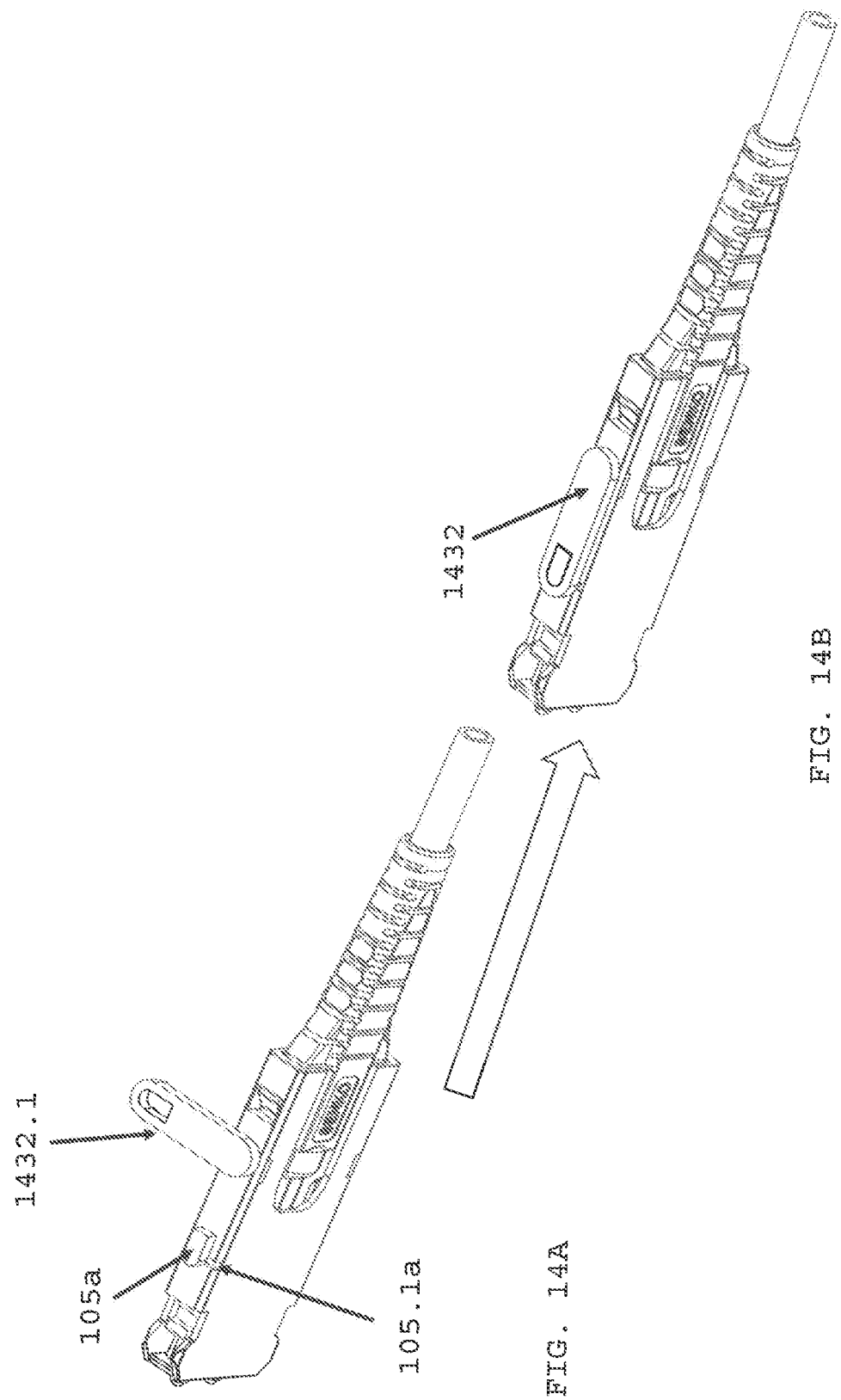

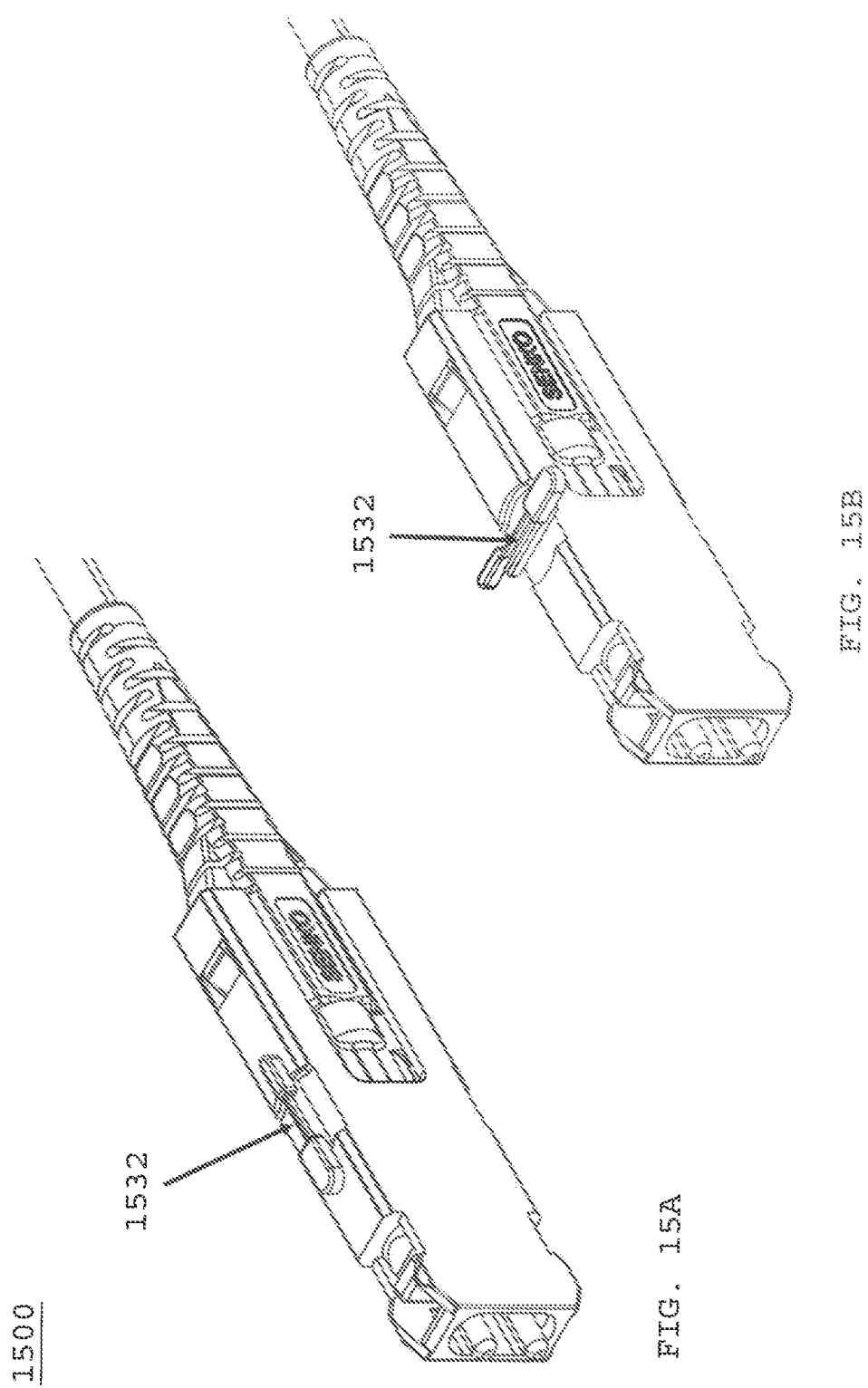

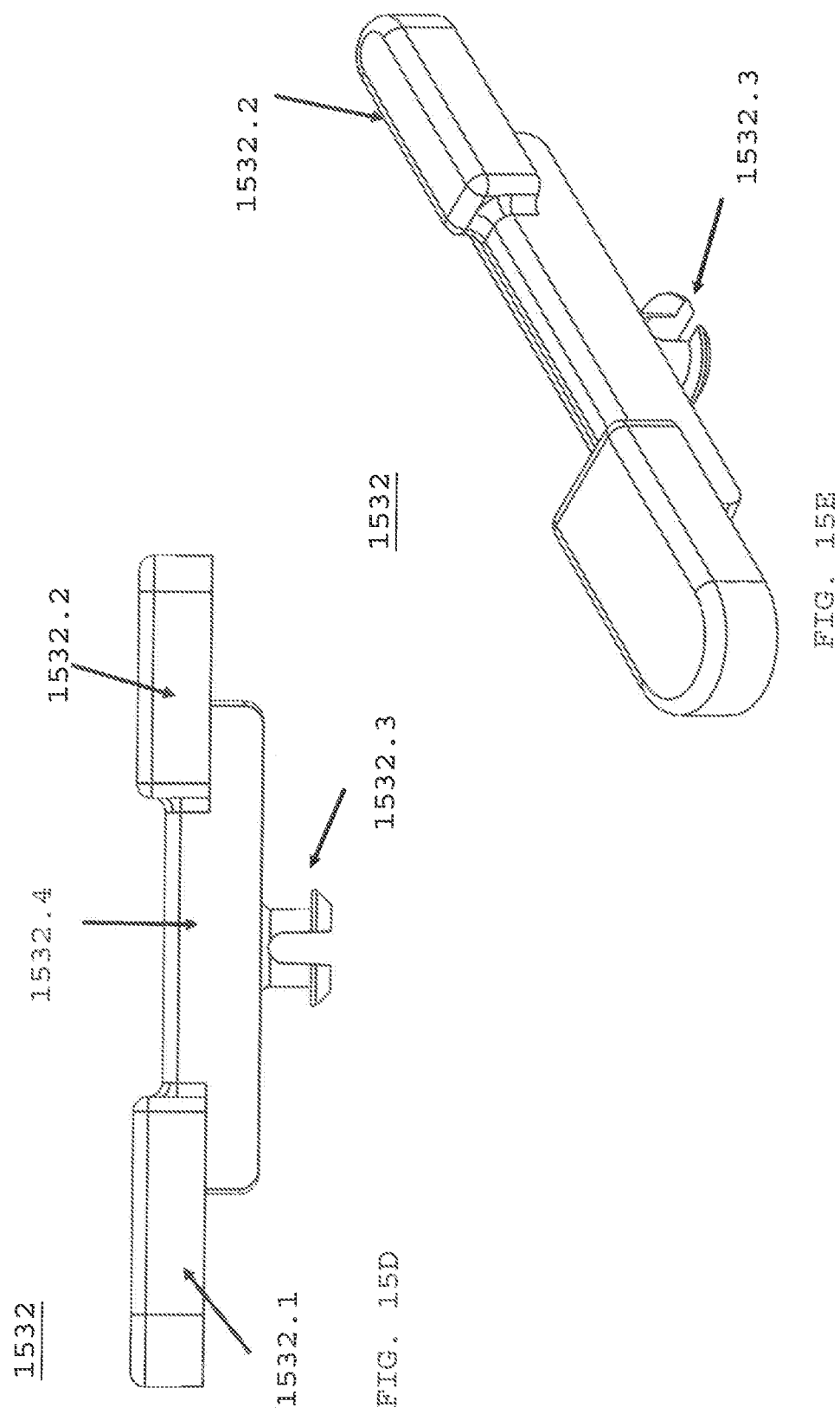

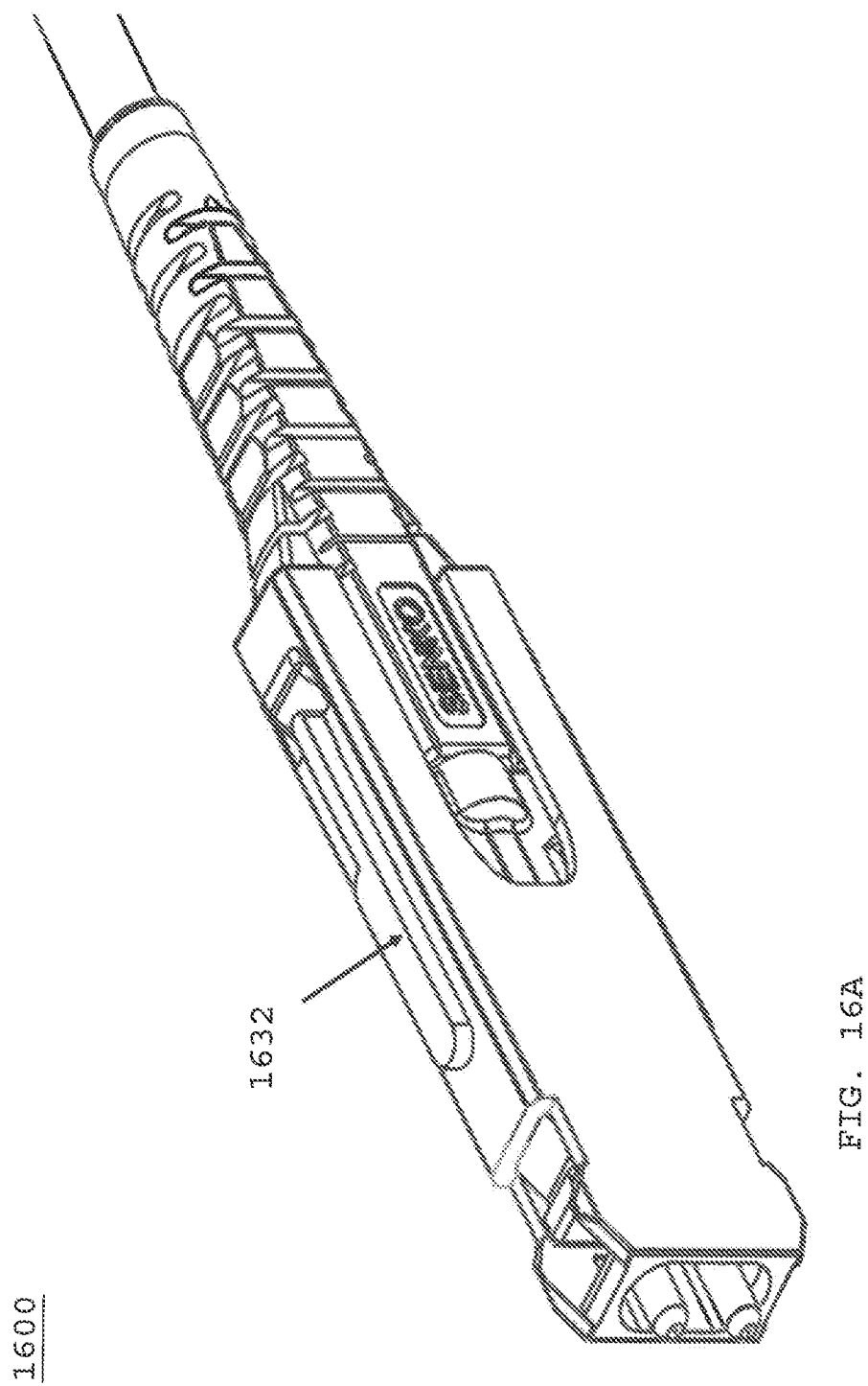

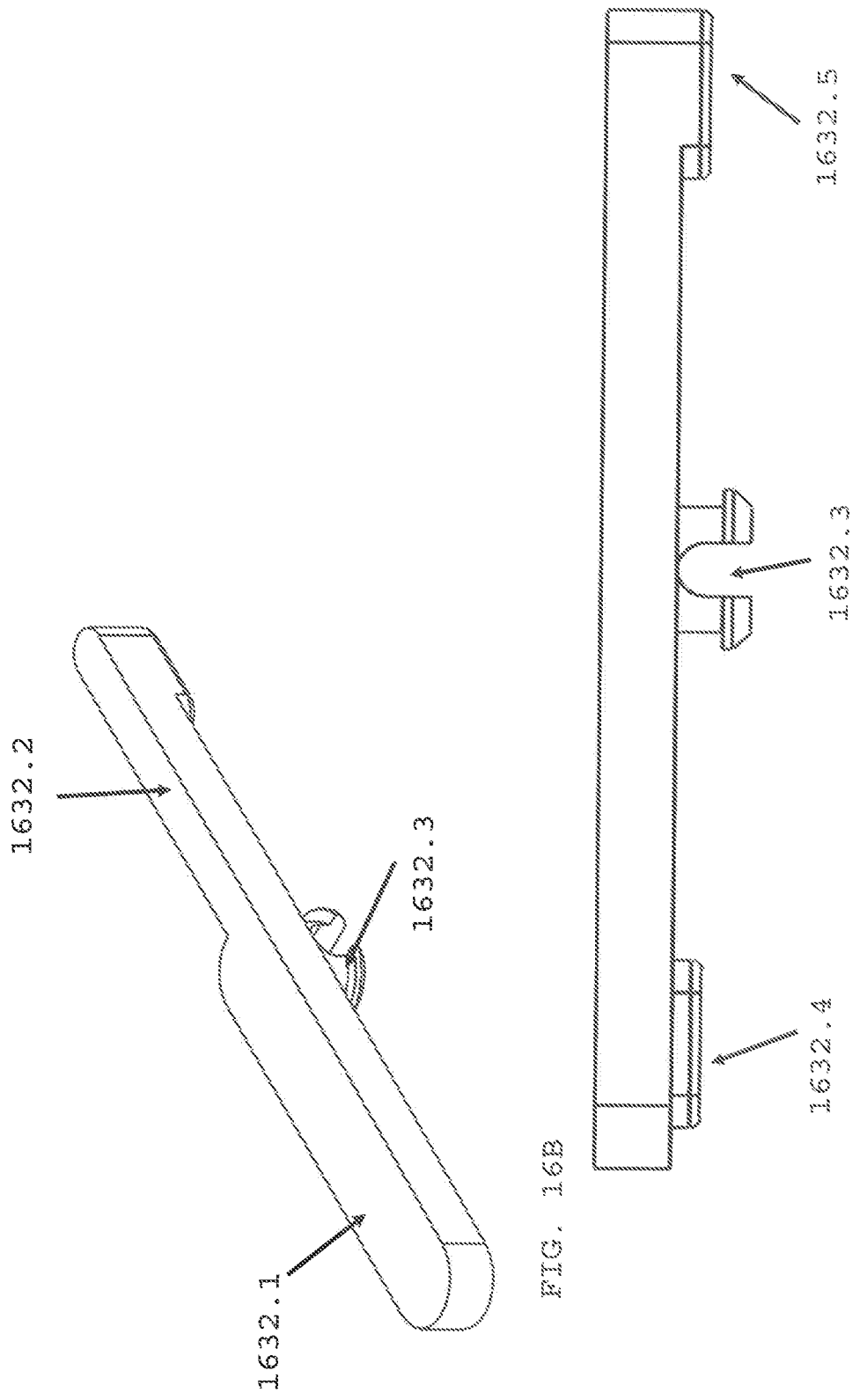

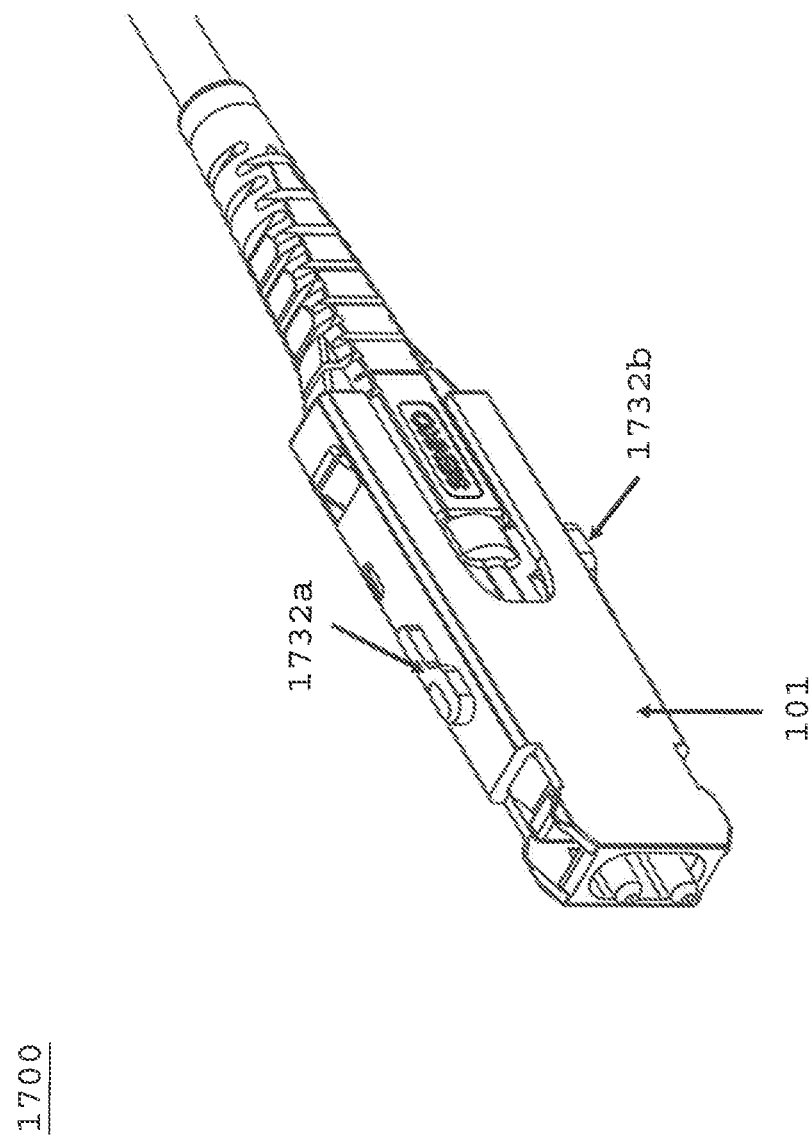

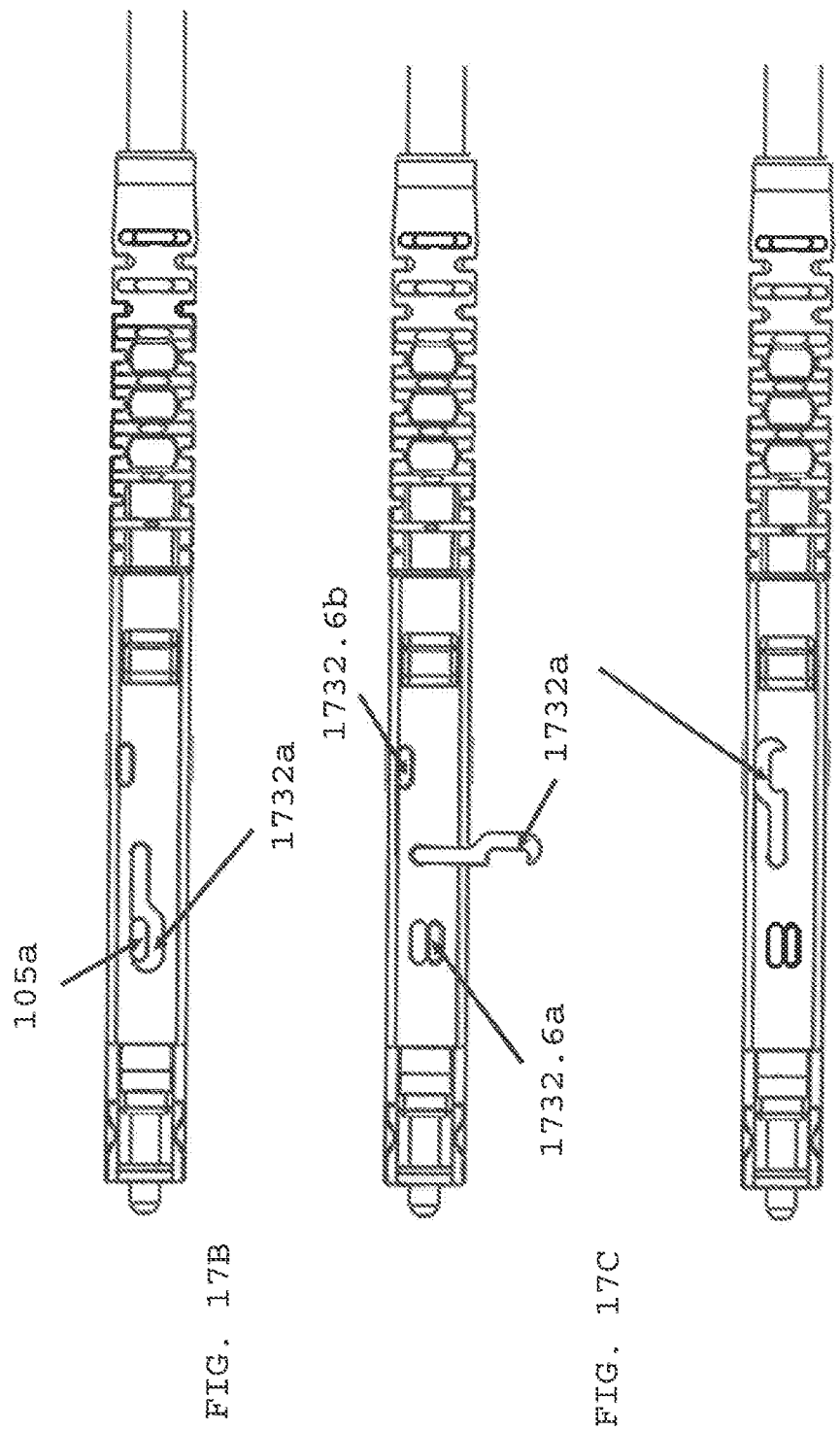

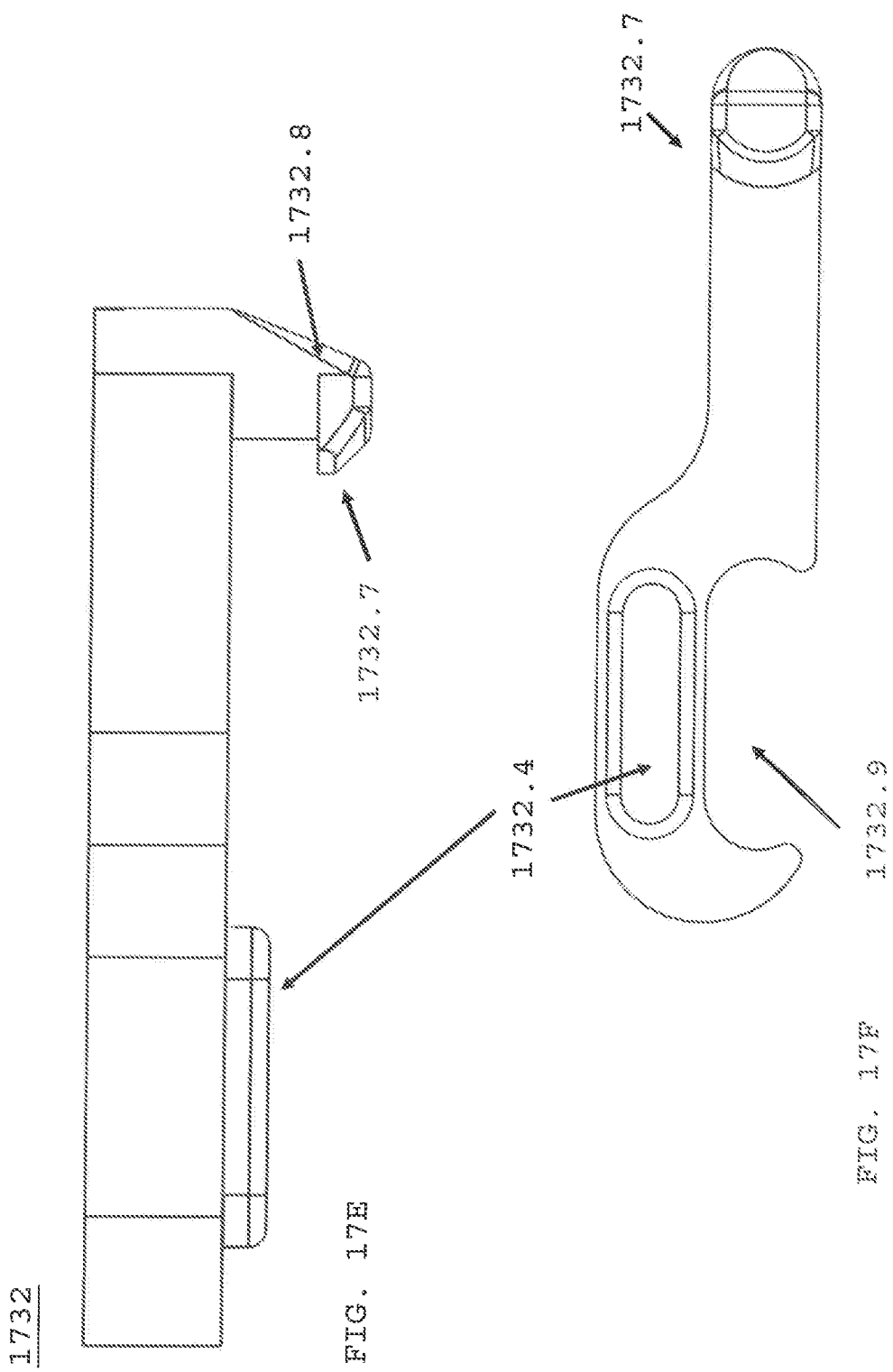

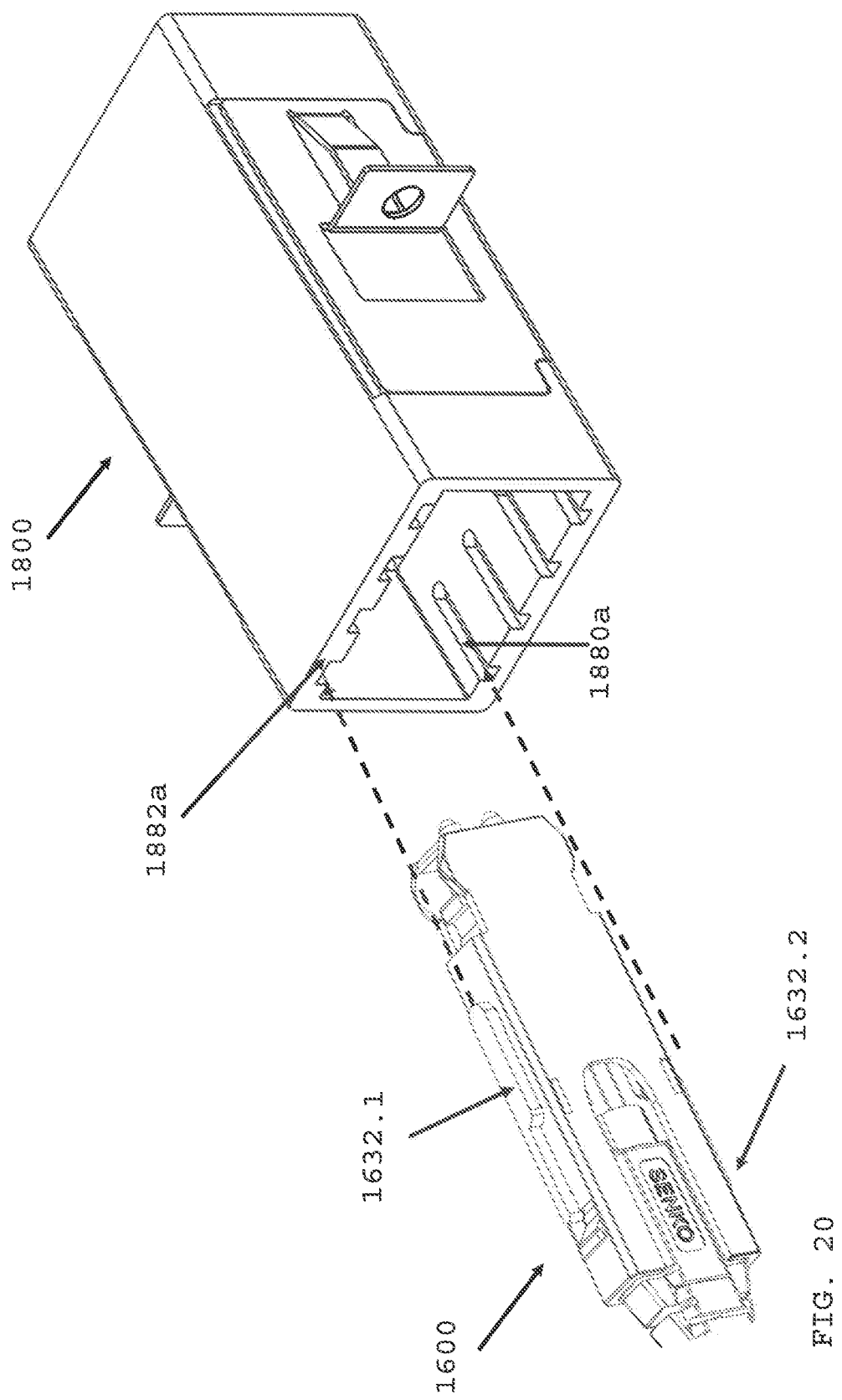

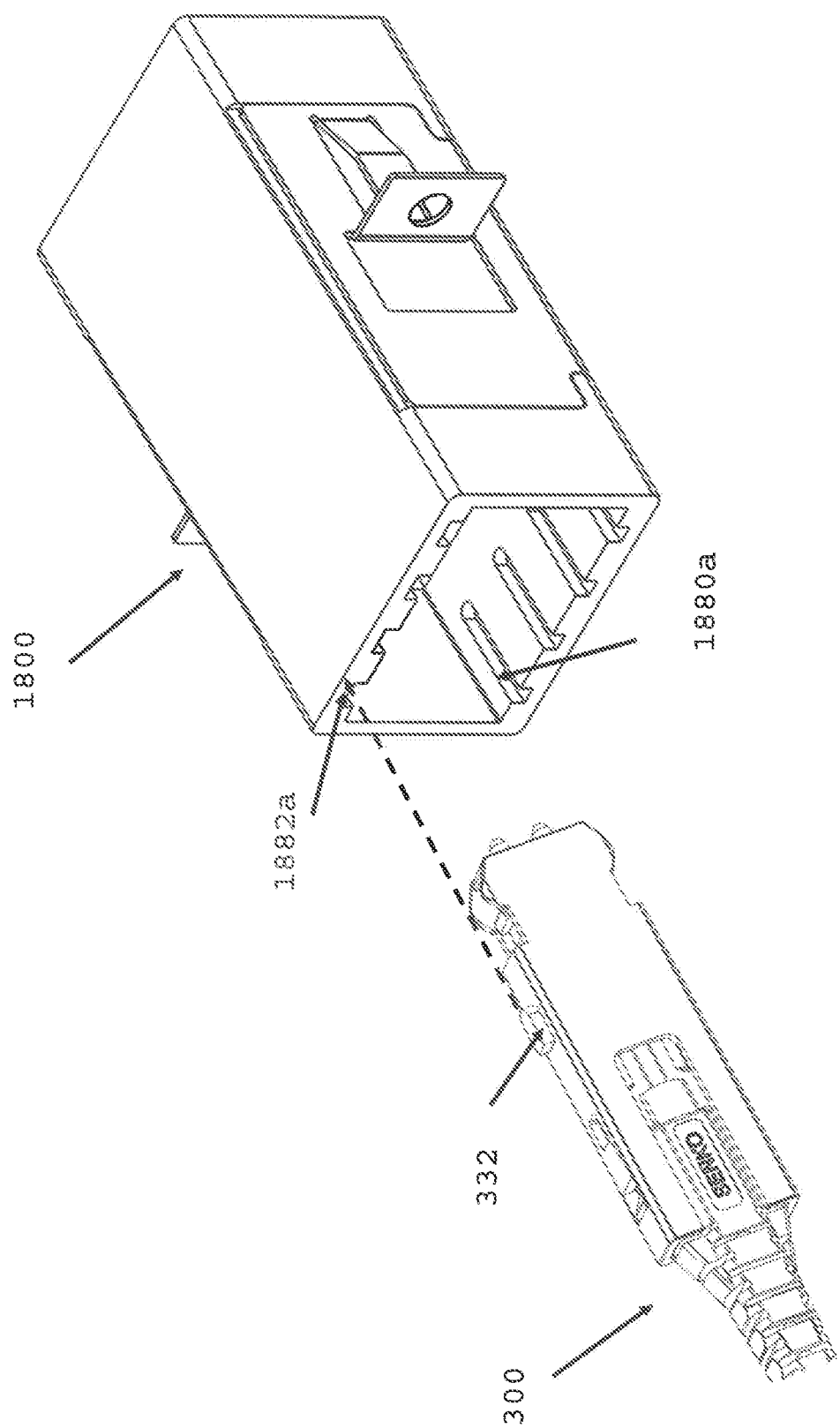

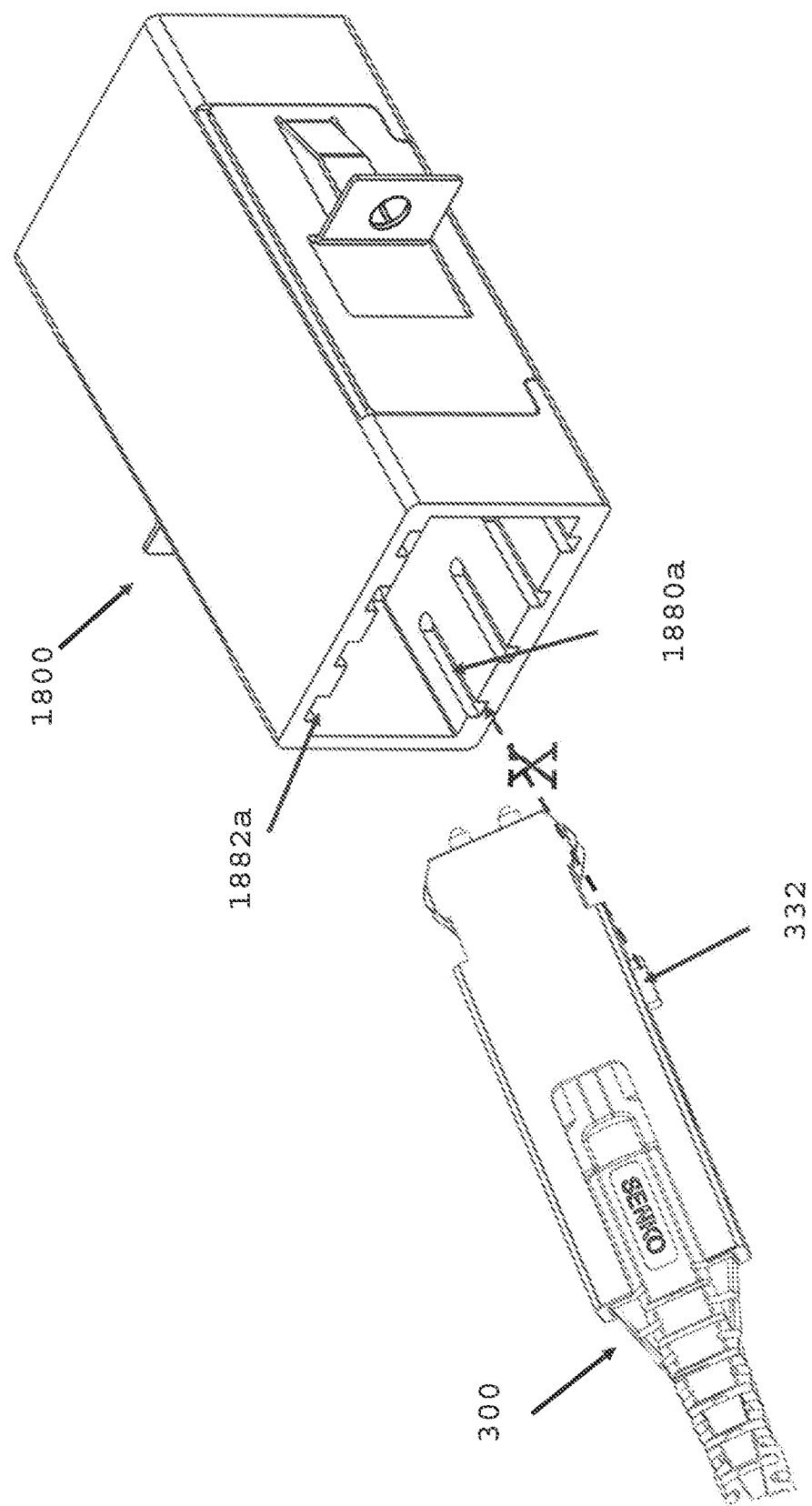

ULTRA-SMALL FORM FACTOR OPTICAL CONNECTORS WITH POLARITY CHANGE AND METHOD OF USE

CROSS-REFERENCE TO RELATED APPLICATIONS

This application claims to U.S. patent application 62/776,028 filed on Dec. 6, 2018, titled "Ultra-Small Form Factor Optical Connectors with Polarity Change and Method of Use".

FIELD OF THE INVENTION

The present disclosure relates generally to ultra-small form factor optical connectors and related connections within adapters and optical transceivers, where the connectors are configured for polarity change.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connections, still exists. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor pluggable transceiver footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) transceiver footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may not be effective at reducing support time and increasing the quality of service.

SUMMARY OF THE INVENTION

An optical connector holding two or more LC-type optical ferrules is provided. The optical connector includes an outer body, an inner front body accommodating the two or more LC-type optical ferrules, ferrule springs for urging the optical ferrules towards a mating receptacle, and a back body for supporting the ferrule springs. The outer body and the inner front body are configured such that four LC-type optical ferrules are accommodated in a small form-factor pluggable (SFP) transceiver footprint or eight LC-type optical ferrules are accommodated in a quad small form-factor pluggable (QSFP) transceiver footprint. A mating receptacle (transceiver or adapter) includes a receptacle hook and a housing with an opening that accommodates the receptacle hook in a flexed position as the optical connector makes connection with the mating receptacle by introducing the receptacle hook into an optical receptacle hook recess.

The connector optical ferrules perform a transmit or Tx and receive Rx function. When connector is inserted into an adapter or transceiver, the Tx, Rx of the connector must match the corresponding, opposing Tx, Rx otherwise the signal or information is lost. Because the connector ferrules are indistinguishable, the user upon insertion into a receptacle does not know which ferrule is Tx or Rx. So keying the connector prevents insertion into a receptacle incorrectly. The keys are removable or fixed to the connector outer housing, or integrated within the connector. A key is moved from a first position to a second position, to set polarity of the connector. A first key moved to a first position and a second key to second position would set the connector to a first polarity.

BRIEF DESCRIPTION OF THE DRAWINGS

FIG. 2B.1 depicts the connector of FIG. 2A in a first polarity configuration using a first hinge assembly.

FIG. 2B.2 is an exploded view of FIG. 2B.1 hinge assembly.

FIG. 2B.3 is an exploded view of alternative species of FIG. 2B.1 hinge assembly.

FIG. 2C.1 depicts the connector of FIG. 2A in a first polarity configuration using a second hinge assembly.

FIG. 2C.2 depicts moving the hinge of FIG. 2C.1 from a first position.

FIG. 2C.3 depicts the final positon of the hinge of FIG. 2C.1 in a second position.

FIG. 2C.4 is a cross-section of FIG. 2C.1 hinge assembly.

FIG. 3A is a third embodiment of changing polarity by removing and rotating the inner connector assembly.

FIG. 3B is a cross-section view of the polarity changeable connector of FIG. 3A.

FIG. 4A is a perspective view of a fourth embodiment of changing connector polarity using a slidable polarity switching keys with a safety lock.

FIG. 4B is a partial cross-section of the polarity changeable connector of FIG. 4A.

FIG. 4C is an exploded view of the connector of FIG. 4A.

FIG. 4D.1 is a top view of the connector of FIG. 4A.

FIG. 4D.2 is a side view of the connector of FIG. 4A.

FIG. 4D.3 is a bottom view of the connector of FIG. 4A.

FIG. 4D.4 is an opposite side view of the connector of FIG. 4D.2.

FIG. 4D.5 is a front view of the connector of FIG. 4A.

FIG. 4G.1 is a perspective view of the slidable key in a forward position, with a call-out depicting access opening to unlock/depress key for lateral movement.

FIG. 4G.2 is a cross-section depicting a safety lock for the slidable key of the connector in FIG. 4A, a first key in a first position.

FIG. 4H.1 is a perspective view of the slidable key of FIG. 4K.1 with the key moved distal or toward the rear of the connector housing, and with a call-out depicting a second access opening to unlock/depress key for lateral movement.

FIG. 4H.2 is a cross-section depicting a safety lock for the slidable key of the connector in FIG. 4A, a second key is in a second position.

FIG. 4I.1 is a cross-section view of the first key in a locked, forward position.

FIG. 4I.2 is a cross-section view of the first key being held proximal by safety lock.

FIG. 4I.3 is a cross-section view of a second key in a second position not held by safety lock.

FIG. 4I.4 is a cross-section view of steps to change connector polarity using safety lock.

FIG. 4J.1 is a cross-section top view of safety lock locking a first key in a proximal direction.

FIG. 4J.2 is a cross-section top view of safety lock during movement of both slidable polarity keys.

FIG. 4K.1 is a top view of first polarity key in a distal position.

FIG. 4K.2 is a bottom view of second polarity key in a proximal position.

FIG. 4L is a cross-section view of a first slidable key locked in a distal positioned with safety lock, and a second sliceable key locked in a proximal position to provide a first or second polarity.

FIG. 5C is a cross-section of FIG. 5A connector.

FIG. 5D.1 is a perspective view of FIG. 5A connector in a first polarity position.

FIG. 5D.2 is a perspective view of FIG. 5A connector in a second polarity position.

FIG. 6A is a perspective view of a sixth embodiment of a polarity changeable connector having a slidable key in a first position.

FIG. 6B is a perspective view of the connector of FIG. 6 with key in a second position.

FIG. 7 is a perspective view of a seventh embodiment of a polarity changeable connector having a slidable key.

FIG. 8A is a perspective view of an eight embodiment of a polarity changeable connector having a slidable key.

FIG. 8B is a side view of FIG. 8A connector with the slidable key extended in a first positon.

FIG. 8C is a side view of FIG. 8A connector with the slidable key retracted in a second position.

FIG. 9A is a perspective view of a ninth embodiment of a slidable key to change polarity on a LC type connector.

FIG. 9B is top view of the key of FIG. 9A connector in a proximal or forward position.

FIG. 9C is a bottom view of the key of FIG. 9A connector in a distal or rearward position.

FIG. 10A is a side view of a tenth embodiment of a changeable polarity connector.

FIG. 10B is a cross-section view of the FIG. 10A.

FIG. 11A is a perspective view of an eleventh embodiment of a polarity changeable connector, this embodiment has a rotatable polarity key.

FIG. 11D is the connector of FIG. 11A with key in a second position in a receptacle.

FIG. 12A is a perspective view of a twelfth embodiment of a polarity changeable connector, this embodiment has rotatable polarity keys.

FIG. 12B is a perspective view of the connector of FIG. 12A with keys removed.

FIG. 13B is a perspective view of the connector polarity key of FIG. 13A being rotated into a first position.

FIG. 13C is a perspective view of the connector polarity key fully rotated and secured into the first position.

FIG. 14A is a perspective view of a fourteenth embodiment of a polarity changeable connector with a key securable to an alignment key on connector housing.

FIG. 14B is a perspective view of the connector of FIG. 14A with the key secured in a first position.

FIG. 15A is a perspective view of a fifteenth embodiment of a polarity changeable connector with a secured, rotatable key in a first polarity position.

FIG. 15B is a perspective view of rotating the key from a first position in FIG. 15A to a second position in FIG. 15C.

FIG. 15D is a side view of polarity key used with connector of FIG. 15A.

FIG. 15E is an offset view of the key of FIG. 15D.

FIG. 16A is another embodiment of a rotatable polarity key used on a LC duplex type fiber optic connector.

FIG. 16B is a perspective view of the polarity key used on the connector of FIG. 16A.

FIG. 16C is a side view of the key of FIG. 16B.

FIG. 17A is a perspective view of a rotatable key secured to one side of a connector housing.

FIG. 17B is a top view of FIG. 17A.

FIG. 17C is a top view of rotating key to a second position.

FIG. 17D depicts key of FIG. 17A in a second polarity position from FIG. 17A.

FIG. 17E is a perspective side view of a polarity change key used in FIG. 17A.

FIG. 17F is a top view of FIG. 17E.

FIG. 20 is a perspective view of connector of FIG. 16A just prior to a successful insertion into FIG. 18 adapter.

FIG. 21 depicts connector of FIG. 3A properly oriented to be inserted into adapter of FIG. 18.

FIG. 22 depicts connector of FIG. 3A not properly oriented and cannot be inserted into adapter of FIG. 18.

DETAILED DESCRIPTION

This disclosure is not limited to the particular systems, devices and methods described, as these may vary. The terminology used in the description is for the purpose of describing the particular versions or embodiments only, and is not intended to limit the scope.

The following terms shall have, for the purposes of this application, the respective meanings set forth below.

A connector, as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, a CS connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide a remote release mechanism such that a user can remove cable assembly connectors that are closely spaced together on a high density panel without damaging surrounding connectors, accidentally disconnecting surrounding connectors, disrupting transmissions through surrounding connectors, and/or the like. Various embodiments also provide narrow-pitch LC duplex connectors and narrow-width multi-fiber connectors, for use, for example, with future narrow-pitch LC SFPs and future narrow width SFPs. The remote release mechanisms allow use of the narrow-pitch LC duplex connectors and narrow-width multi-fiber connectors in dense arrays of narrow-pitch LC SFPs and narrow-width multi-fiber SFPs.

Various embodiments disclose one or more polarity changeable keys secured or removable from an outer housing of a duplex type LC connector. A first key in a first position, and a second key in a second position, the first and second position are not the same, the connector is in a first polarity. When the second key is moved to the first position, and the first key to a second position, the connector is in a second polarity.

Figure 1A:
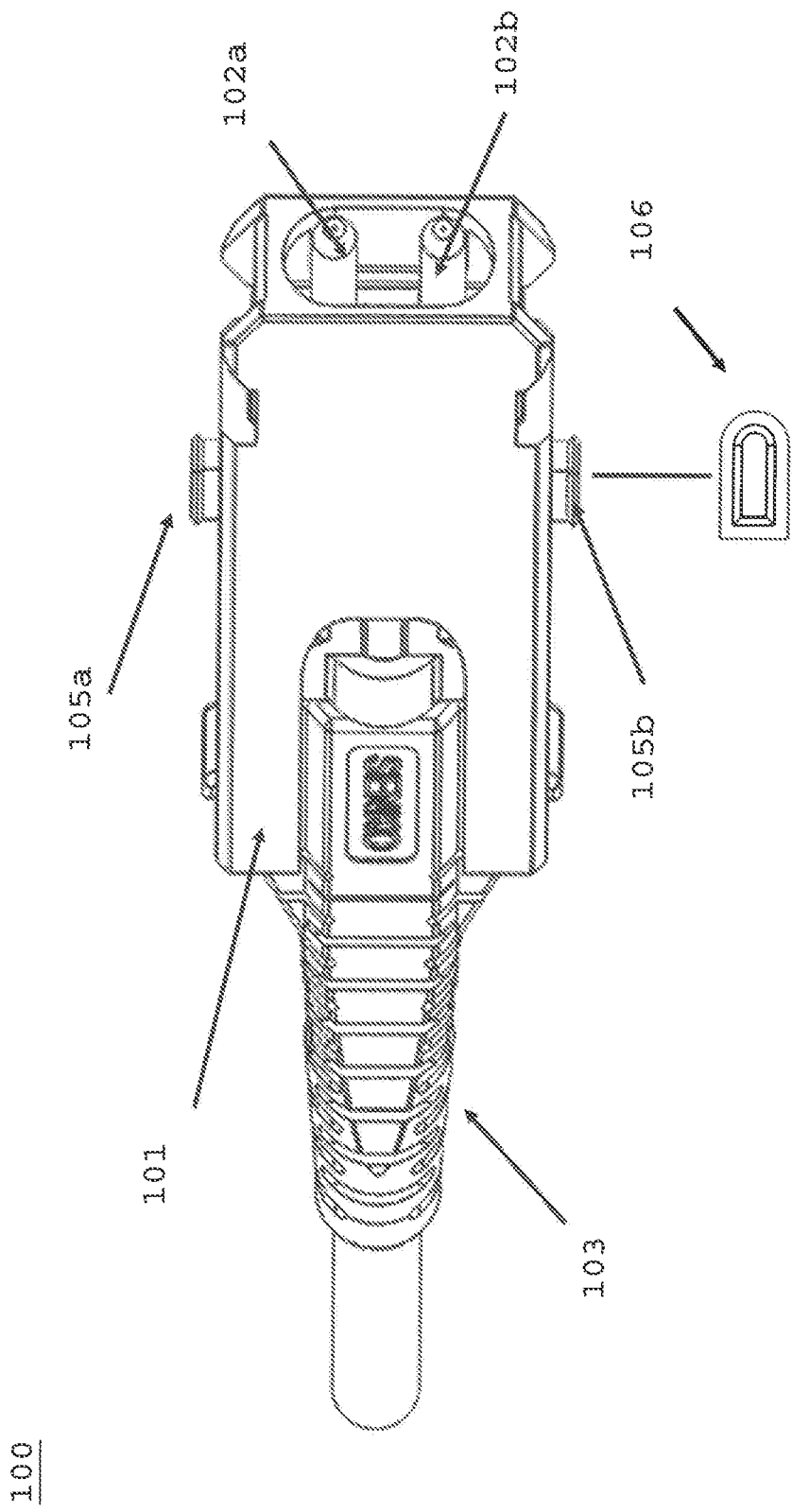
FIG. 1A is a perspective view of a prior art standard duplex type LC connector SFP with a removable polarity key according to a first embodiment of the present invention.
Figure 1B:
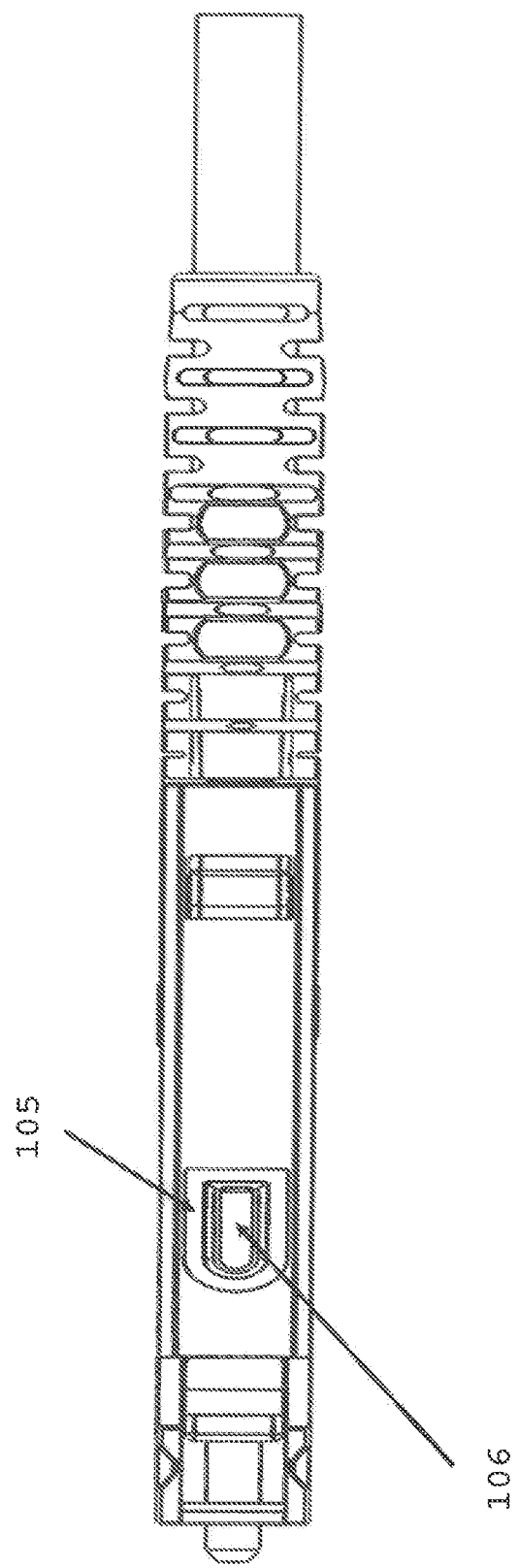
FIG. 1B is a top view of the connector of FIG. 1A.

FIG. 1A shows a perspective view of a duplex LC type connector 100 with two ferrules at a front or proximal end of the connector. Connector outer body or housing contains an inner assembly 115 (refer to FIG. 3A), that comprises a back body, ferrule biasing springs, ferrules (102a, 102b) crimp ring, front body and cable boot 103. Outer housing 101 has a first alignment key 105a and a second alignment key 105b. Removable key attached to either first or second alignment key (105a, 105b) is a polarity key 106, according to the present invention. In operation, a user would lift off or remove polarity key 106 from alignment key (105a or 105b), and this would change the connector from a first polarity to a second polarity after reinserting key 106 on opposing alignment key (105a, 105b). FIG. 1B depicts a top view of connector 100 with polarity key 106 secured to alignment key 105a or alignment key 105b. Connector polarity means a first ferrule and a second ferrule are defined to transmit (Tx) and to receive (Rx) a light signal. The light signal represents information. So to make a connection between opposing ferrules, the first ferrule is positioned directly opposite a third ferrule that is configured also as transmitting ferrule. The second ferrule is positioned directly opposite a fourth ferrule that is configured as a receiving ferrule. Since each ferrule has an optical fiber therein, the fiber contains the light signal and when operating the light signal moves between the opposing ferrules to another part of a fiber optic network. If the first ferrule opposes the fourth ferrule, the signals do not transmit and connection between the network portions defined by the two sets of ferrules is not made.

Figure 2A:
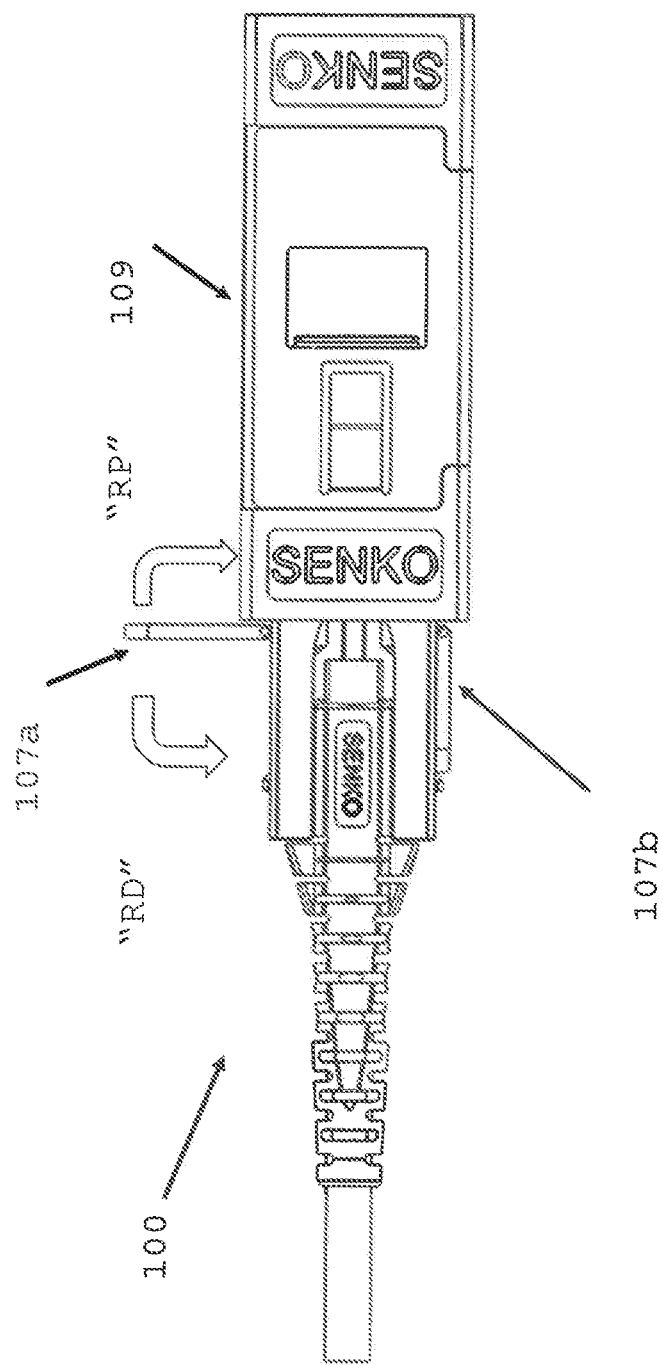
FIG. 2A is perspective view of a second embodiment changing polarity using a hinged key.

FIG. 2A depicts polarity change key (107a, 107b) that is hinged to connector 100 outer housing. Connector 100 is secured within a receptacle of adapter 109. Hinged polarity 107a or hinged polarity key 107b may be rotated distal "RD" or rotated proximal "RP", to configure the connector 100 polarity. Connector 100 is in a first polarity when hinged key 107a is "RP" and hinged key 107b is "RD". A second polarity is when hinged key 107b is "RP" and hinged polarity key 107a is "RD". FIG. 2B.1 depicts connector 100 in a first or second polarity configuration, with hinged keys (107a, 107b) movable on a pin 111. The pin secures hinged key 107 to connector outer housing 101. FIG. 2B.2 depicts hinged polarity key 107 prior to insertion on ball joint 113 of swivel assembly 112. FIG. 2B.3 depicts alternative swivel joint 112' with ball joint 113 on hinged polarity key 107. Recess 107' receives ball joint 113 as depicted in dotted line. FIG. 2C.1 depicts hinged polarity key 107a rotatable about swivel joint 112. FIG. 2C.2 depicts swivel joint 112. Hinged polarity key 107a has pin 111 that rotates within swivel joint 112, to rotate hinged key 107a from a "RP" to a "RD" position at connector outer housing. FIG. 2C.3 depicts hinged polarity key 107a fully rotated distally "RD" at outer housing 101. Hinged polarity key 107a could be hinged polarity key 107b without departing from the scope of the invention. FIG. 2C.4 depicts hinged polarity key 107a in a first polarity position. When key is lifted, as shown in FIG. 2C.2, polarity key 107a rotates down housing structure 101.1 into opening 101.2 to avoid snapping polarity key 107a out of swivel joint 112.

FIG. 3A depicts lifting "L" (in direction of arrow "L") housing 101, which removes housing 101 from boot hooks (117a, 117b) (as shown in FIG. 3B). Once housing 101 is removed along "R", inner assembly 115 can be removed, rotated 180 degrees and inserted back into housing 101.

Figure 11B:
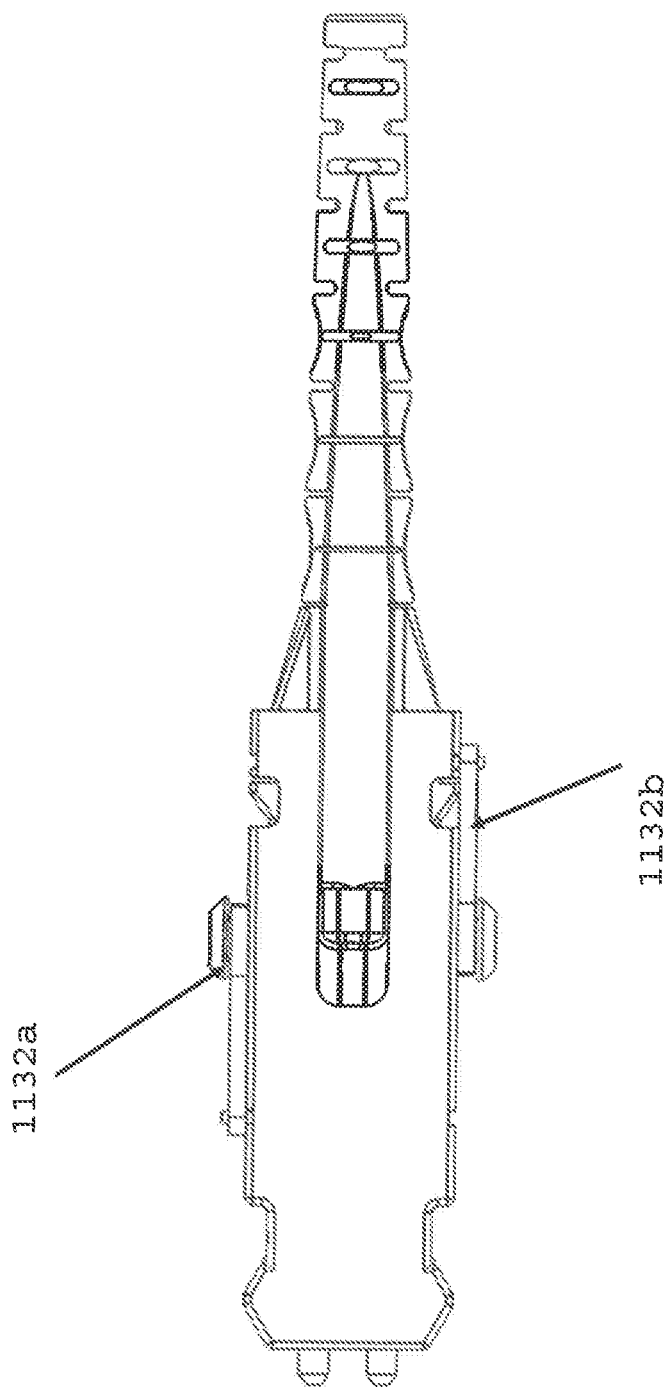
FIG. 11B is side view of the connector of FIG. 11A in a first polarity.
Figure 11C:
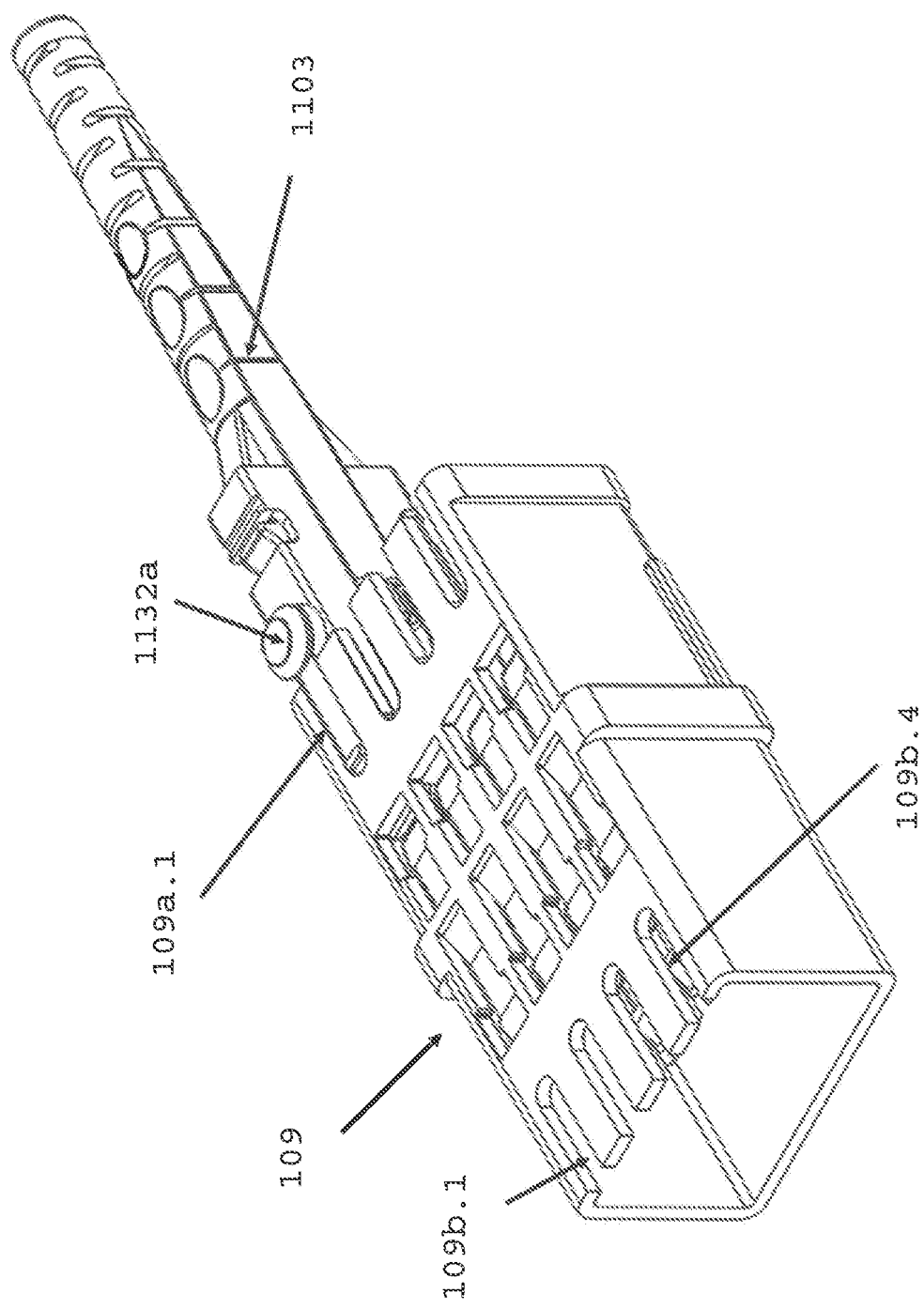
FIG. 11C is the connector of FIG. 11B in a receptacle.

FIG. 4A depicts a fourth embodiment of the invention using one or more slidable polarity keys to change connector polarity. Connector 400 comprises inner assembly 115, cable boot 103, one or more polarity change keys (432a, 432b), and a polarity control lock 430. Cable boot 103 releases connector 400 from an adapter. Referring to FIG. 21 below, after connector 300 is inserted into adapter port, a user would pull on cable boot 103 to remove connector from the adapter port. Referring to FIG. 11B, connector 1100 of FIG. 11A would be released from the adapter shown in FIG. 11C by pulling on cable boot 1103. Referring to FIG. 4B is a cross-section of FIG. 4A, with like numerals as in FIG. 4A. FIG. 4B depicts flexible locking wing 433a that secures polarity change key 432a within proximal opening 434a, when the key is in a forward position. Distal opening 435a secures polarity key 432a in a distal position.

FIG. 4C is an exploded view of connector 400. Cable boot 403, polarity control lock 430, crimp sleeve and post 406, back body 405, ferrule springs 409, ferrule and ferrule flange assembly 410, front body 413, connector outer housing 401, and one or more polarity keys (432a, 432b). Cable boot 403 has a receiving surface 403.1 over which polarity control lock 430 is secured and can be actuated from a first to second position, or vice versa, to prevent a selected polarity change key (432a or 432b) from being disengaged by a user or inadvertently, thereby, disruption communications (Tx/Rx) operation. Ferrule flange 410 is biased with spring 409.

FIG. 4D.1 is a top view of connector 400 with polarity change key 432a in a forward or proximal position. Flexible wing 433a is secured within opening/access 434a, to help prevent key 432a from being pushed distally upon insertion of connector 400 into a receptacle opening. FIG. 4D.2 depicts a first polarity with key 432a in a forward position and key 432b in a distal position. FIG. 4D.3 is bottom view of connector 400, with key 432b in a distal position, and flexible wing 433b (not shown) locking key 432b in position via wing 433b secured within access/opening 434b. FIG. 4D.4 is an opposite side view of FIG. 4D.2, with connector 400 in a first polarity and key 432a is in a proximal or forward locked position. FIG. 4D.5 is a front view of connector 400 depicting ferrules 410 within outer housing 401.

Figure 4E:
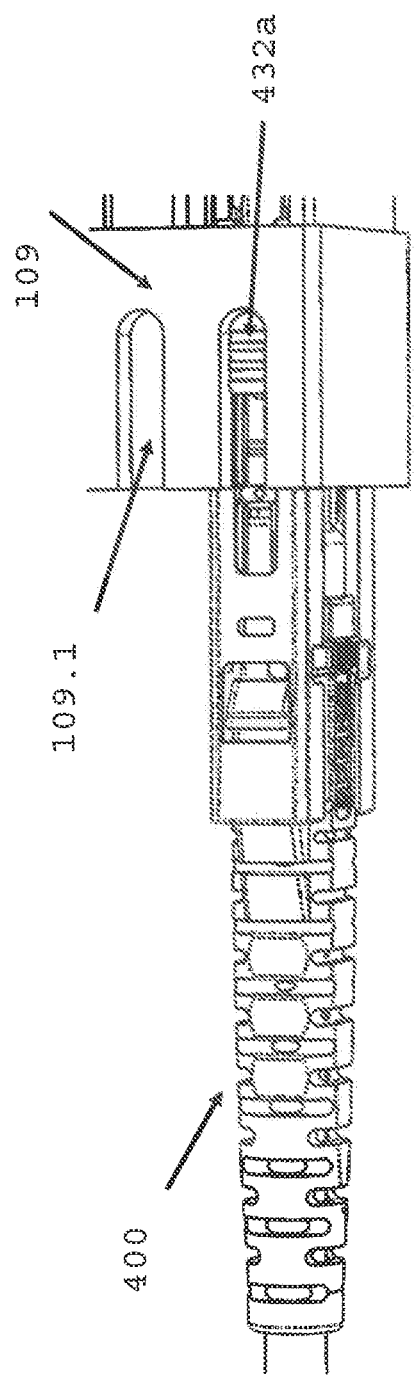
FIG. 4E is the connector of FIG. 4A inserted into an adapter.
Figure 4F:
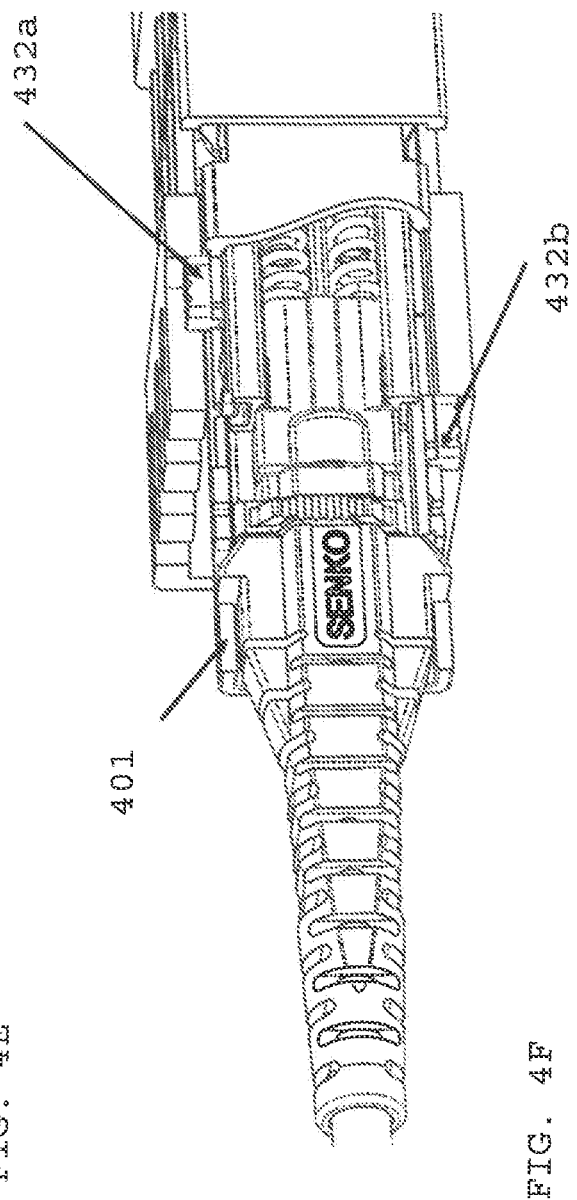
FIG. 4F is a partial cross-section of FIG. 4E.

FIG. 4E depicts connector 400 secured within adapter 109. Key 432a is positioned within alignment slot 109.1, so key 432a is performing a second function of connector alignment within a receptacle/adapter opening. FIG. 4F depicts connector 400 with key 432a forward and key 432b distal or back on connector outer housing 401. Since first key 432a is forward, polarity control lock 430 is in an up position. Polarity control lock 430 acts as a safety preventing first key 432a from being positioned distally. If key 432a is displaced distally, connector 400 would transmit incorrectly, as opposing connector (not shown) would not align along a Tx-Tx communication path. With key 432a forward and key 432b distal, connector 400 is oriented to ensure correct polarity of connector 400 when inserted into adapter port.

FIG. 4G.1 depicts top of connector 400 with key 432a forward, so flexible wing 433a is not secured in opening 435a. In FIG. 4G.2, flexible wing 433a is secured within proximal opening 435a, and polarity control lock 430 is up. FIG. 4H.1 depicts bottom of connector 400 with key 432b distal, and flexible wing 433b is secured within distal opening 435b. FIG. 4G.2 depicts zoomed view and cross-section view of FIG. 4G.1. FIG. 4H.2 depicts zoomed view and cross-section view of FIG. 4H.1, with flexible wing 433b positioned distally, as key 432b is distal. Wing 433b protrusion locks wing distally, with wing protrusion secured within distal opening 435b'. Flexible wing (433a, 433b) is formed as part of key (432a, 432b), as shown in FIG. 4G.2 zoomed area 432'.

FIG. 4I.1 depicts start of moving key 432a distally. Polarity lock 430 is up. FIG. 4I.2 depicts key 432a travel stopped polarity lock 430. Flexible wing 433a deflects but cannot secure itself in distal opening 435b. FIG. 4I.3 shows that key 432b can be moved distally, and flexible wing 433b can be secured within distal opening 435b', thus changing to a second polarity. Lock 430 is still up in FIG. 4I.3, which allows for the distal movement of key 432b. FIG. 4I.4 depicts the four steps of changing from a first polarity to a second polarity. Step 1 (590) key 432b is moved to a proximal direction, after flexible wing is released from distal opening 435b'. Step 2 (595), polarity lock 430 is push down in direction of arrow "A". Step 3 (597) flexible wing 433a is pushed down removing its protrusion from opening 434a, and in Step 4 (599) pushed distally.

FIG. 4J.1 depicts a cross-section view of connector 400 with polarity control lock 430 up (in direction of arrow). Key 432a is proximal or forward. Key 432b is distal. As shown in call-out "C", polarity lock 430 secured between boot 403 and connector outer housing 401 inner surface. This helps keep the key 432b tension so it would take a deliberate force via opening 435b' to remove flexible wing. FIG. 4J.2 depicts polarity control key 430 moved down or opposite its position in FIG. 4J.1. These snap points, pointed to by call-out "C" (FIGS. 4J.1, and 4J.2), also establishes an intermediate control 430 position to prevent both keys (432a, 432b) from moving distally. FIG. 4K.1 and FIG. 4K.2 show changing from a first polarity to a second polarity. In FIG. 4K.1, key 432a is latched in a distal or rear position. In FIG. 4K.2, key 432b is latched in a forward or proximal position. FIG. 4L depicts control lock 430 securing key 432b from dislodging or moving this interfering with second polarity as configured in FIGS. 4K.1 and 4K.2. In FIG. 4L, key 432a is locked rearward and key 432b is locked forward.

Figure 5A:
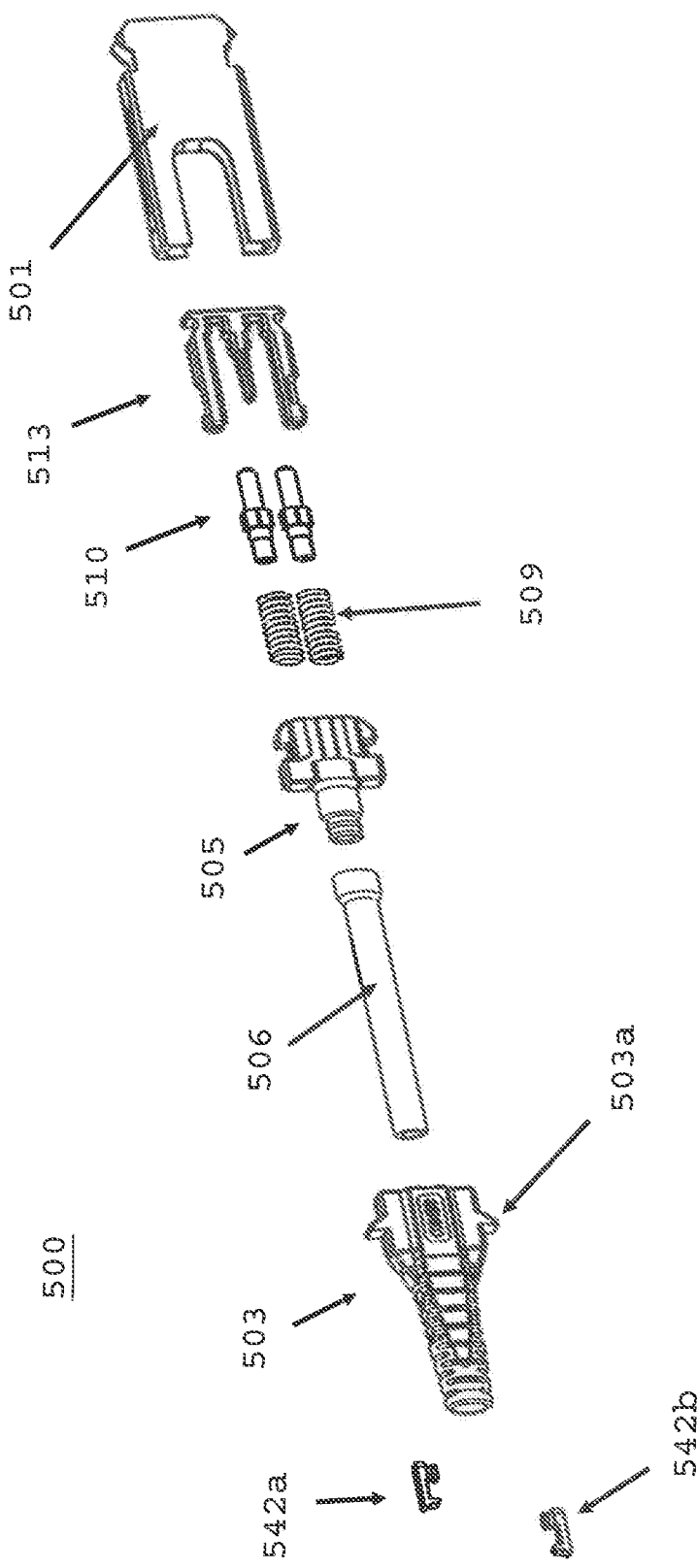
FIG. 5A is an exploded view of a fifth embodiment of a polarity changeable connector.
Figure 5B:
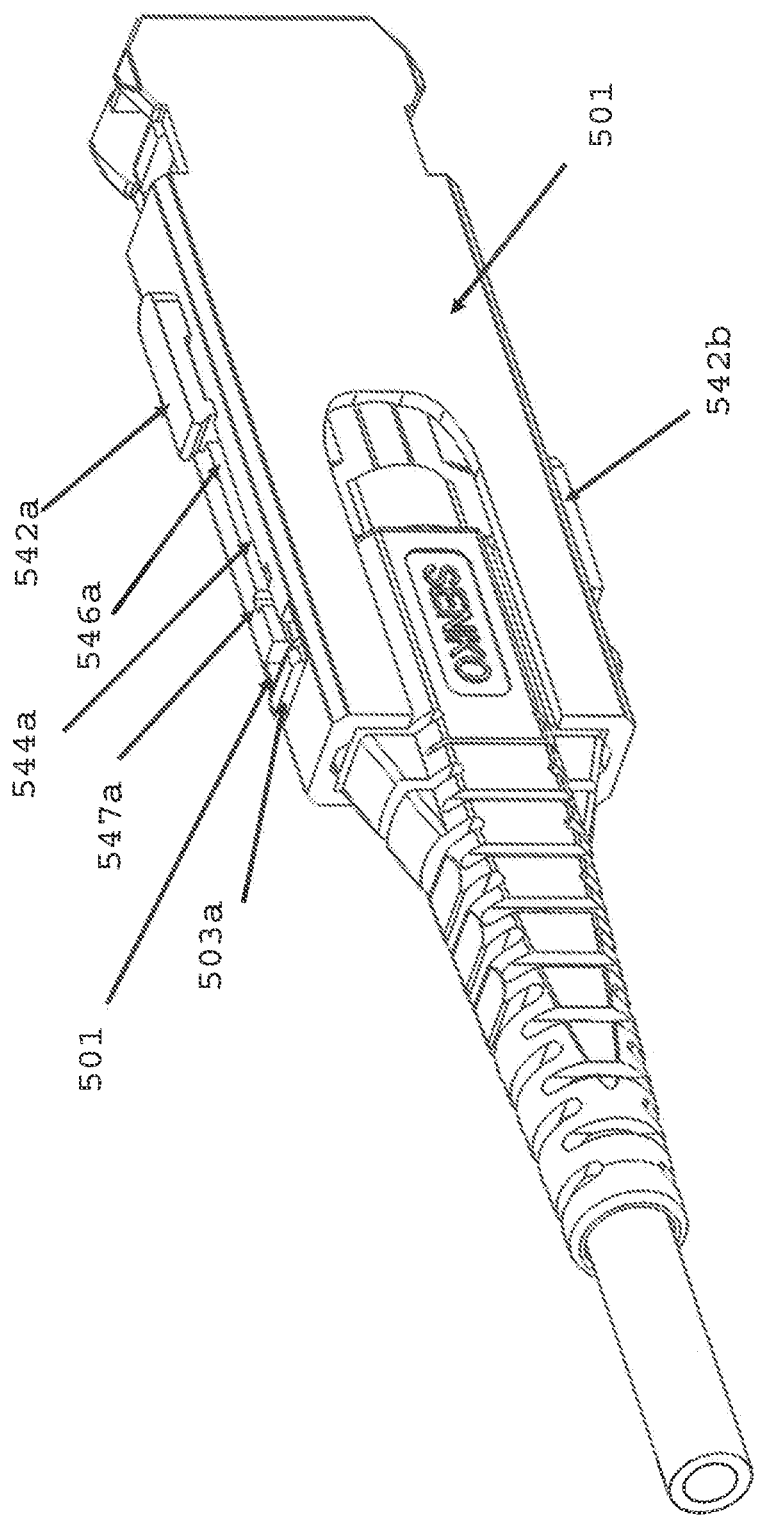
FIG. 5B is an perspective view of the connector of FIG. 5A.

FIG. 5A depicts a fifth embodiment with slidable polarity keys 542a and 542b. FIG. 5A is an exploded view of connector 500 having cable boot 503, crimp ring and sleeve 506, back body 505 that accepts the crimp assembly 506, bias spring 509 for each ferrule assembly 510, and front body 513 that secures and orients the ferrule assembly and body 513 secures to one end of back body 505 to form inner assembly 515. The inner assembly 515 is secured within connector housing 501. Housing 501 accepts the slidable polarity keys (542a, 542b) as explained below. Slidable means that the key can be pushed forward or rearward by a user from a first position that may be toward a distal end of the connector and a second position that may be proximal or forward end of the connector defined by the location of a ferrule. FIG. 5B depicts connector 500 assembled. Housing 501 has slot 544a that accepts key 542a. Key 542a slides along one side of housing 501 from a proximal lock position 546a to a distal lock position 547a. As described above when key 542a is in a forward or first position, and key 542b is in distal or second positon, connector 500 is in a first polarity or second polarity configuration depending on if the first ferrule is transmit (Tx) or receive (Rx). Cable boot wing 503*a* secures cable boot to housing 501, via cut-out 501. In this embodiment, there is no control lock 430.

FIG. 5C is a cross-section view of FIG. 5B. Locking protrusion 542*a*' secures key 542*a* in a forward position, when protrusion is captured with opening 546*a*. A user lifts at "L" to remove key 542*a* from locked position, and user can move the slide key distally. Key 542*b* is moved proximal from a distal position, and the movement of keys (542*a*, 542*b*) results in a polarity change from a first polarity to a second polarity for connector 500. Key 542*b* is locked distally with protrusion 542*b*' in opening 547*b*. Since keys 542*a* and 542*b* are in opposite positions, connector 500 is in a first or second polarity. FIG. 5D.1 is depicts slidable key 542*a* forward on connector housing. FIG. 5D.2 depicts key 542*a* in a distal position.

FIG. 6A is a sixth embodiment with fixed key 642*a* and slidable key holder 668. Holder 668 slides back and forth about key 642*a*. Holder 666 has alignment key 668 used as previously described herein. FIG. 6B depicts key 642*a* forward within holder 668. Holder 668 is narrower at its center point. So as holder is moved it slightly flexes and retracts capturing key 642*a* within a front 666*f* or rear 666*r* area of holder 666. Key 642*b* is an opposing key to polarity key 642*a*. Key 642*a* is forward and key 642*b* is rearward to configure connector 600 in a first polarity.

FIG. 7 depicts another embodiment of slidable key 732. Key 732*a* is installed on outer connector housing body when key opening 732.1 is secured over alignment key 101.3. Key 732*a* is slidable ("S") in forward or proximal position for a first polarity and a second distal position for a second polarity. A second key 732*b* is located on the opposite side of connector housing 101 to complete the polarity configuration that is one key forward and the second key distal.

FIG. 8A is another embodiment of a slidable key, in this species first key 832*a* is located on one side of connector connector into adapter 109 with key 1132*a* distally position, connector will not engage key 1132*a* with slot 109*a*.1.

FIG. 12A is a twelfth embodiment depicting a polarity changeable connector using a removable key 1232*a*. As depicted in FIG. 12B, first key 1232*a* proximal and second key 1232*b* distal provides a first or second polarity depending on which ferrule is Rx or Tx. A key is secured to connector housing via key stub 101.6. A stub is located on either side of the connector housing. A key is oriented by inserting open end of key onto stub in direction of dotted line.

Figure 13A:
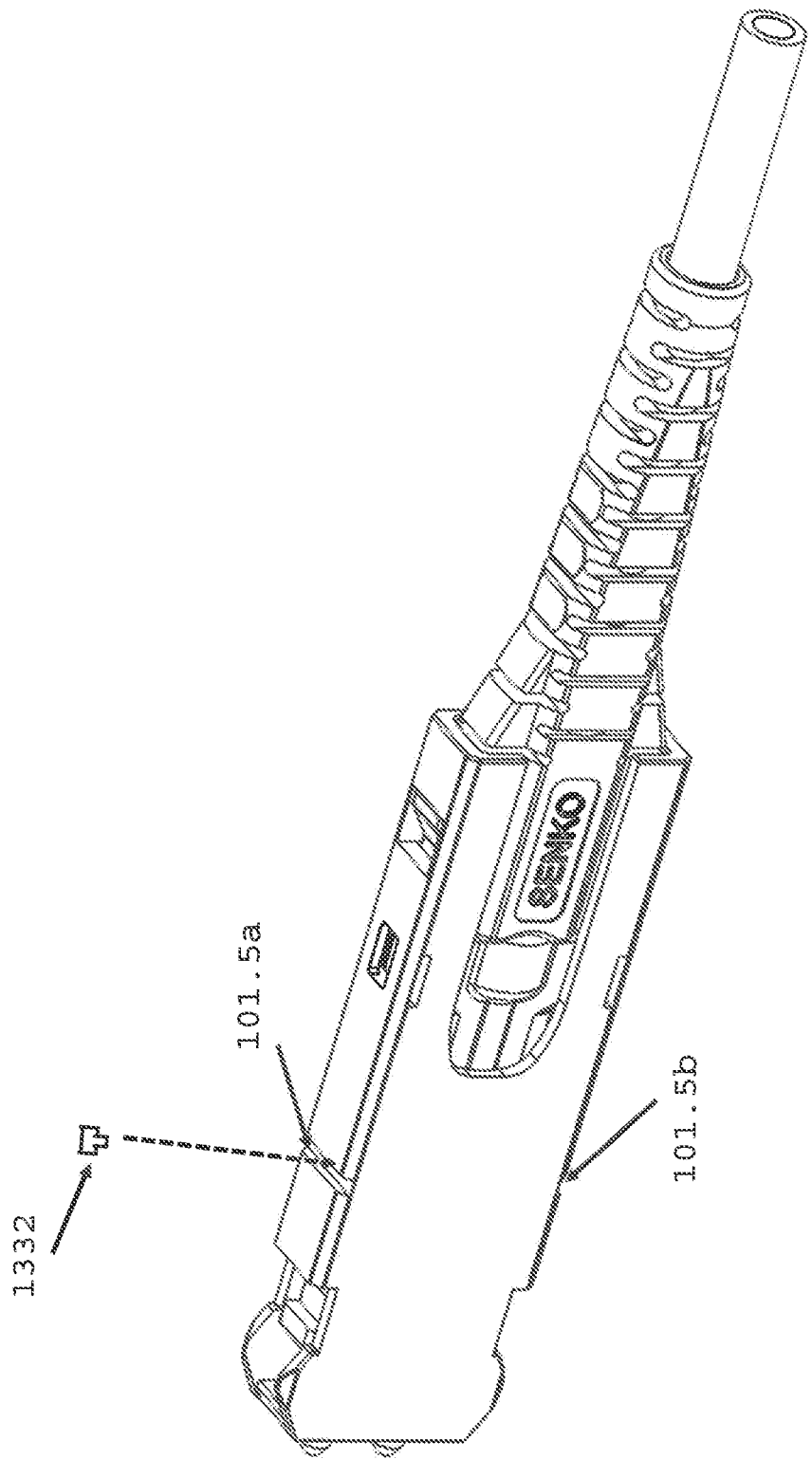
FIG. 13A is a perspective view of a thirteenth embodiment of a polarity changeable connector, this embodiment has rotatable polarity keys.

FIG. 13A is a thirteenth embodiment of a polarity changeable connector. Key 1332 is slide into slot 101.5*a*, on a first side of connector housing to set a first polarity. Key 1332 is removed and inserted into a corresponding slot 101.5*b* on a second side of connector housing for a second polarity. Key 1332 is depicted as an end view showing raised surface that is accepted in slot 101.5*a*.

FIG. 13B is a species of FIG. 13A. Key 1332 is secured at a second end in a slot or opening of connector housing 101. A single removable key as in FIG. 13A, key 1332 is twisted until its first end or proximal end is secured within slot or groove 101.5, as shown in FIG. 13C I direction of arrow "A".

Figure 14C:
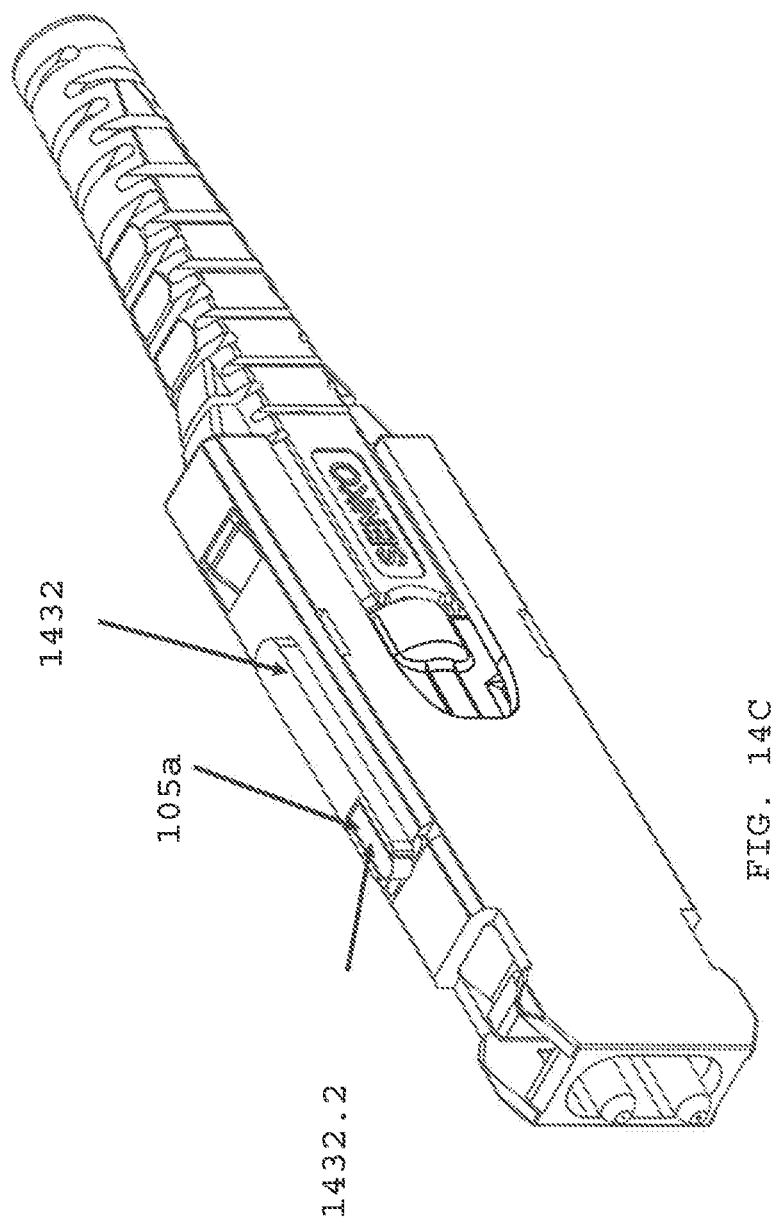
FIG. 14C is a perspective view of the connector of FIG. 14B using a narrower key.

FIG. 14A depicts a fourteenth embodiment of a polarity changeable connector in a first polarity. Key 1432 is a single key with an opening 1432.1 at a proximal end of key 1432. Key 1432 is secured by alignment key 105*a* within opening 1432.1, and further secured with key proximal end within slot 105.1*a*. To change connector polarity simply remove key 1432 and place it on opposite side of connector housing. FIG. 14B depicts key 1432 in a first polarity positon. FIG. 14C depicts a species of FIG. 14A key 1432. Instead of opening 1432.1, a slot 1432.2 is at proximal end of key. Slot 1432.2 accepts alignment key 105*a* or key 105*b* (opposite side of connector top housing). Polarity changeable key 1432 may be installed on opposite side of connector housing 101 without departing from the scope of the invention.

Figure 15C:
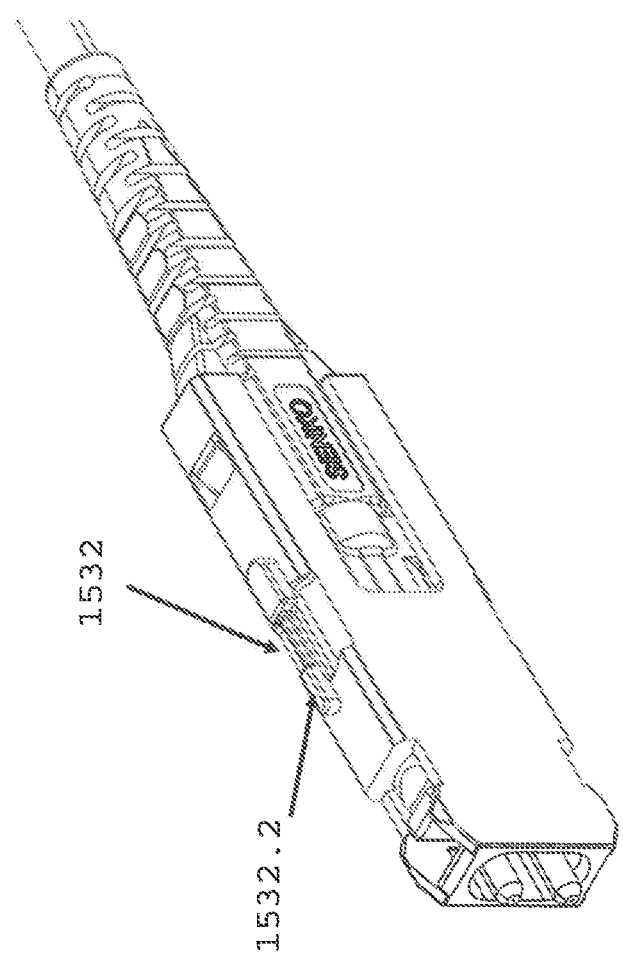
FIG. 15C is a perspective view of the connector of FIG. 15A with the key in the second polarity position.
Figure 15F:
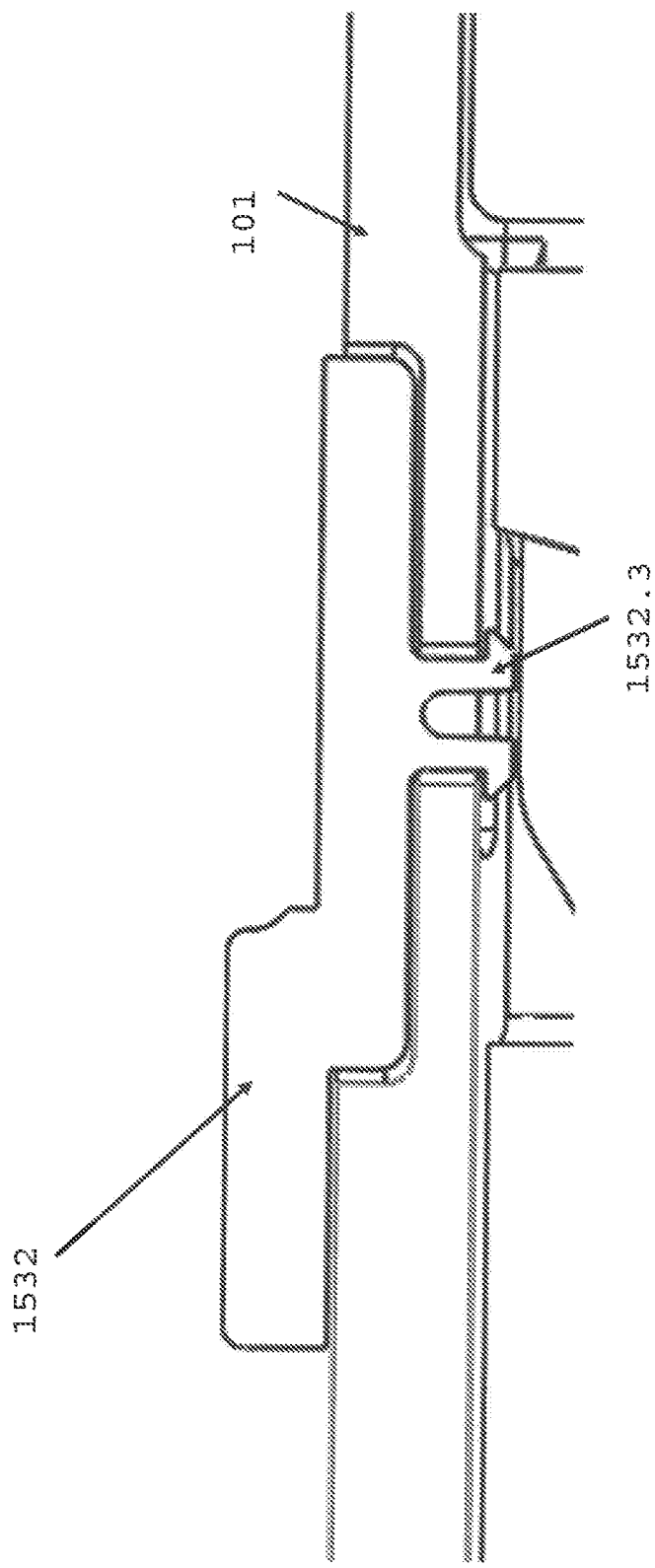
FIG. 15F is a perspective view of key of FIG. 15D secure onto connector as shown in FIG. 15A.

FIG. 15A is a fifteenth embodiment of a changeable polarity connector. Key 1532 rotates from a first position to a second position. A single key may be used either on a first side of the housing or a second side of the housing. Key 1532 has a first end with a larger u-shaped protrusion than a second end with a smaller u-shaped protrusion, which sets connector polarity. Key 1532 is secured within a groove on top of connector housing. FIG. 15A depicts key 1532 in a first polarity position. FIG. 15B depicts key 1532 being rotated into a second polarity position, as shown in FIG. 15C. FIG. 15C depicts rotating key 1532 with small u-shaped protrusion 1532.2. FIG. 15E depicts key 1532 rotated to a second polarity position with the small u-shaped protrusion 1532.2 (FIG. 15D) in a forward or proximal position. FIG. 15F depicts removable, rotatable polarity change key. FIG. 15D depicts Key 1532 having a large u-shaped protrusion 1532.1 connected by bridge member 1532.4 with a smaller u-shaped protrusion 1532.2. About mid-point of bridge member 1532.4 is snap 1532.3 that is secured within a corresponding opening with a side of connector housing 101. FIG. 15E depicts snap 1532.3 with an outward projecting edge that allows a user to rotate key 1532 from a first to a second polarity position, when key 1532 is secured to connector housing. FIG. 15F depicts key 1532 snapped or secured into connector housing 101.

Figure 16D:
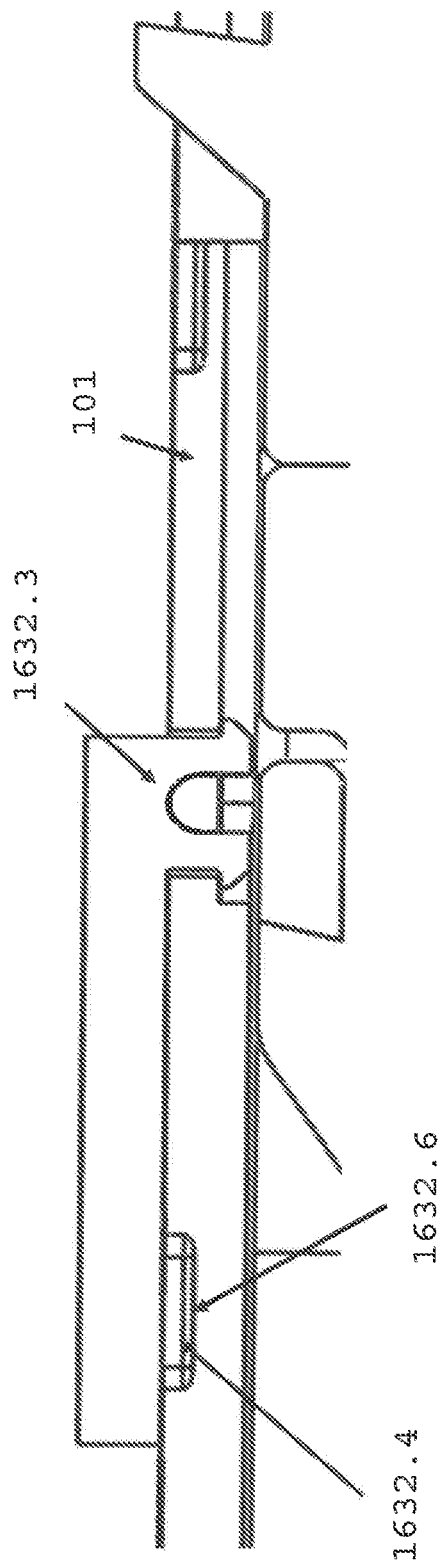
FIG. 16D is a cross-section view of the key of FIG. 16B secured to outer housing on one side of connector as in FIG. 16A.

FIG. 16A depicts a sixteenth embodiment of a removable, rotatable key 1632 secured on side of connector housing in a first polarity position. FIG. 16B depicts key 1632 with a first end 1632.1 larger than a second end 1632.2. Again a single key can be used to set connector polarity, or two keys—one at top side and one bottom side of connector housing. Snap 1632.3 is located about mid-point of key 1632. Snap 1632.3 secures key to connector outer housing on one side to set polarity. When large end 1632.1 is forward the connector is in a first polarity. FIG. 16C depicts at either end on the same side as snap, a chamfered edge 1632.4 and edge 1632.5 further secures key 1632 to connector housing. Edges 1632.4, 1632.5 are secured in grooves or slots on same side of connector housing, as key is placed. FIG. 16D depicts key 1632 with snap 1632.3 secured with opening of connector housing 101. Chamfered edge 1632.4 further secures key 1632 to connector by edge engaging slot 1632.6.

Figure 17G:
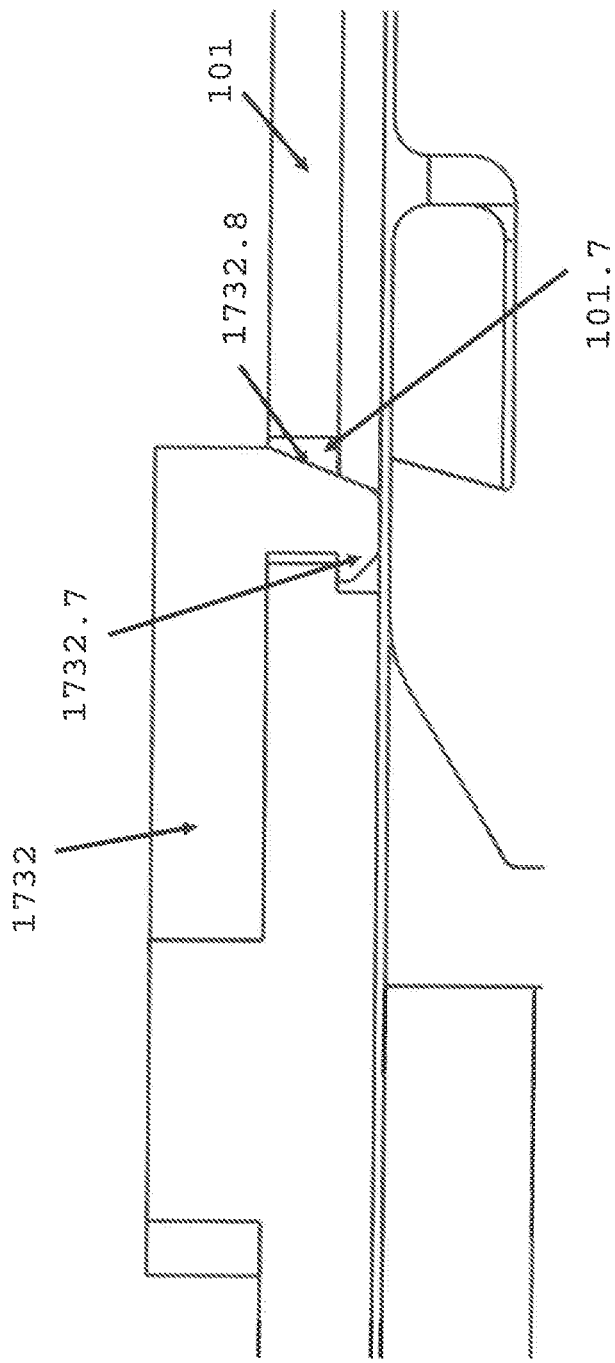
FIG. 17G is cross-section view of key FIG. 17E secured to connector housing.

FIG. 17A depicts a seventeenth embodiment of a rotatable polarity key to change the polarity of a connector. Key 1732*a* is located on one side of housing 101 and second key 1732*b* is located on second side of housing 101. FIGS. 17B-17D depict changing connector polarity. FIG. 17B depicts key 1732*a* forward and secured about alignment key 105*a*. FIG. 17C depicts rotating key 1732*a* from a proximal end to a distal end of connector, to change connector polarity when key 1732*b* (shown in FIG. 17A) is rotated to a proximal end of the connector. Key 1732*a* is rotated and secured to connector housing by pin 1732.4 (FIG. 17E) within recess 1732.6*a*. Key 1732*a* is proximal of recess 1732.6*b*. The operation of rotating key 1732*a* or key 1732*b* is the same, as shown in FIG. 17B to FIG. 17D. FIG. 17D depicts key 1732*a* in a distal position. FIG. 17E depicts key 1732 with hook 1732.7 and chamfered edge 1732.8, the edge is secured within connector housing 101. The chamfer allows the hook to be placed within the opening on housing side 101. FIG. 17F depicts hook 1732 with opening 1732.9 that secures about alignment key 105*a* on top of housing 101. FIG. 17G depicts key 1732 secured in housing 101, with hook 1732.7 in opening 101.7.

Figure 18:
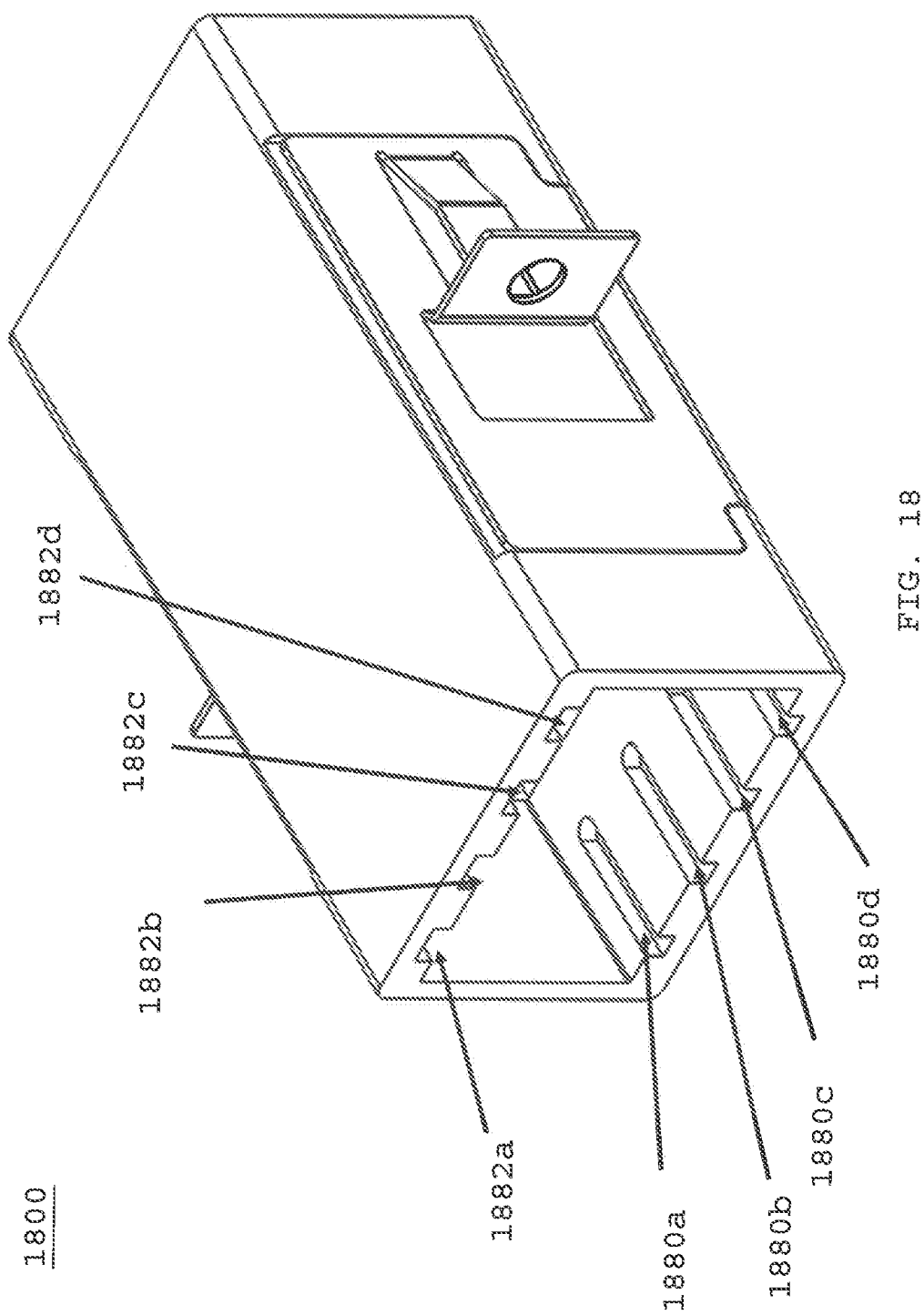
FIG. 18 is a perspective view of an adapter configured to accept a connector according to an embodiment of this invention.
Figure 19:
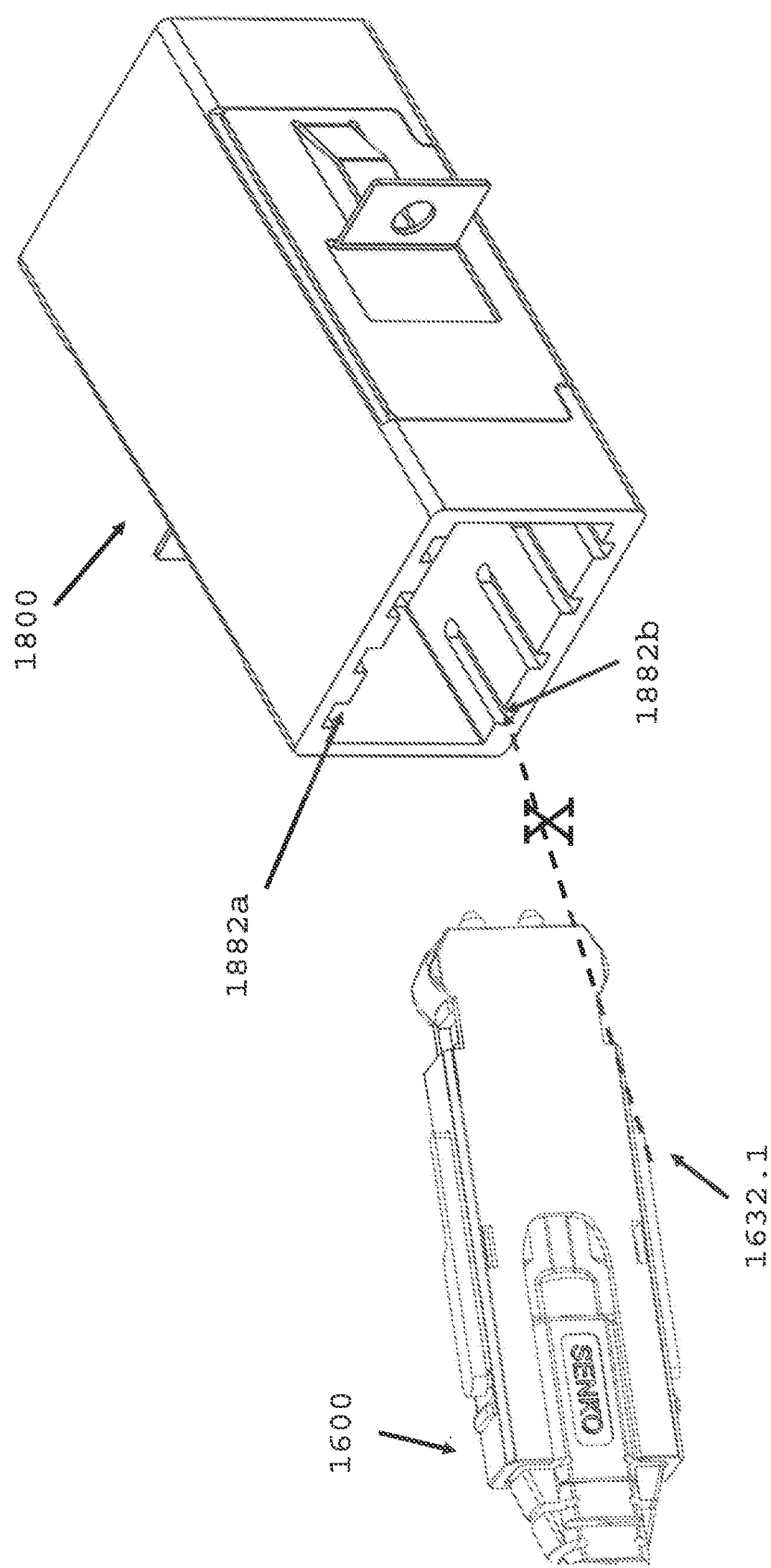
FIG. 19 is a perspective view of connector of FIG. 16A just prior to a failed insertion into FIG. 18 adapter.

FIG. 18 depicts adapter 1800 capable of accepting a connector with dual polarity keys. Adapter 1800 has a first and second end without any internal rails. The top portion of adapter housing has one or more slots 1882*a*-1882*d* sized and shape to accept a keyed polarity changeable connector, such as single keyed polarity changeable connector 300 of FIG. 3, connector 500 of FIG. 5, connector 1500 of FIG. 15A and connector 1600 of FIG. 16, and the following double keyed polarity changeable connectors 900 of FIG. 9, and connector 1700 of FIG. 17. Referring to FIG. 16A, key 1632 is sized and shaped on a first side 1632.2 that differs from a second side 1632.1. Referring to FIG. 18 installing connector 1600 configured as in FIG. 16 with large portion of key 1632.1 forward, connector 1600 cannot be oriented and inserted into adapter 1800 with key 1632.1 to engage slot 1880*a*-1880*d*. Slots 1880*a*-1880*d* are too small to accept key 1632.1. In operation, refer to FIG. 19 dual keyed polarity connector 1600 key 1632.1 is not in a proper orientation, so when connector 1600 is inserted indirect of arrow into adapter 1800, connector 1600 will not fit as indicated by "X". By comparing 1632.1, FIG. 16A, key 1632.1 is forward and too large to be inserted into adapter slot 1880*a*.

FIG. 20 depicts a correct insertion of dual polarity keyed connector 1600 into adapter 1800. Key 1632.1 is sized and shaped to be accepted into slot 1882*a*, and likewise key 1632.2 is sized and shaped (see FIG. 16A) to be inserted into slot 1880*a*.

FIG. 21 depicts a single key polarity changeable connector 300 of FIG. 3. Key 332 is sized and shaped to be accepted into adapter slot 1882*a*, as shown by dotted line arrow. FIG. 22 depicts connector 300 cannot be inserted into slot 1880*a* of FIG. 18, as key 332 is not sized and shaped to fir within slot 1880*a*. Refer to "X" near dotted line arrow that means cannot insert into adapter.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms should be understood to contemplate the possibilities of including one of the terms, either of the terms, or both terms. For example, the phrase "A or B" will be understood to include the possibilities of "A" or "B" or "A and B."

The invention claimed is:

1. A reconfigurable optical connector for holding two or more LC-type optical ferrules, comprising:
    a connector housing extending along a longitudinal axis from a proximal end portion to a distal end portion, the proximal end portion of the connector housing being spaced apart from the distal end portion of the connector housing in a proximal longitudinal direction and the distal end portion of the connector housing being spaced apart from the proximal end portion of the connector housing in a distal longitudinal direction opposite the proximal longitudinal direction;
    a first key having a key portion defining a longitudinal end of the key, the first key coupled to the connector housing for rotation with respect to the connector housing about a key rotation axis transverse to the longitudinal axis, the first key being rotatable about the key rotation axis from a first position to a second positioned toward a distal end of the connector;
    and wherein when the first key is rotated to the first position, the key portion is spaced apart from the key rotation axis in the distal longitudinal direction, and when the first key is rotated to the second position, the key portion is spaced apart from the key rotation axis in the proximal longitudinal direction,
    wherein when the first key is in the first position, the connector is configured for a first polarity such that the connector is insertable into a mating adapter port in first polarity orientation without the key portion passing into the adapter port, and wherein when the first key is in the second position, the connector is configured for a second polarity such that the connector is insertable into the mating adapter in a second polarity orientation with the key portion passing into a keyway of the adapter port.

2. The reconfigurable optical connector of claim 1, further comprising a second key positioned on an opposite side of connector housing from the first key.

3. The reconfigurable optical connector of claim 2, wherein the first key or second key further comprises a snap that secures the first key or the second key to the connector housing on a first side or a second side.

4. A reconfigurable optical connector comprising:
a connector housing having a first side and an opposite second side, the connector housing extending along a longitudinal axis from a proximal end portion to a distal end portion, the proximal end portion of the connector housing being spaced apart from the distal end portion of the connector housing in a proximal longitudinal direction and the distal end portion of the connector housing being spaced apart from the proximal end portion of the connector housing in a distal longitudinal direction opposite the proximal longitudinal direction;
a first slidable key slidably connected to the first side of the connector housing and a second slidable key slidably connected to the second side of connector housing, each of the first slidable key and the second slidable key being slidable along the longitudinal axis from a respective distal position to a respective proximal position spaced apart from the respective distal position in the proximal longitudinal direction, the first slidable key and the second slidable key configuring the reconfigurable optical connector in a first polarity configuration when the first slidable key is at the respective distal position and the second slidable key is at the respective proximal position, the first slidable key and the second slidable key configuring the reconfigurable optical connector in a second polarity configuration when the first slidable key is at the respective proximal position and the second slidable key is at the respective distal position; and
a polarity control lock coupled to the connector housing for movement between a first position and a second position, wherein when the polarity control lock is in the first position, the polarity control lock is configured to block the first slidable key from sliding from the respective proximal position to the respective distal position and allow the second slidable key to be positioned at the respective distal position, and wherein when the polarity control lock is in the second position, the polarity control lock is configured to block the second slidable key from sliding from the respective proximal position to the respective distal position and allow the first slidable key to be positioned at the respective distal position.

5. An optical cable assembly comprising a cable terminated by the reconfigurable optical connector of claim 1 or claim 4.

6. A dual keyed adapter for accepting a polarity changeable connector having a polarity key selectively adjustable from a first key position to a second key position for controlling a polarity of the polarity changeable connector to ensure proper communication channel Tx to Tx, with an opposing connector or transceiver, the dual keyed adapter comprising:
a perimeter wall defining an adapter port configured for receiving the polarity changeable connector therein, the perimeter wall including a first perimeter wall portion defining a first side of the adapter port and a second perimeter wall portion defining a second side of the adapter port opposite the first side of the adapter port, the first perimeter wall portion forming a first keyway and the second perimeter wall portion forming a second keyway,
and wherein when the polarity key is in a first key position, the first keyway is configured to accept the polarity key when the polarity changeable connector is inserted into the adapter port in a first orientation and the second perimeter wall portion is configured to block the polarity key from passing into the second keyway when the polarity changeable connector is inserted into the adapter port in a second orientation inverted with respect to the first orientation.

7. The dual keyed adapter according to claim 6, wherein the polarity key is a first polarity key and the polarity changeable connector further comprises a second polarity key, wherein when the first polarity key is in the first key position and the second polarity key is in a second key position, the second keyway is configured to accept the second polarity key when the polarity changeable connector is inserted into the adapter port in the first orientation.

* * * * *